US011402990B2

(12) United States Patent
Gray et al.

(10) Patent No.: US 11,402,990 B2
(45) Date of Patent: Aug. 2, 2022

(54) USER-INTERACTIVE STEERING WHEEL

(71) Applicant: SIGMASENSE, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 17/238,367

(22) Filed: Apr. 23, 2021

(65) Prior Publication Data

US 2021/0263629 A1  Aug. 26, 2021

Related U.S. Application Data

(63) Continuation of application No. 17/082,616, filed on Oct. 28, 2020, now Pat. No. 11,269,510, which is a (Continued)

(51) Int. Cl.
*G06F 3/048* (2013.01)
*G06F 3/044* (2006.01)
(Continued)

(52) U.S. Cl.
CPC ............ *G06F 3/0488* (2013.01); *G06F 3/044* (2013.01); *G06F 3/0412* (2013.01)

(58) Field of Classification Search
CPC .... G06F 21/31; G06F 3/03545; G06F 3/0412; G06F 3/0416; G06F 3/044; G06F 3/0488
See application file for complete search history.

(56) References Cited

U.S. PATENT DOCUMENTS 6,218,972 B1   4/2001  Groshong
6,665,013 B1  12/2003  Fossum et al.
(Continued)

FOREIGN PATENT DOCUMENTS

CN   103995626 A    8/2014
CN   104182105 A   12/2014

OTHER PUBLICATIONS

Baker; How delta-sigma ADCs work, Part 1; Analog Applications Journal; Oct. 1, 2011; 6 pgs.
(Continued)

*Primary Examiner* — Afroza Chowdhury
(74) *Attorney, Agent, or Firm* — Garlick & Markison; Timothy W. Markison; Shayne X. Short

(57) ABSTRACT

A touch sensor system includes touch sensors, drive-sense circuits (DSCs), memory, and a processing module. A DSC drives a first signal via a single line coupling to a touch sensor and simultaneously senses, when present, a second signal that is uniquely associated with a user. The DSC processes the first signal and/or the second signal to generate a digital signal that is representative of an electrical characteristic of the touch sensor. The processing module executes operational instructions (stored in the memory) to process the digital signal to detect interaction of the user with the touch sensor and to determine whether the interaction of the user with the touch sensor compares favorably with authorization. When not authorized, the processing module aborts execution of operation(s) associated with the interaction of the user with the touch sensor. Alternatively, when authorized, the processing module facilitates execution of the operation(s).

20 Claims, 53 Drawing Sheets

Related U.S. Application Data continuation of application No. 16/131,990, filed on Sep. 14, 2018, now Pat. No. 10,845,985.

(51) Int. Cl.
*G06F 3/041* (2006.01)
*G06F 3/0488* (2022.01)

(56) References Cited

U.S. PATENT DOCUMENTS

| | | | |
|---|---|---|---|
| 7,528,755 B2 | 5/2009 | Hammerschmidt | |
| 8,031,094 B2 | 10/2011 | Hotelling et al. | |
| 8,089,289 B1 | 1/2012 | Kremin et al. | |
| 8,279,180 B2 | 10/2012 | Hotelling et al. | |
| 8,547,114 B2 | 10/2013 | Kremin | |
| 8,587,535 B2 | 11/2013 | Oda et al. | |
| 8,625,726 B2 | 1/2014 | Kuan | |
| 8,982,097 B1 | 3/2015 | Kuzo et al. | |
| 9,201,547 B2 | 12/2015 | Elias | |
| 10,452,257 B2 * | 10/2019 | Kim | G02B 6/005 |
| 2002/0185981 A1 | 12/2002 | Dietz | |
| 2009/0084612 A1 | 4/2009 | Mattice | |
| 2010/0074464 A1 | 3/2010 | Neufeld | |
| 2011/0063154 A1 | 3/2011 | Hotelling et al. | |
| 2011/0298745 A1 | 12/2011 | Souchkov | |
| 2012/0200522 A1 | 8/2012 | Westhues | |
| 2012/0274583 A1 | 11/2012 | Haggerty | |
| 2012/0278031 A1 | 11/2012 | Oda | |
| 2013/0207913 A1 | 8/2013 | Takashima | |
| 2013/0278447 A1 | 10/2013 | Kremin | |
| 2014/0058584 A1 * | 2/2014 | Weng | G06F 3/038 701/1 |
| 2014/0081521 A1 * | 3/2014 | Frojdh | G01C 21/3664 701/36 |
| 2014/0327644 A1 | 11/2014 | Mohindra | |
| 2015/0032322 A1 * | 1/2015 | Wimmer | B60K 35/00 701/23 |
| 2015/0091847 A1 | 4/2015 | Chang | |
| 2015/0097794 A1 * | 4/2015 | Lisseman | G06F 3/016 345/173 |
| 2015/0346889 A1 | 12/2015 | Chen | |
| 2016/0188049 A1 | 6/2016 | Yang et al. | |
| 2016/0266679 A1 | 9/2016 | Shahparnia | |
| 2017/0255324 A1 | 9/2017 | Oka | |
| 2018/0052563 A1 | 2/2018 | Fujii | |
| 2018/0079358 A1 * | 3/2018 | Kelly | G08B 6/00 |
| 2018/0232094 A1 | 8/2018 | Geng | |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

* cited by examiner communication system 10 computing device 12 computing device 14 computing device 18 computing subsystem 25 computing subsystem 25 computing subsystem 25

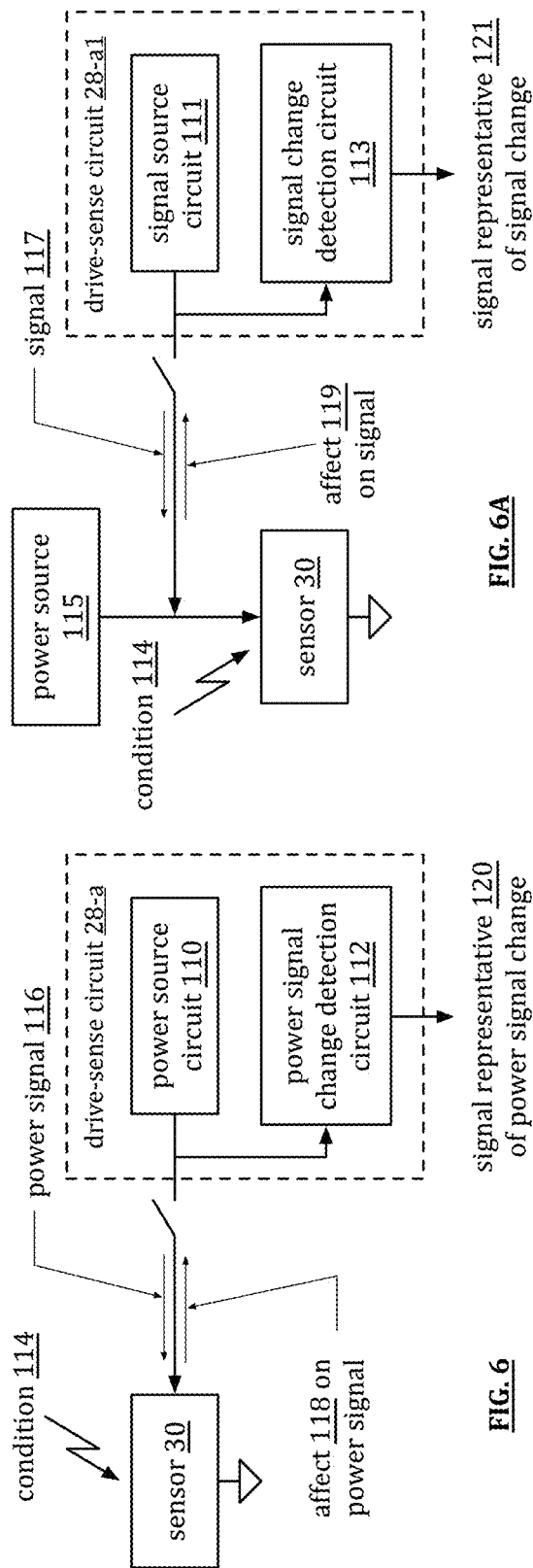
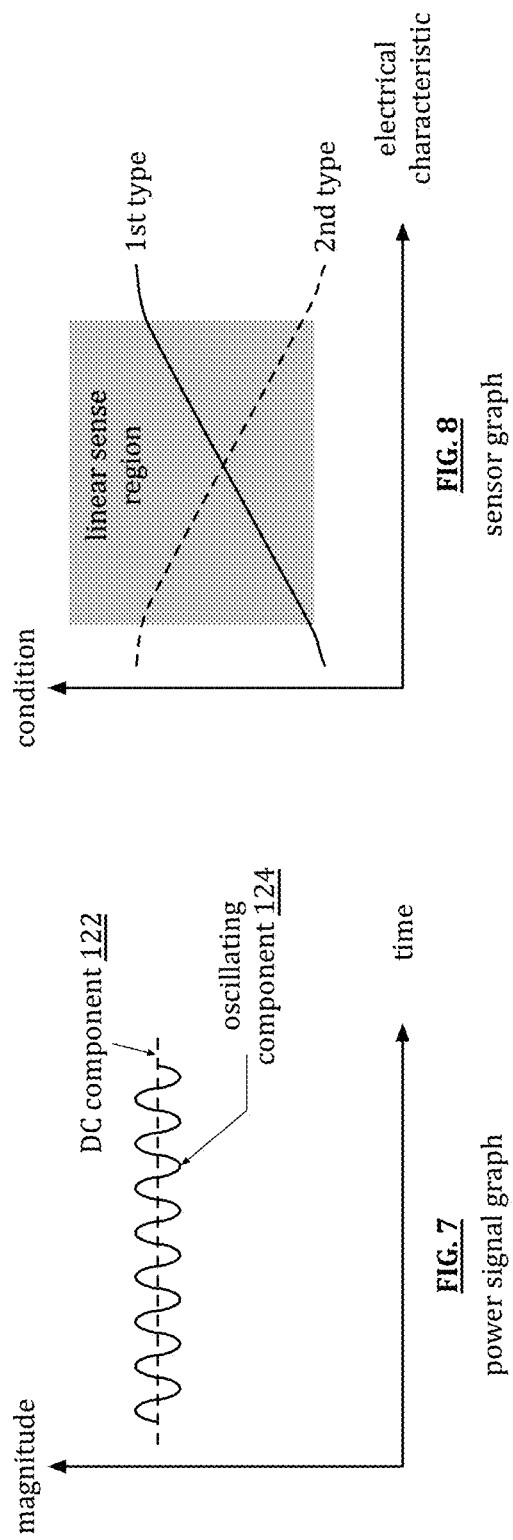

power signal graph power signal graph power signal graph power signal graph

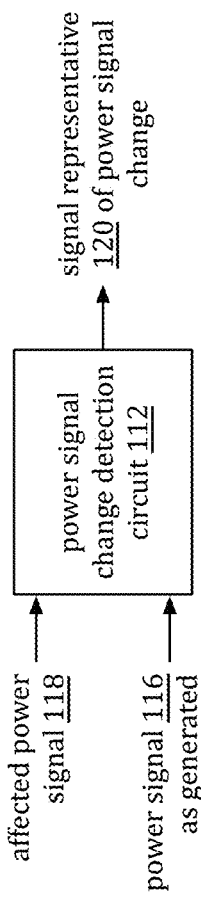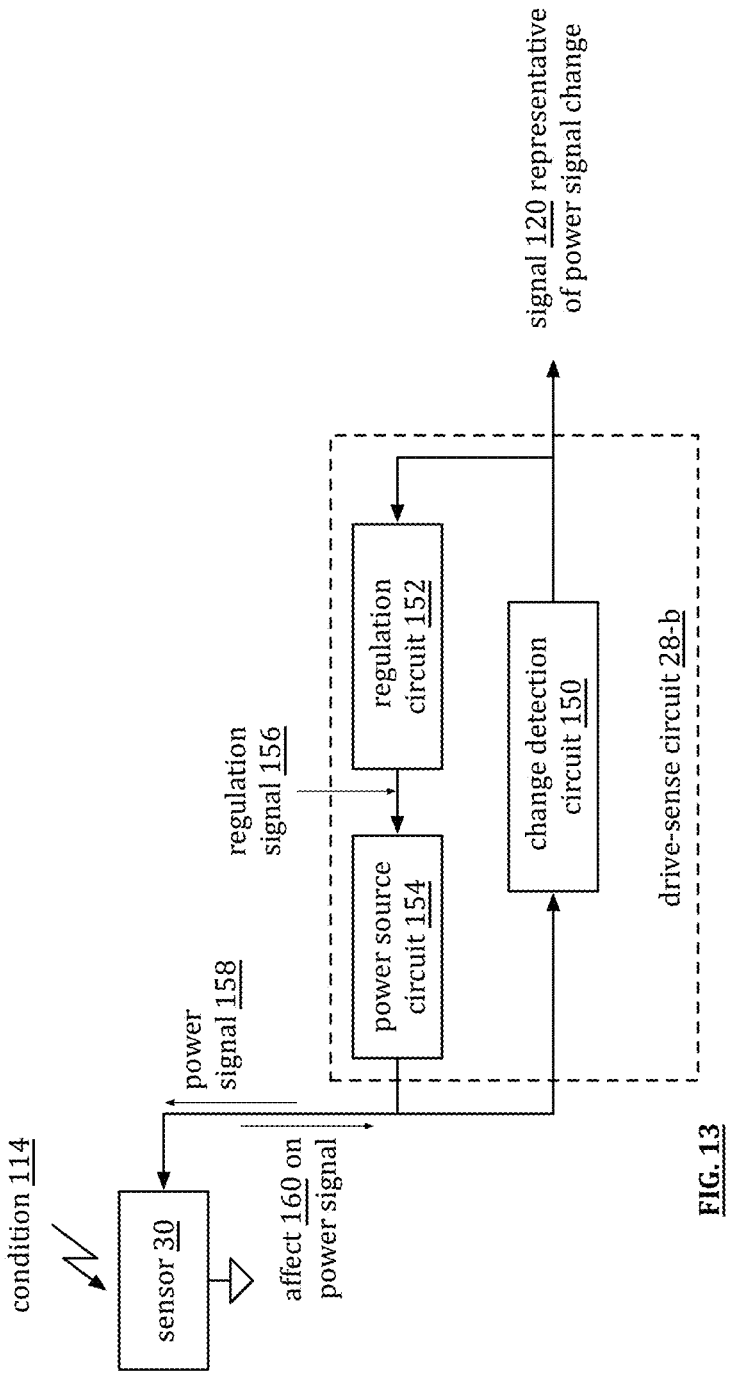

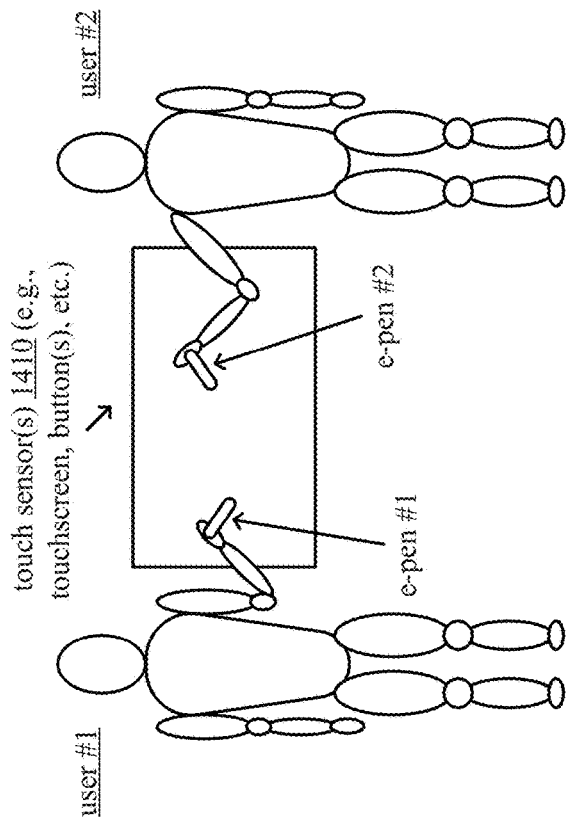
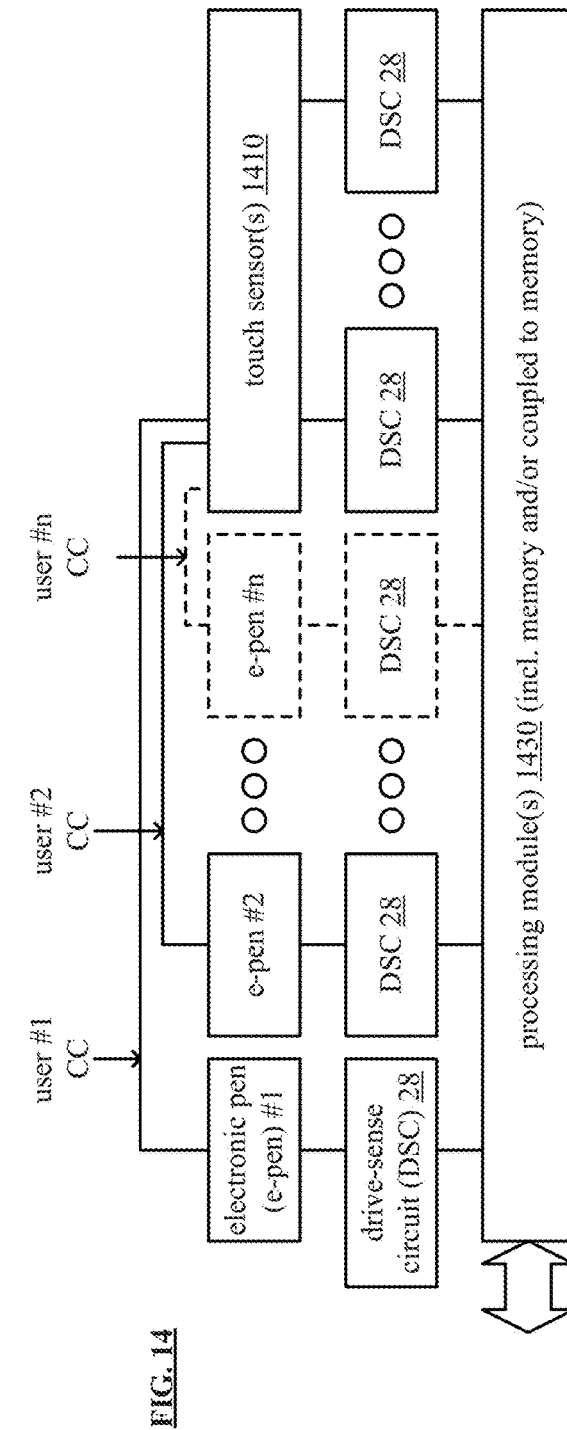
FIG. 14

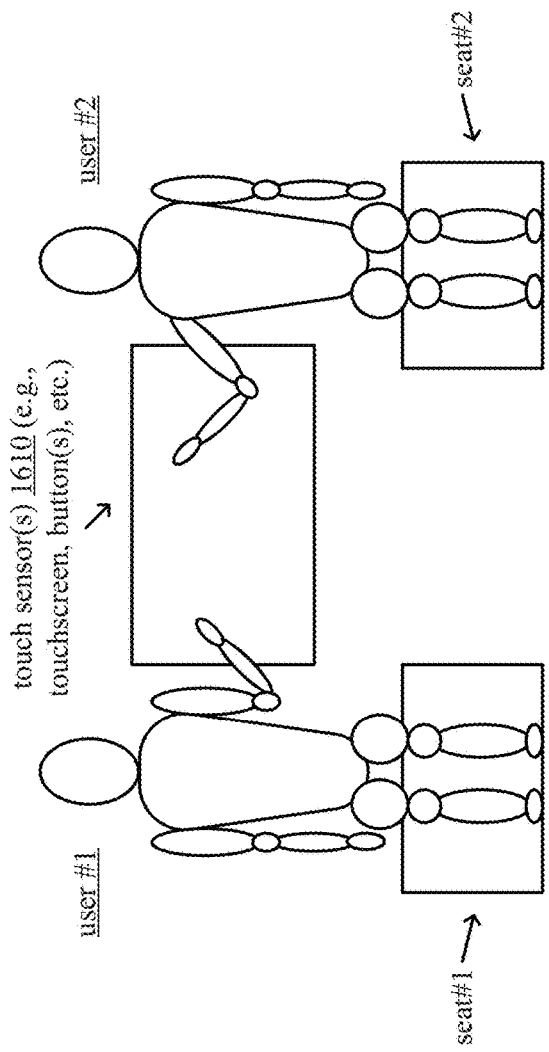
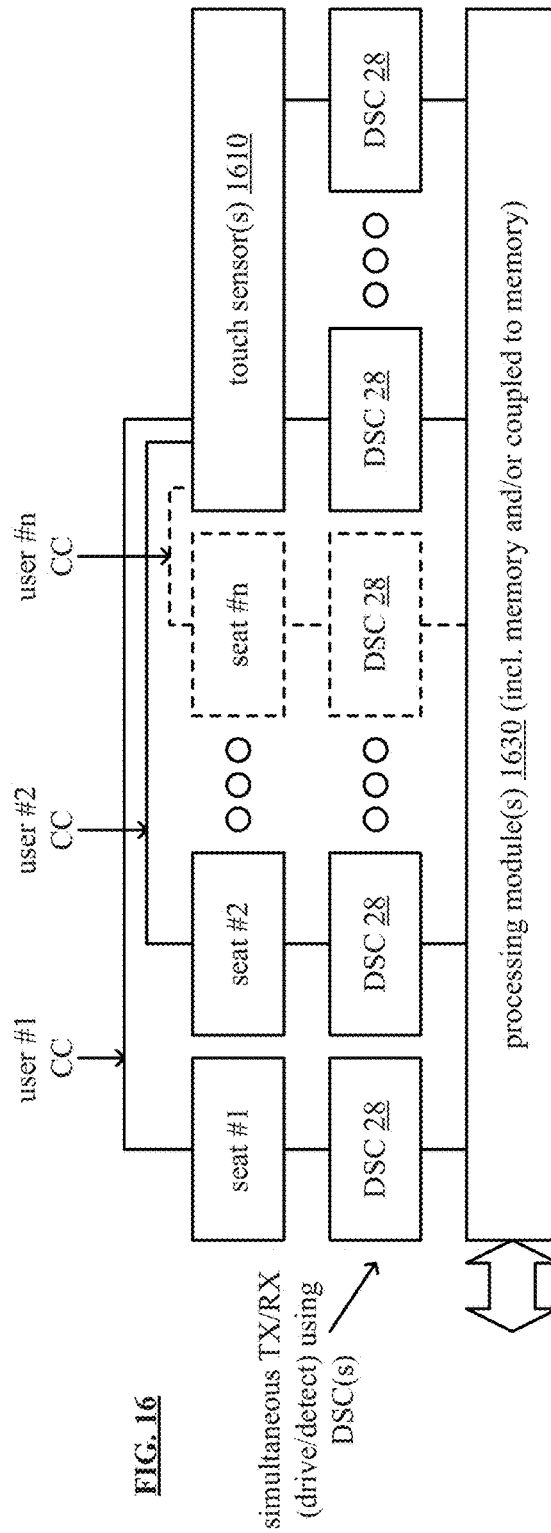
FIG. 16

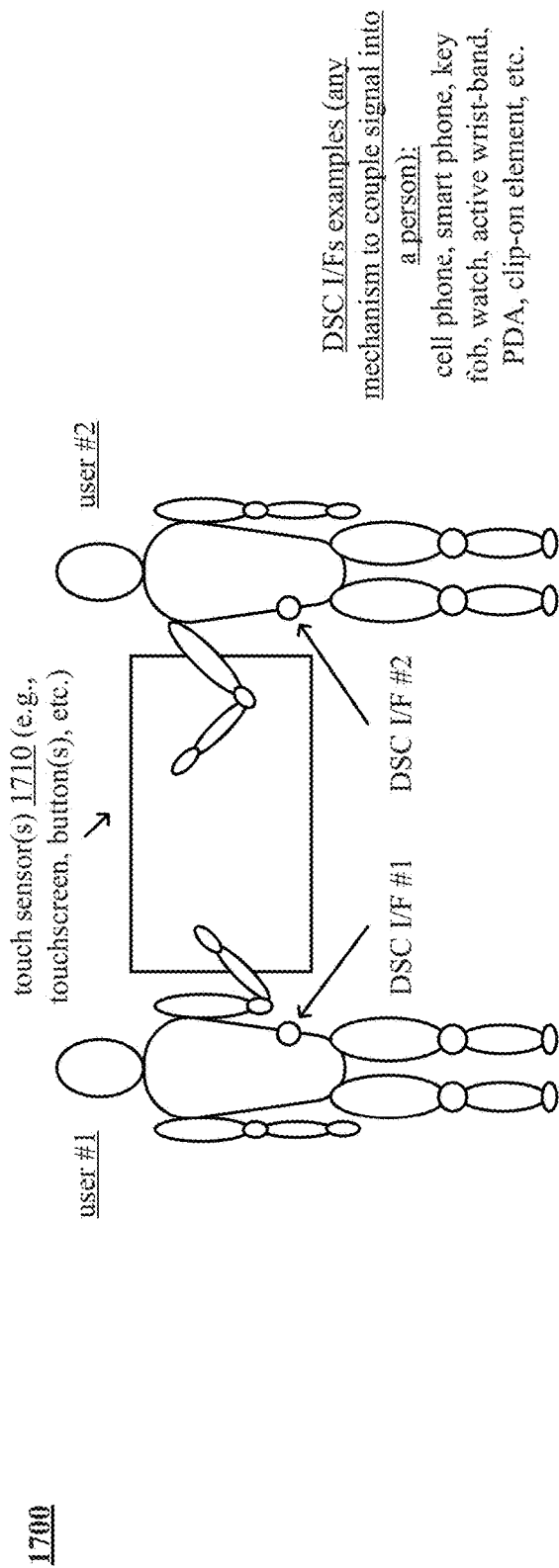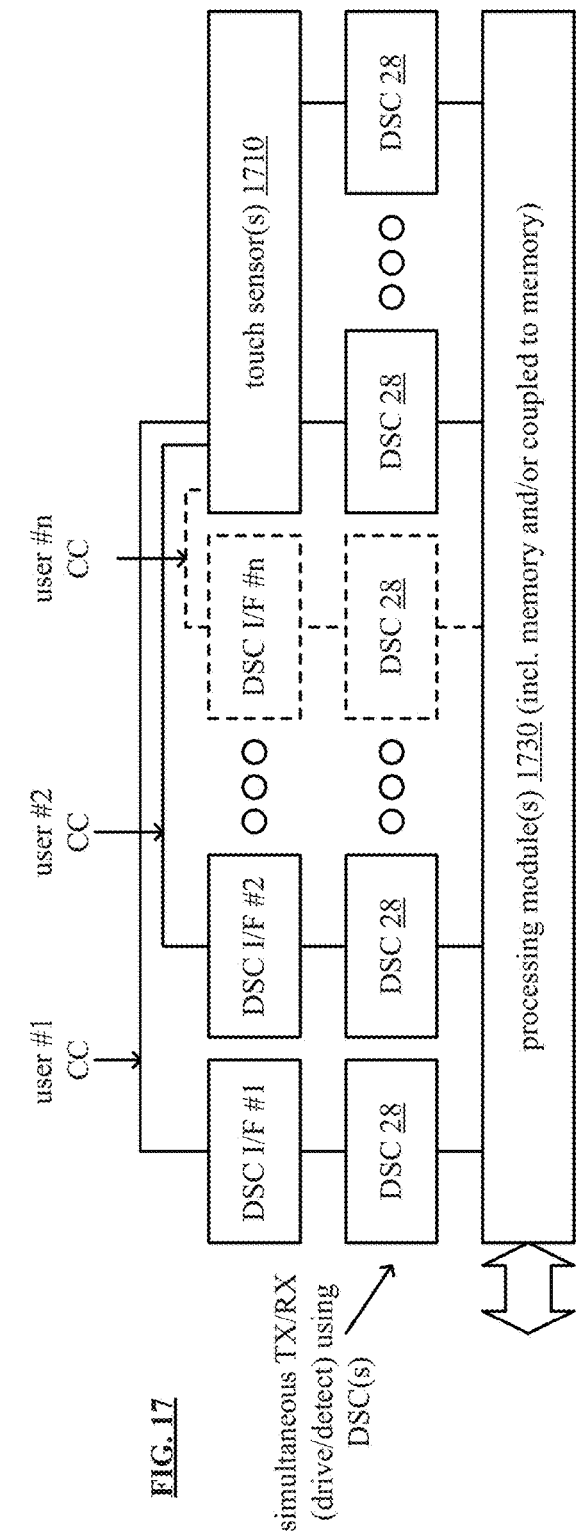
FIG. 17

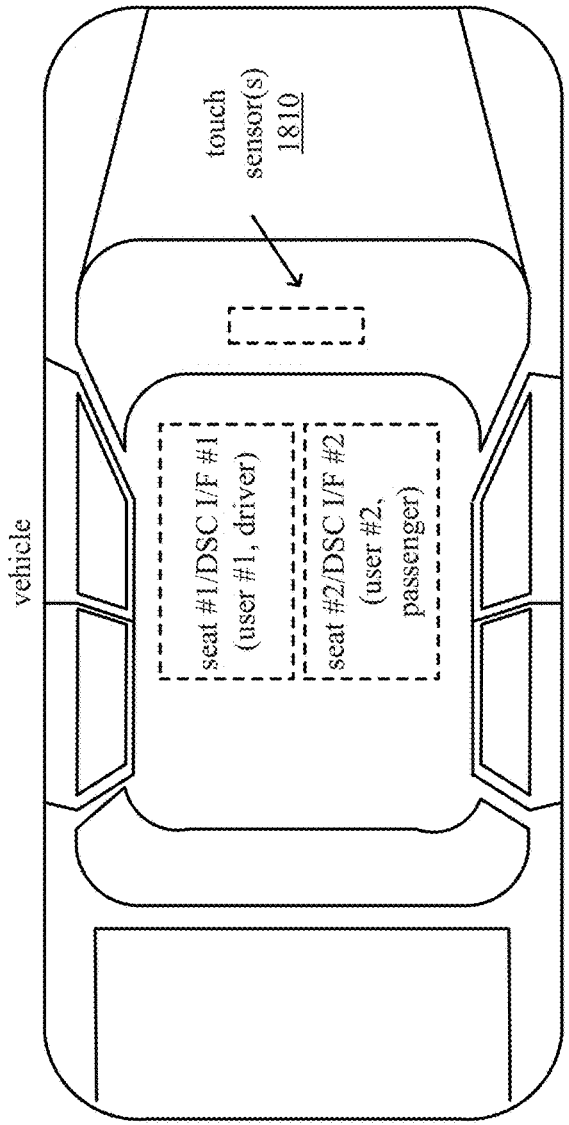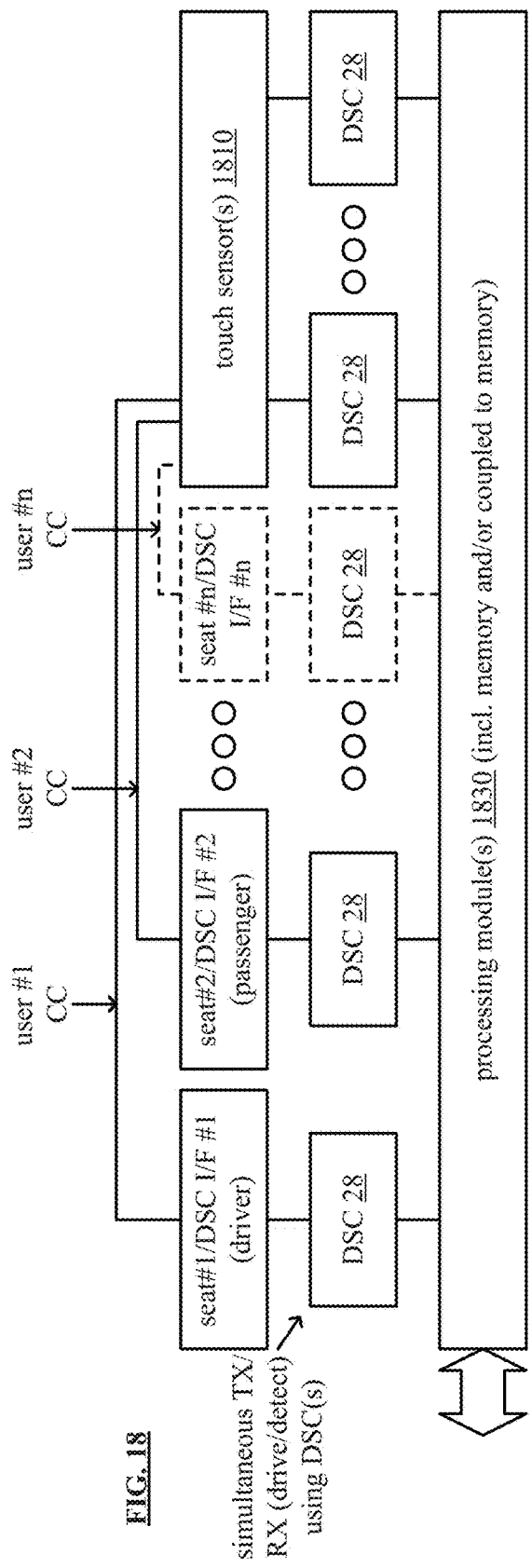
FIG. 18

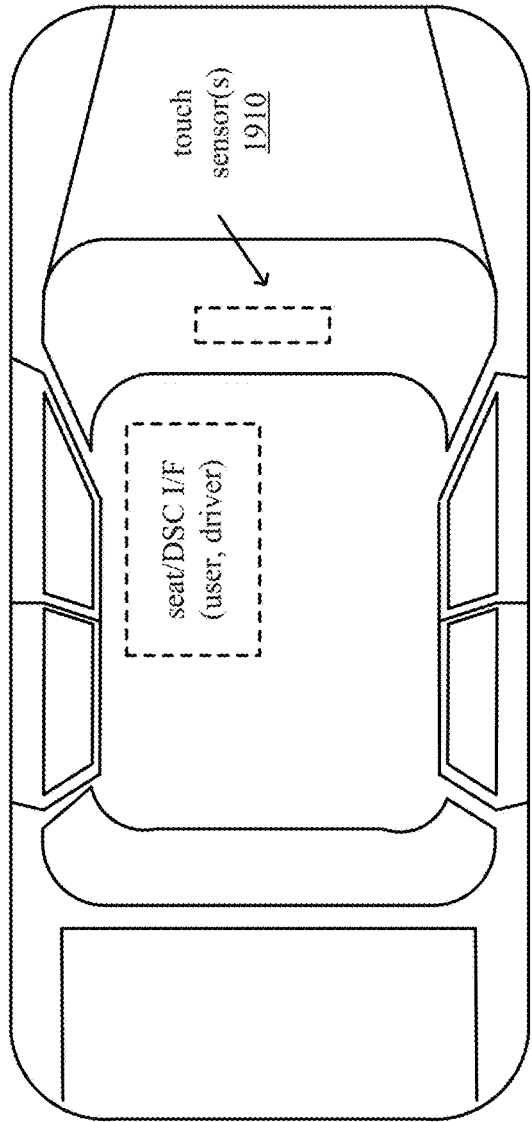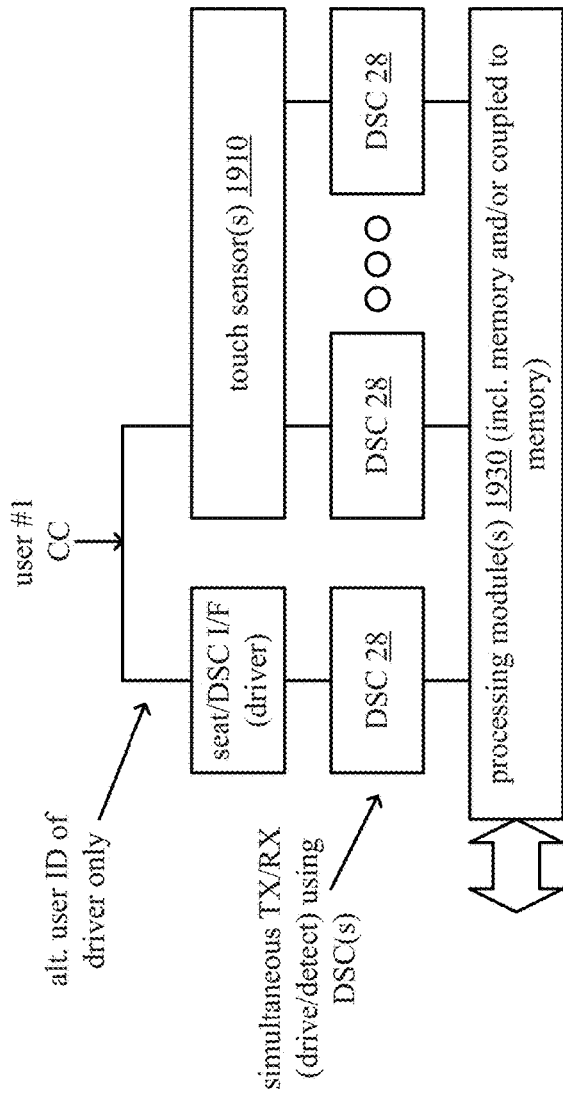
FIG. 19

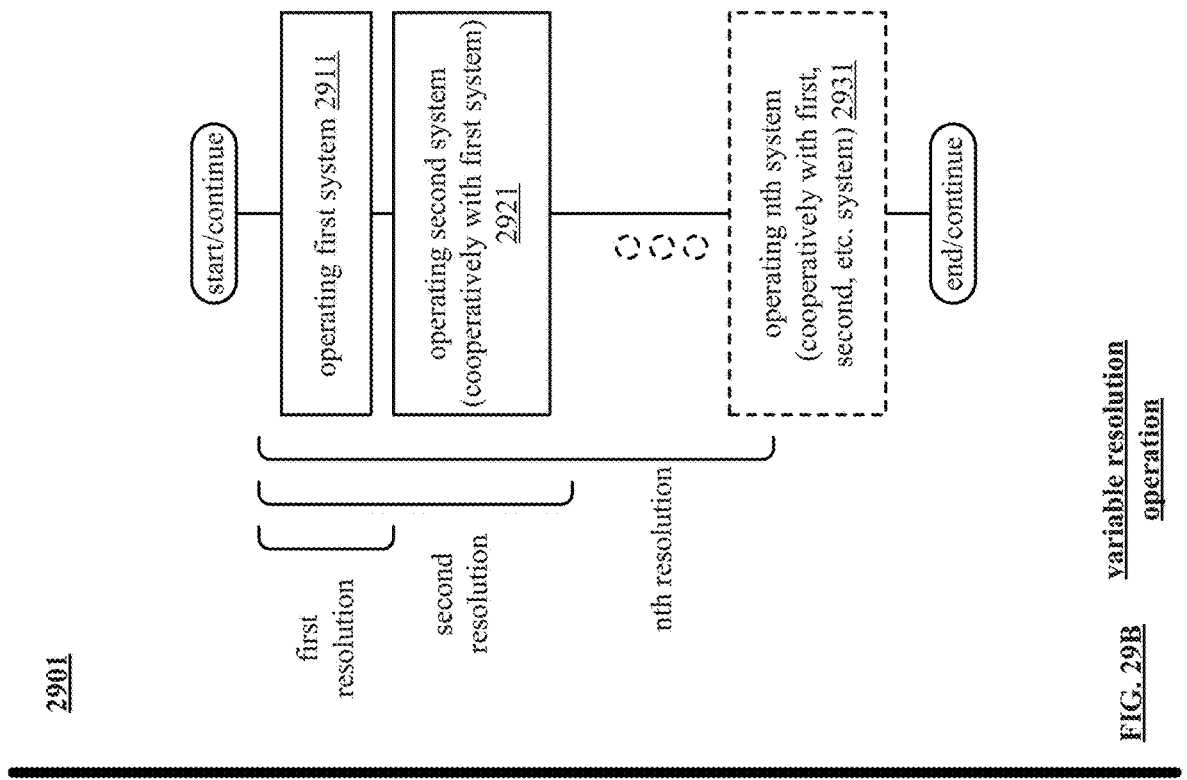
FIG. 29B  variable resolution operation
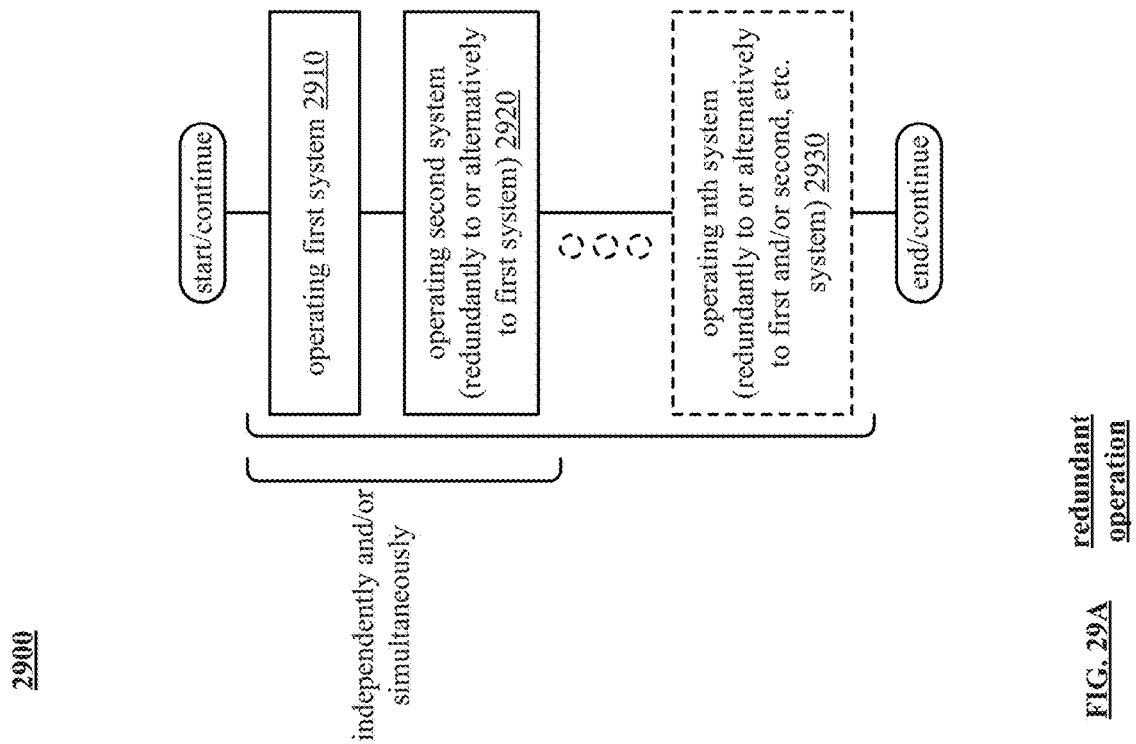
FIG. 29A  redundant operation

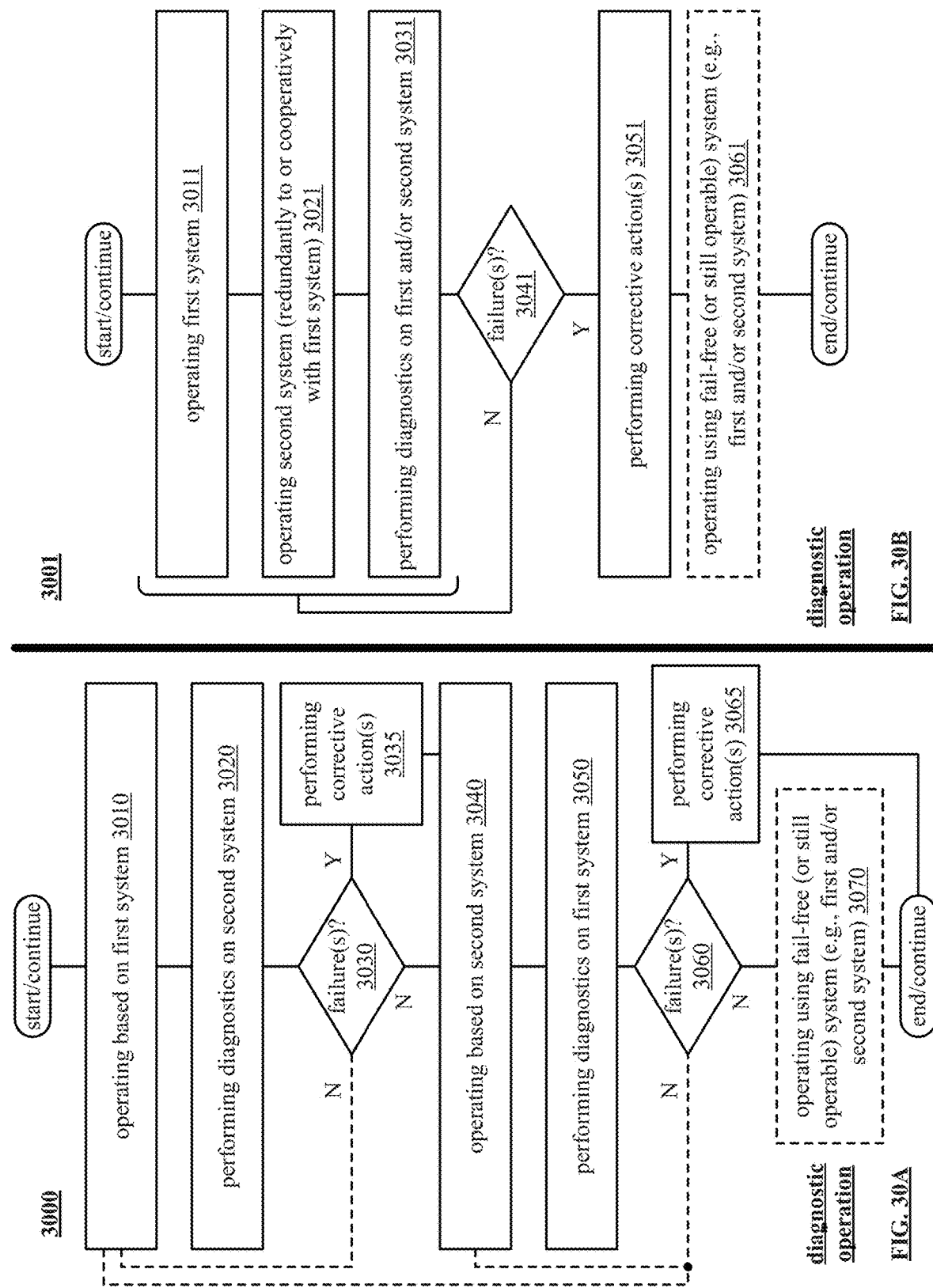

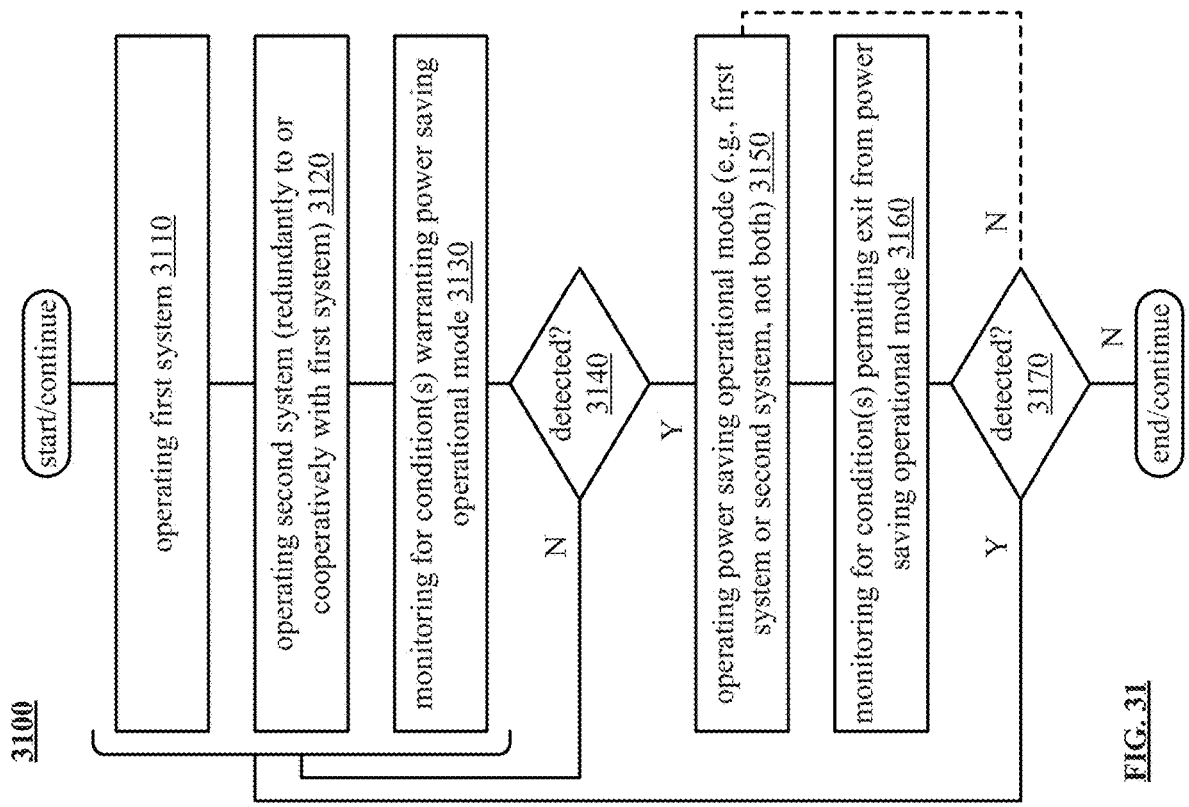

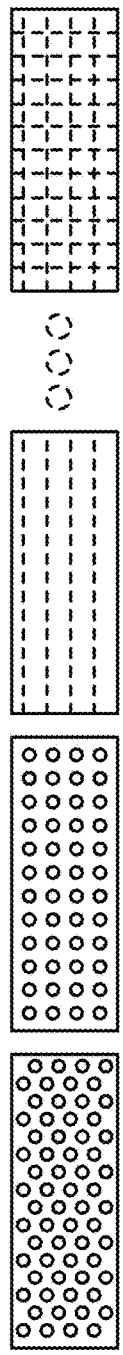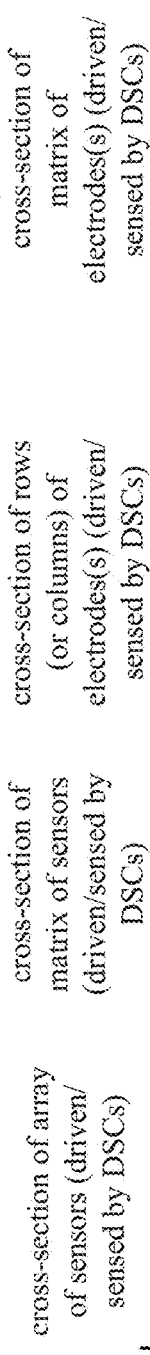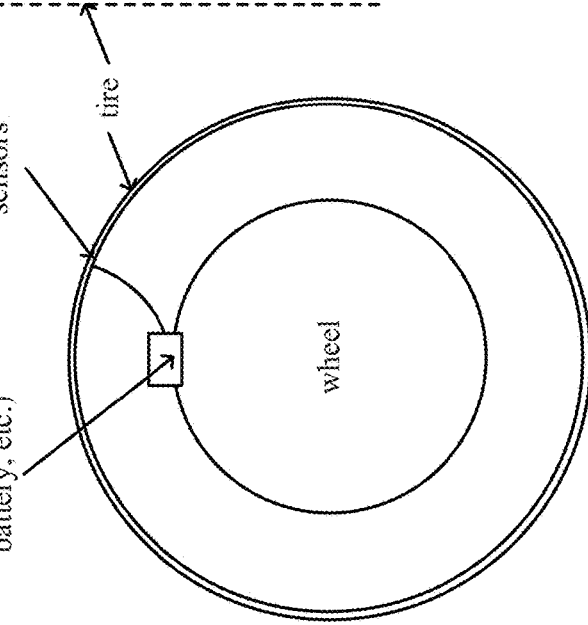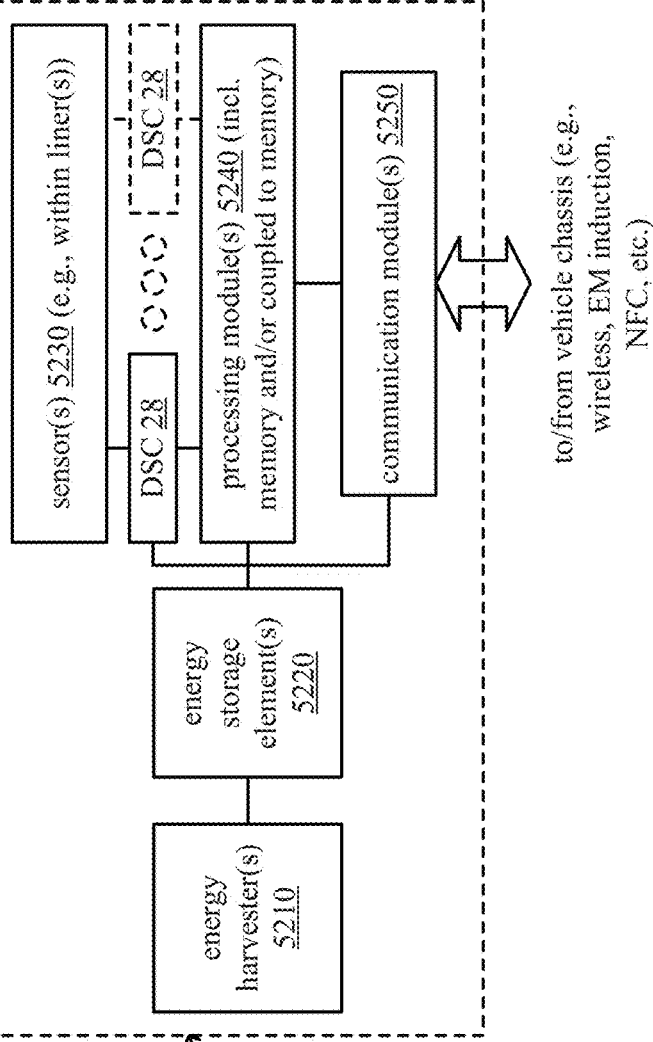
FIG. 52

USER-INTERACTIVE STEERING WHEEL

CROSS REFERENCE TO RELATED PATENTS

The present U.S. Utility patent application claims priority pursuant to 35 U.S.C. § 120 as a continuation of U.S. Utility application Ser. No. 17/082,616, entitled "IDENTIFICATION IN TOUCH SYSTEMS," filed Oct. 28, 2020, which is a continuation of U.S. Utility application Ser. No. 16/131,990, entitled "IDENTIFICATION IN TOUCH SYSTEMS," filed Sep. 14, 2018, now issued as U.S. Pat. No. 10,845,985 on Nov. 24, 2020, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touchscreens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 6 is a schematic block diagram of a drive center circuit in accordance with the present invention;

FIG. 6A is a schematic block diagram of another embodiment of a drive sense circuit in accordance with the present invention;

FIG. 7 is an example of a power signal graph in accordance with the present invention;

FIG. 8 is an example of a sensor graph in accordance with the present invention;

FIG. 12 is a schematic block diagram of an embodiment of a power signal change detection circuit in accordance with the present invention;

FIG. 13 is a schematic block diagram of another embodiment of a drive-sense circuit in accordance with the present invention;

FIG. 14 is a schematic block diagram of an embodiment of a user identification capable touch sensor implemented with e-pens in accordance with the present invention;

FIG. 16 is a schematic block diagram of an embodiment of a user identification capable touch sensor implemented with seats associated with users in accordance with the present invention;

FIG. 17 is a schematic block diagram of an embodiment of a user identification capable touch sensor implemented with drive-sense circuit interfaces associated with users in accordance with the present invention;

FIG. 18 is a schematic block diagram of an embodiment of a user identification capable touch sensor implemented within an automobile in accordance with the present invention;

FIG. 19 is a schematic block diagram of another embodiment of a user identification capable touch sensor implemented within an automobile in accordance with the present invention;

FIG. 29A is a schematic block diagram of another embodiment of a method for execution by one or more devices in accordance with the present invention;

FIG. 29B is a schematic block diagram of another embodiment of a method for execution by one or more devices in accordance with the present invention;

FIG. 30A is a schematic block diagram of another embodiment of a method for execution by one or more devices in accordance with the present invention;

FIG. 30B is a schematic block diagram of another embodiment of a method for execution by one or more devices in accordance with the present invention;

FIG. 31 is a schematic block diagram of another embodiment of a method for execution by one or more devices in accordance with the present invention;

FIG. 52 is a schematic block diagram of another embodiment of a tire monitoring system in accordance with the present invention;

DETAILED DESCRIPTION OF THE INVENTION

Figure 1:
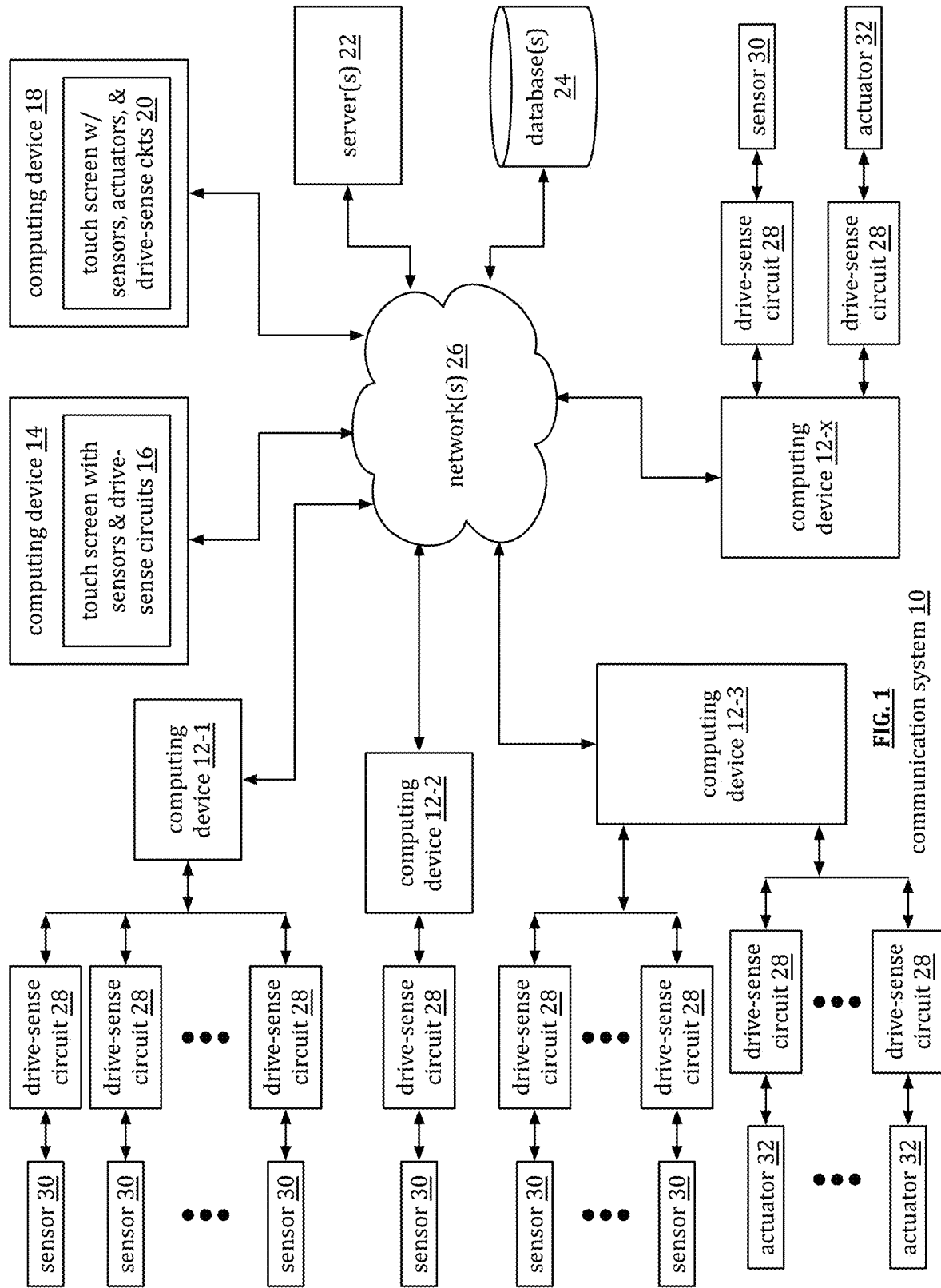
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a stand-alone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
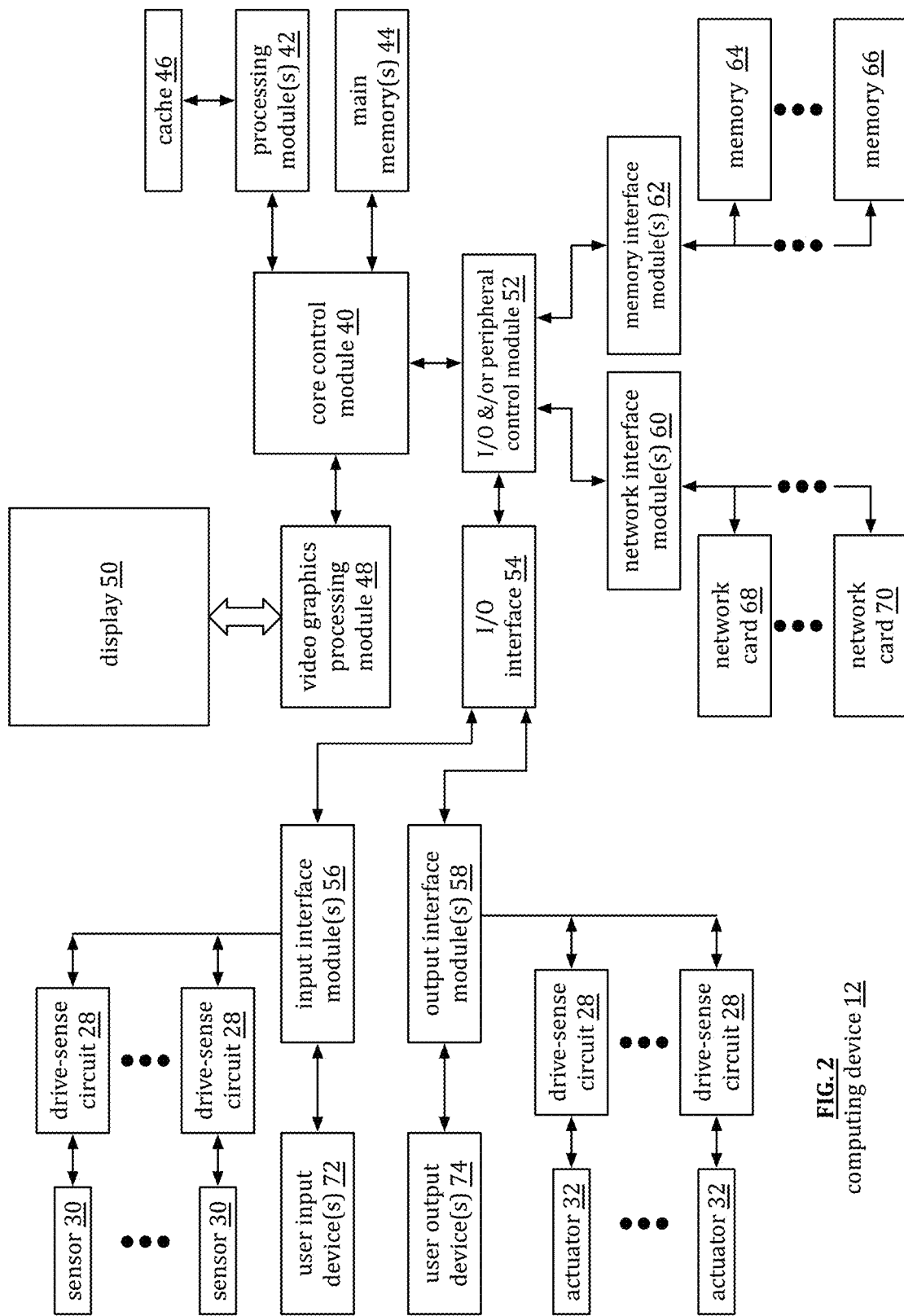
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 (4th generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
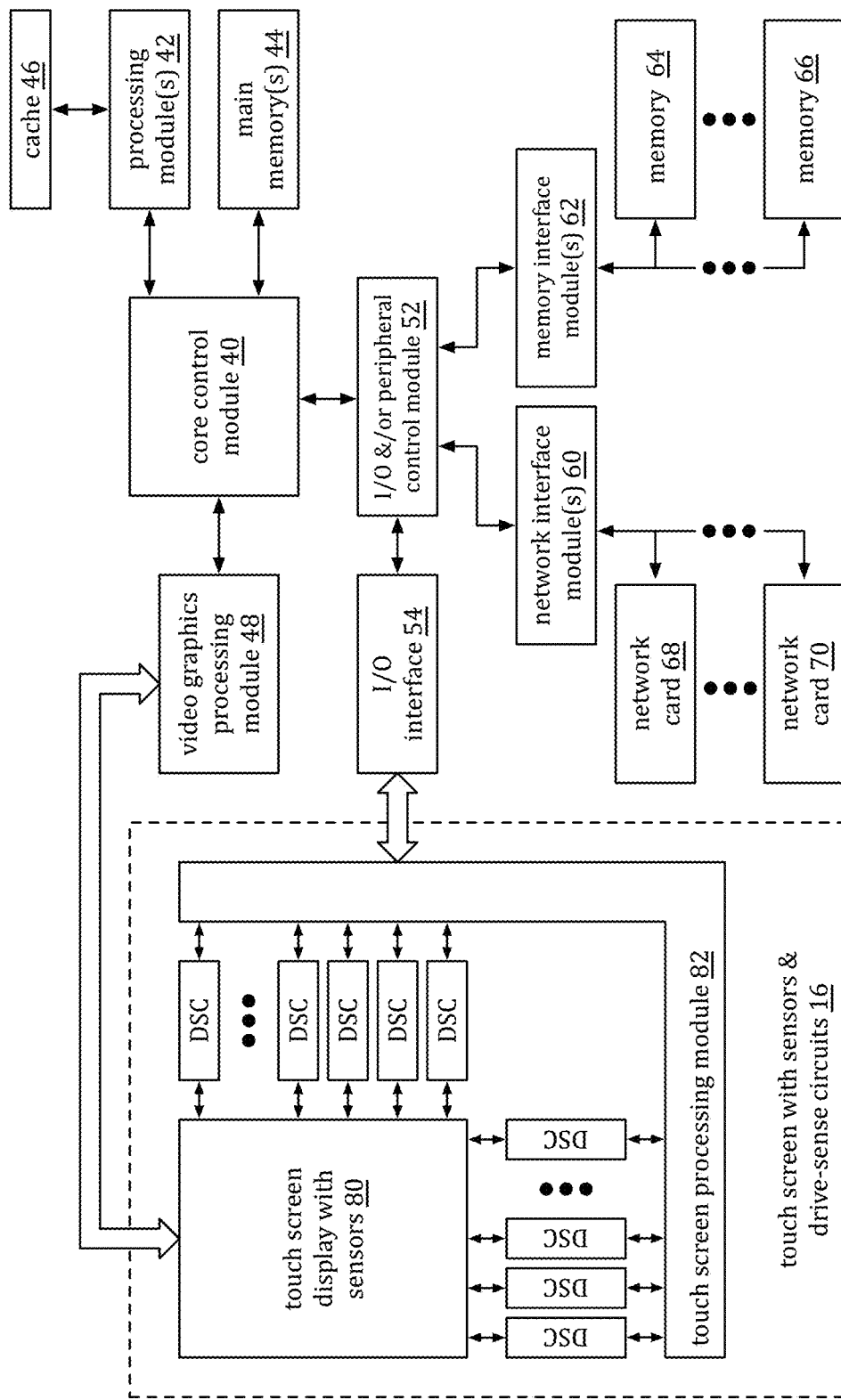
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touch screen 16, an Input-Output (I/O) peripheral control module 52, one or more input interface modules 56, one or more output interface modules 58, one or more network interface modules 60, and one or more memory interface modules 62. The touch screen 16 includes a touch screen display 80, a plurality of sensors 30, a plurality of drive-sense circuits (DSC), and a touch screen processing module 82.

Computing device 14 operates similarly to computing device 12 of FIG. 2 with the addition of a touch screen as an input device. The touch screen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
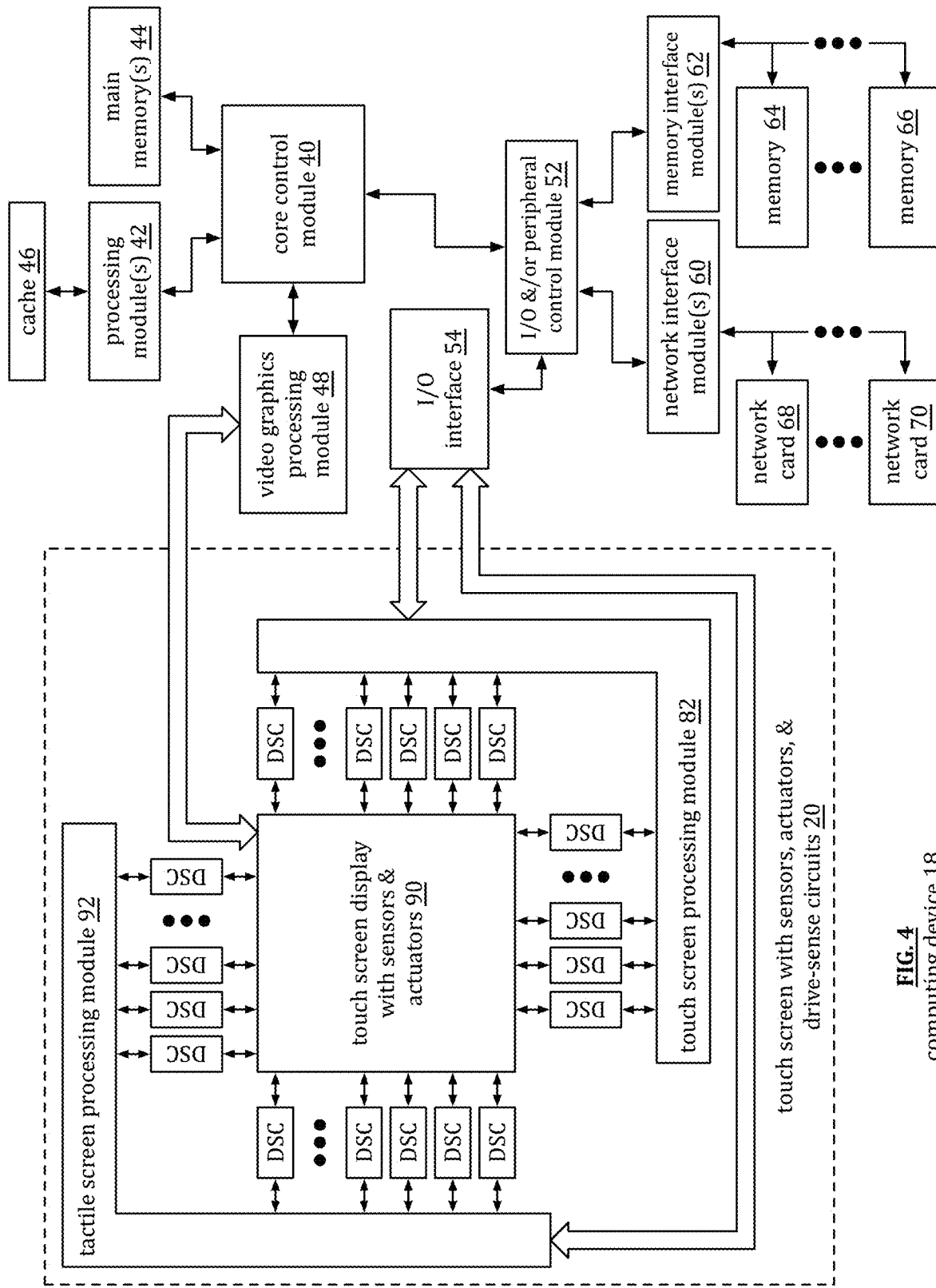
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5A:
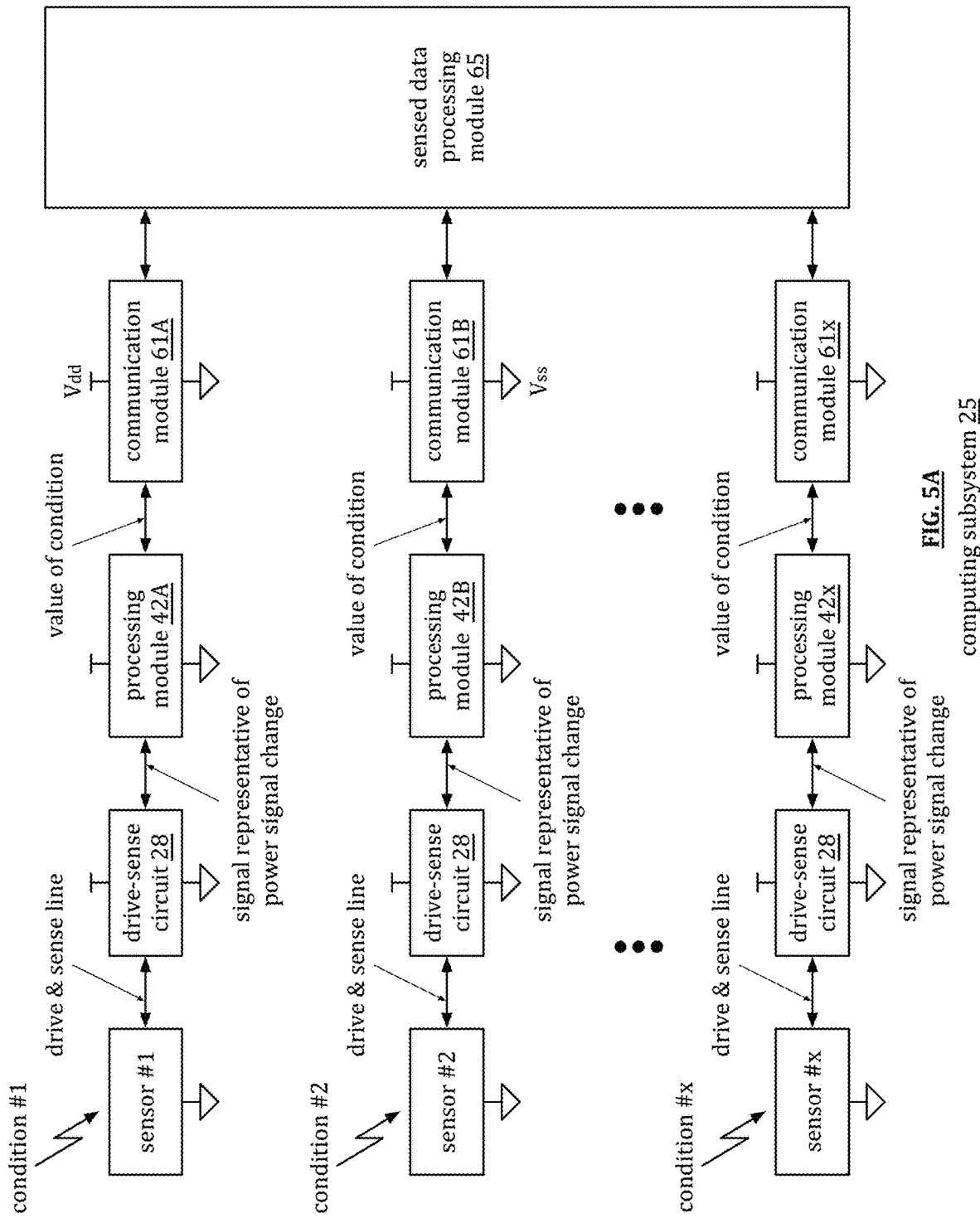
FIG. 5A is a schematic plot diagram of a computing subsystem in accordance with the present invention.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one or more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

Figure 5B:
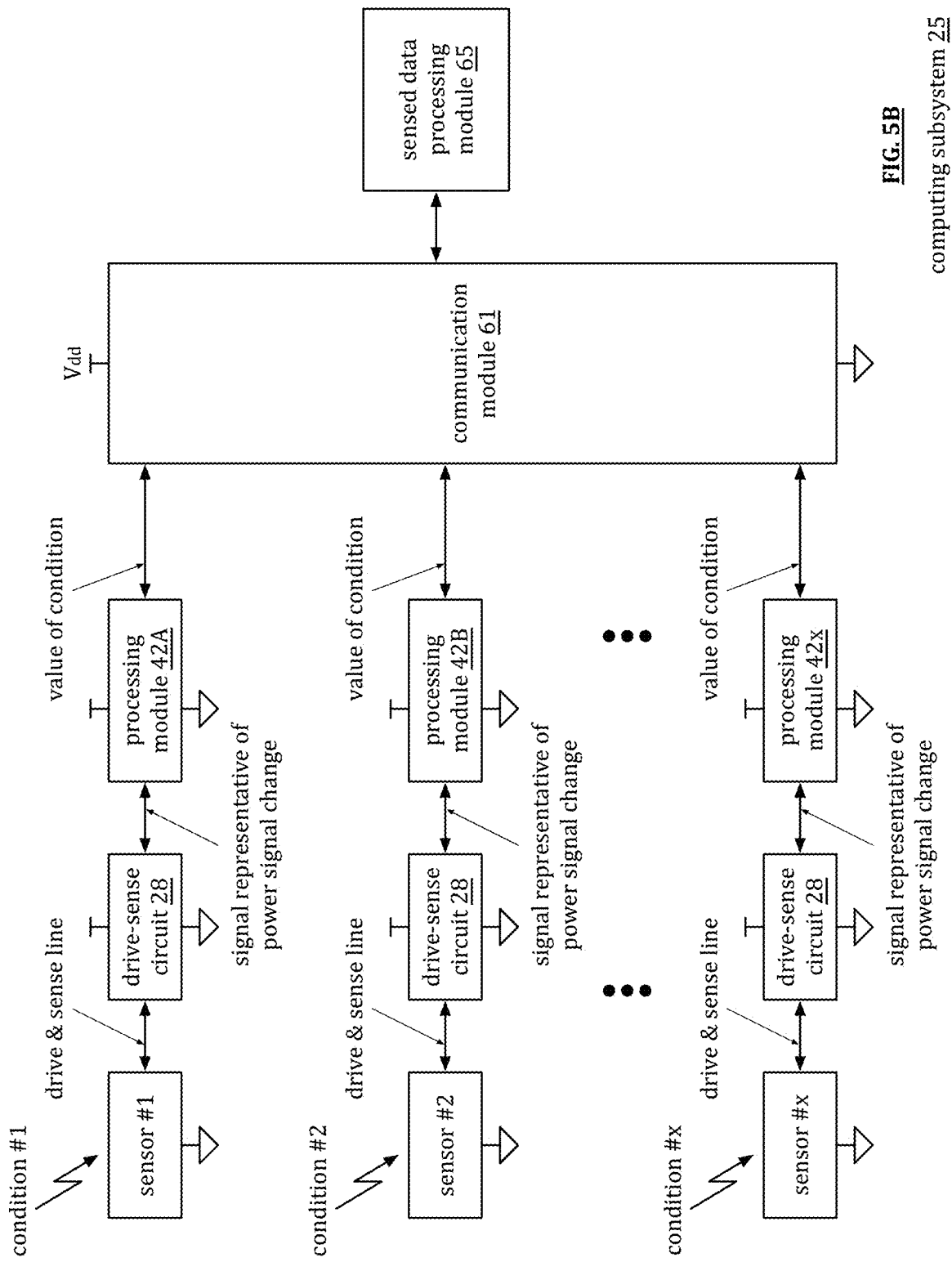
FIG. 5B is a schematic block diagram of another embodiment of a computing subsystem in accordance with the present invention.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

Figure 5C:
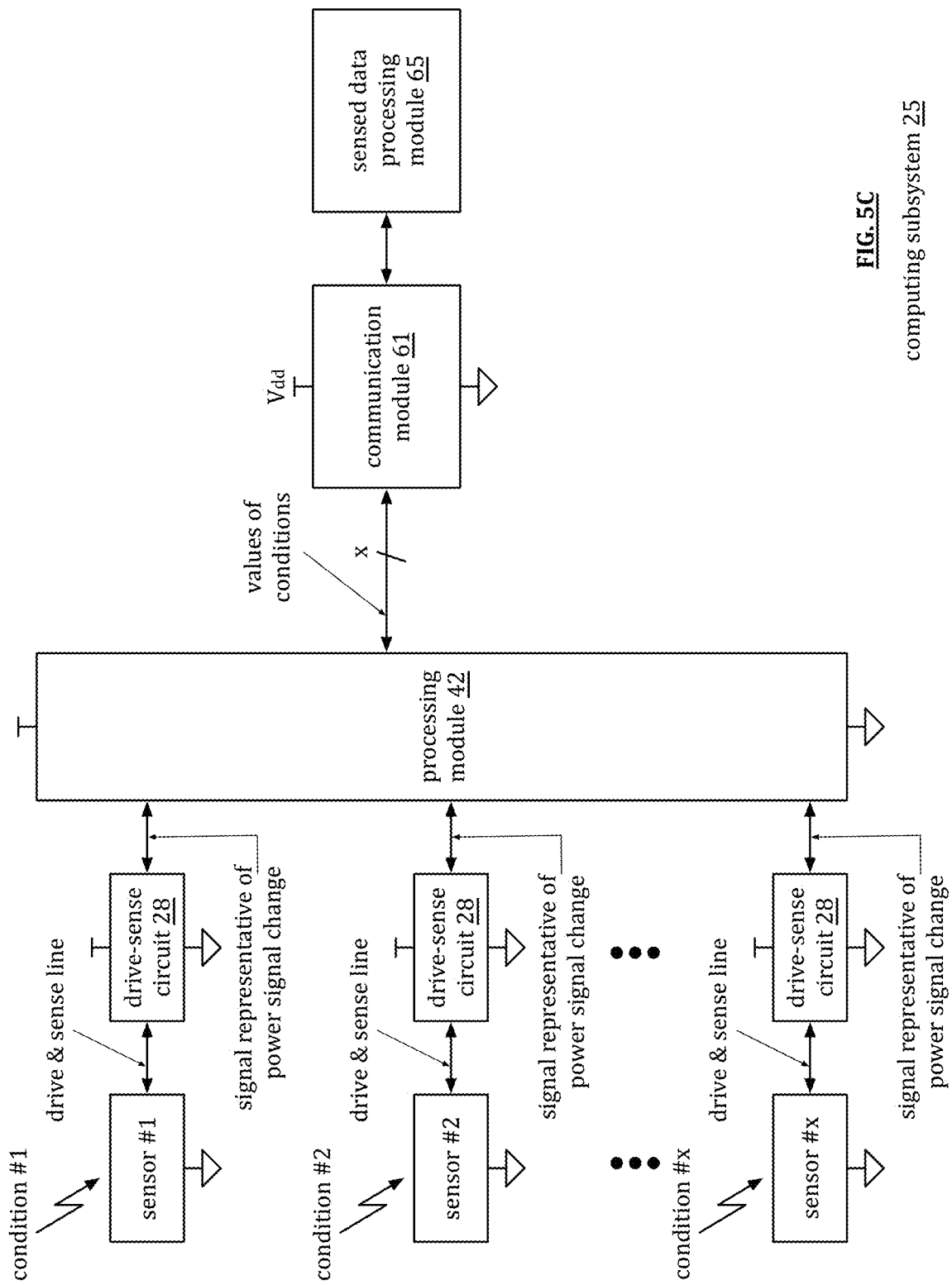
FIG. 5C is a schematic block diagram of another embodiment of a computing subsystem in accordance with the present invention.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
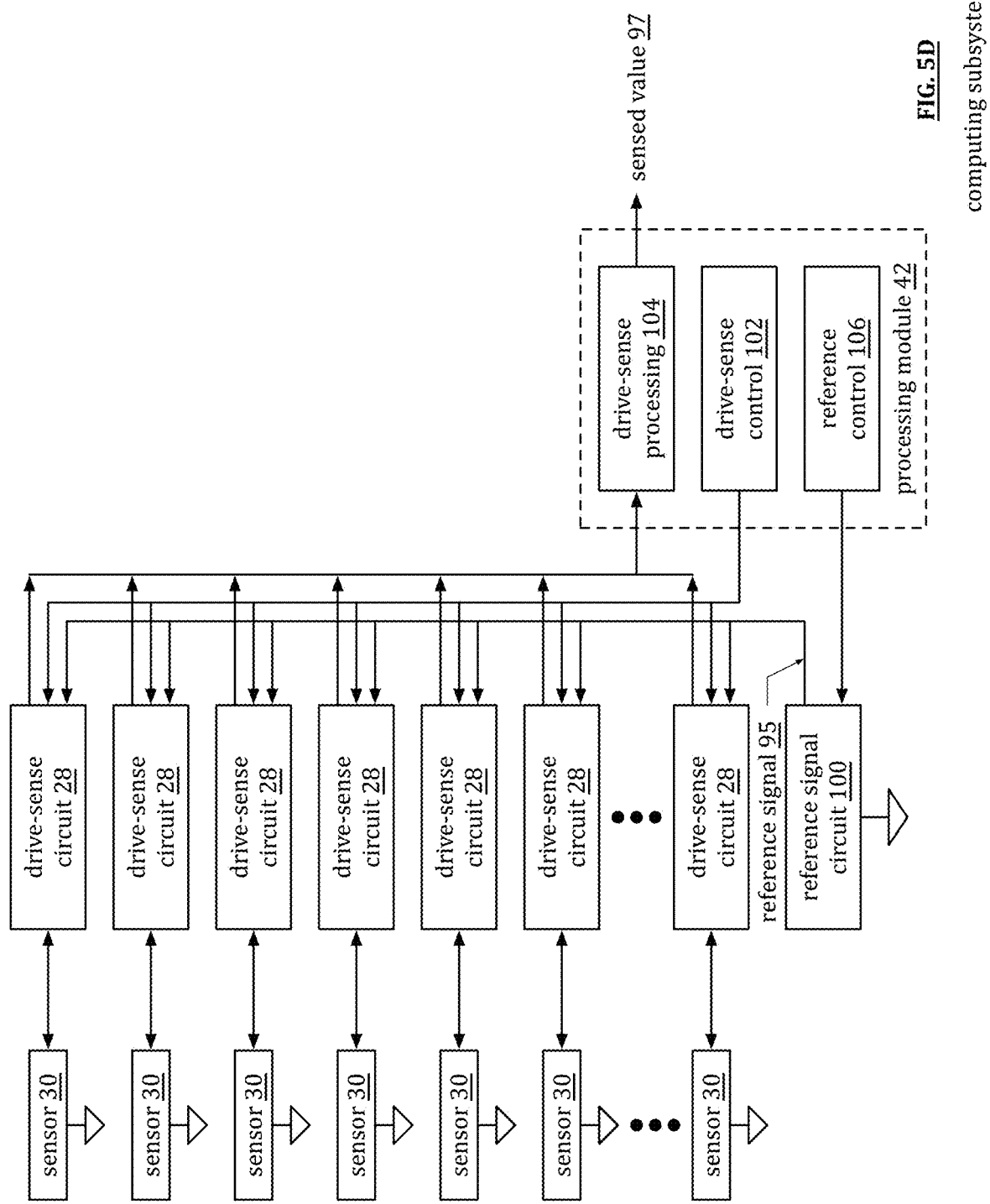
FIG. 5D is a schematic block diagram of another embodiment of a computing subsystem in accordance with the present invention.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
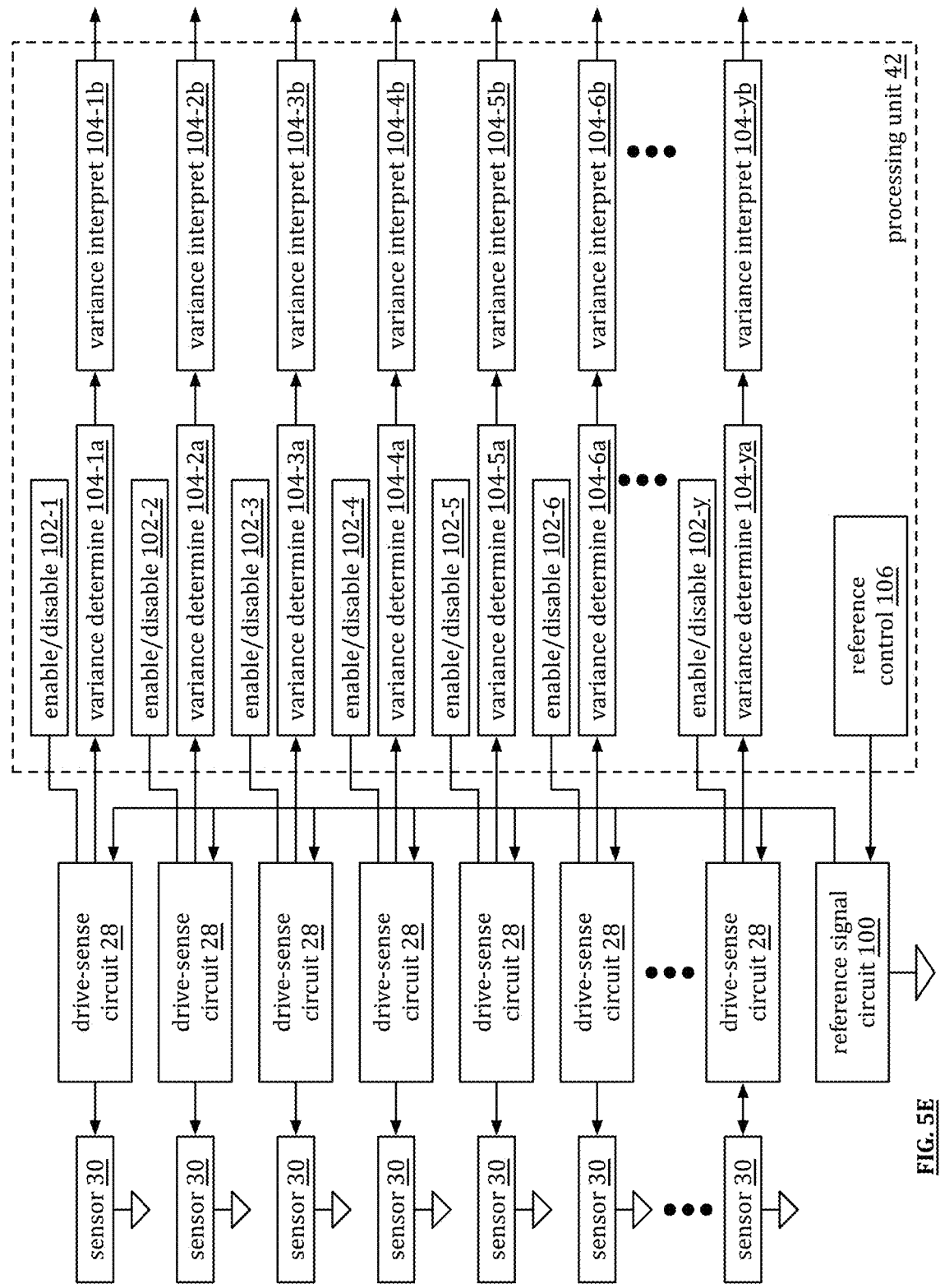
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256) =25+33.6=58.6 degrees Celsius.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms.

The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
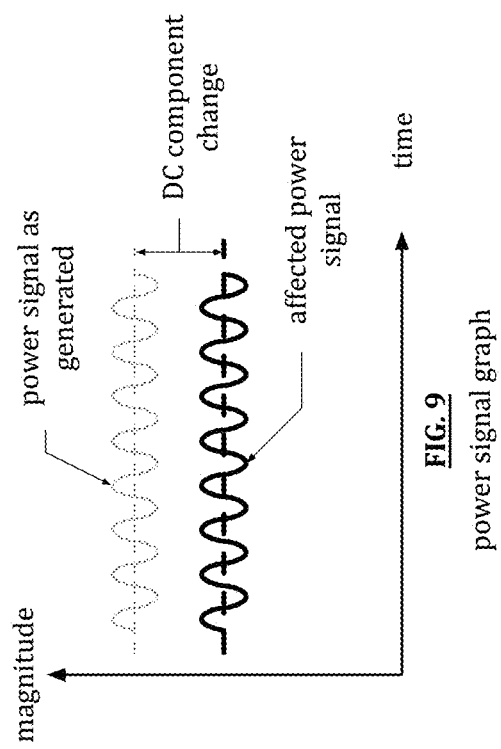
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
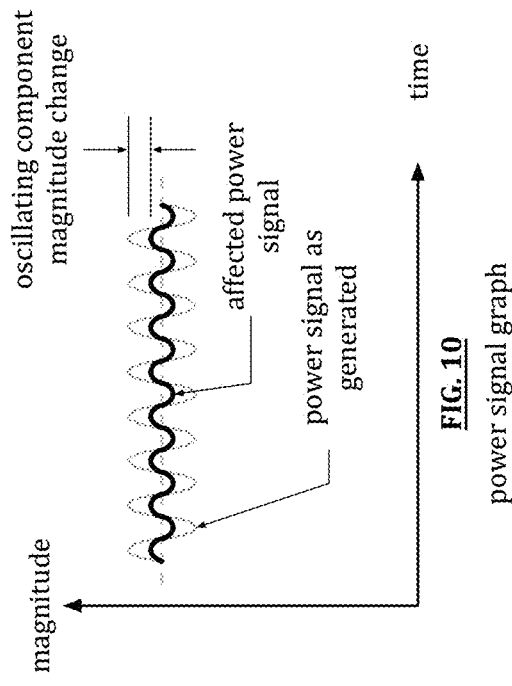
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11A:
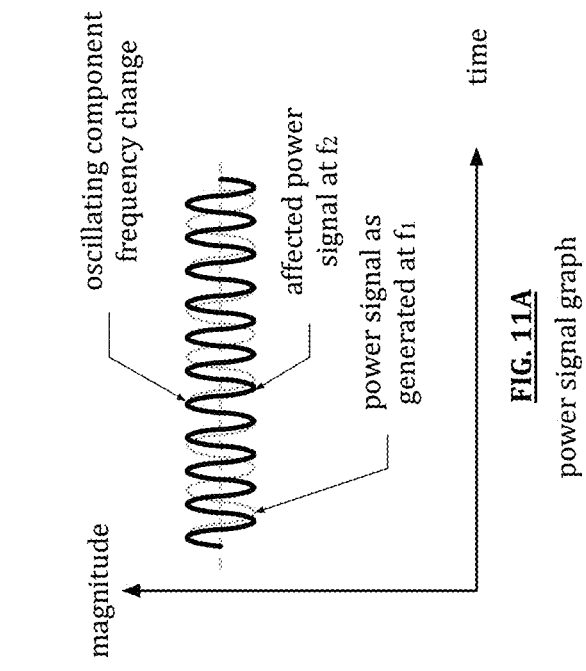
FIG. 11A is a schematic block diagram of another example of a power signal graph in accordance with the present invention.
Figure 11:
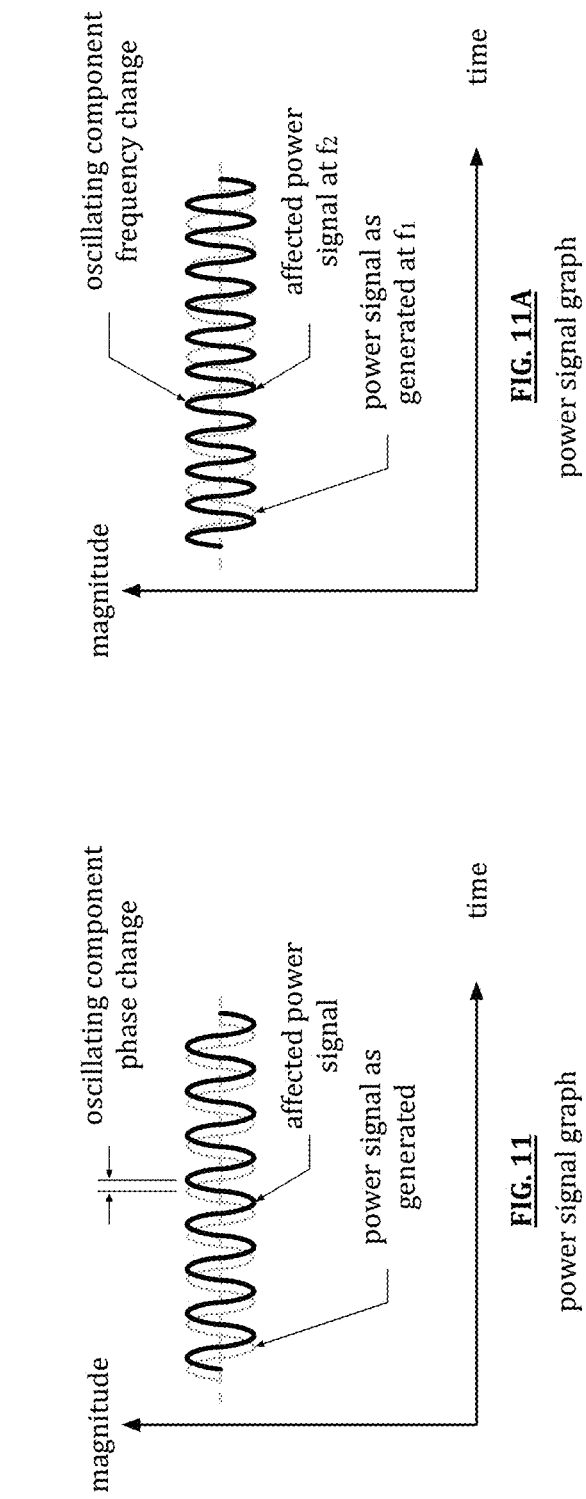
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits are described in U.S. Utility patent application Ser. No. 16/113,379, entitled "DRIVE SENSE CIRCUIT WITH DRIVE-SENSE LINE," filed Aug. 27, 2018, pending. Any instantiation of a drive-sense circuit as described herein may be implemented using any of the various implementations of various drive-sense circuits described in U.S. Utility patent application Ser. No. 16/113, 379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing module (e.g., one or more controllers) such that the one or more DSC is/are directed by the one or more processing modules regarding which frequency or frequencies and/or which other one or more characteristics of the one or more signals to use at one or more respective times and/or in one or more particular situations.

FIG. 14 is a schematic block diagram of an embodiment 1400 of a user identification capable touch sensor implemented with e-pens (electronic-pens) in accordance with the present invention. A touch sensor system includes one or more touch sensors 1410. The one or more touch sensors 1410 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. Note that such interaction of a user with a touch sensor may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor). With respect to the various embodiments, implementations, etc. of various respective touch sensors as described herein, note that they may also be of any such variety of one or more types.

One example of such interaction it was with the one or more touch sensors 1410 is via capacitive coupling to a touch sensor. Such capacitive coupling may be achieved from a user, via a stylus, an active element such as an electronic pen (e-pen), and/or any other element implemented to perform capacitive coupling to the touch sensor. In some examples, note that the one or more touch sensors 1410 are also implemented to detect user interaction based on user touch (e.g., via capacitive coupling (CC) from a user, such as a user's finger, to the one or more touch sensors 1410).

At the top of the diagram, different respective users interact with one or more touch sensors 1410 using electronic pens (e-pens). The e-pens are implemented to transmit a signal that is detected by the one or more touch sensors 1410. When different respective signals are transmitted from the different respective e-pens, the one or more touch sensors 1410 is implemented to detect which of the e-pens (and correspondingly which of the users) is interacting with the one or more touch sensors 1410.

At the bottom of the diagram, one or more processing modules 1430 is coupled to drive-sense circuits (DSCs) 28. Note that the one or more processing modules 1430 may include integrated memory and/or be coupled to other memory. At least some of the memory stores operational instructions to be executed by the one or more processing modules 1430. A first group of one or more DSCs 28 is/are implemented to drive and simultaneously to sense respective one or more signals provided to the one or more touch sensors 1410.

In addition, a first DSC 28 is implemented to drive and simultaneously to sense a first pen signal to an e-pen #1. The e-pen #1 is associated with the user #1. A second DSC 28 is implemented to drive and simultaneously to sense a second pen signal to an e-pen #2. The e-pen #2 is associated with the user #2. Note that any number of additional DSCs implemented to drive and simultaneously sense additional pens signals to additional e-pens may also be implemented.

In an example of operation and implementation, user #1 uses the e-pen #1 to interact with the one or more touch sensors 1410. When doing so, the e-pen #1 transmits the first pen signal that is capacitively coupled via capacitive coupling (CC) to the one or more touch sensors 1410. The one or more processing modules 1430 is configured to detect the first pen signal via one or more of the DSCs 28 that are coupled between the one or more processing modules 1430 and the one or more touch sensors 1410. The one or more processing modules 1430 is configured to discriminate the first pen signal from the respective signals that are driven from the one or more of the DSCs 28 that are coupled between the one or more processing modules 1430 and the one or more touch sensors 1410. The one or more processing modules 1430 is configured to identify not only the interaction of an e-pen with the one or more touch sensors 1410, but also configured to identify which e-pen (e.g., and which e-pen associated with which respective user) is interacting with the one or more touch sensors 1410.

Figure 15:
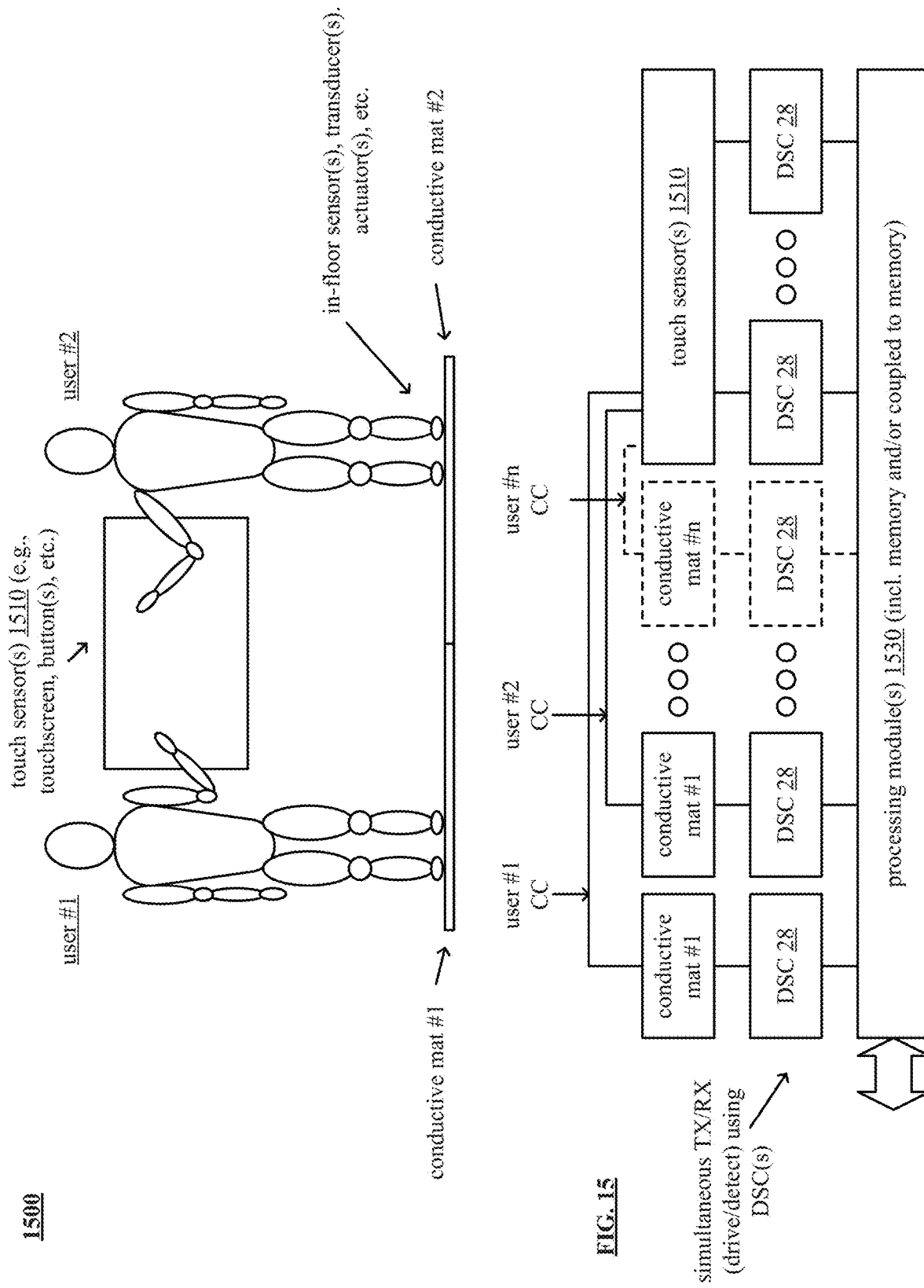
FIG. 15 is a schematic block diagram of an embodiment of a user identification capable touch sensor implemented with conductive mats associated with users in accordance with the present invention.

FIG. 15 is a schematic block diagram of an embodiment 1500 of a user identification capable touch sensor implemented with conductive mats associated with users in accordance with the present invention. Note that the conductive mats may be implemented in the floor in any of a variety of ways. The conductive mats may include one or more of an in-floor sensor, a transducer, an actuator, etc. A touch sensor system includes one or more touch sensors 1510. The one or more touch sensors 1510 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 1510 are implemented to detect user interaction based on user touch (e.g., via capacitive coupling (CC) from a user to the one or more touch sensors 1510).

At the top of the diagram, different respective users are associated with different respective conductive mats. A conductive mat is implemented to couple a signal via a user that is detected by the one or more touch sensors 1510. When different respective signals are transmitted from the different conductive mats, the one or more touch sensors 1510 is implemented to detect via which of the conductive mats this signal has been coupled (and correspondingly via which of the users this signal has been coupled). This allows the determination of which user is interacting with the one or more touch sensors 1510.

At the bottom of the diagram, one or more processing modules 1530 is coupled to drive-sense circuits (DSCs) 28. Note that the one or more processing modules 1530 may include integrated memory and/or be coupled to other memory. At least some of the memory stores operational instructions to be executed by the one or more processing modules 1530. A first group of one or more DSCs 28 is/are implemented to drive and simultaneously to sense respective one or more signals provided to the one or more touch sensors 1510.

In addition, a first DSC 28 is implemented to drive and simultaneously to sense a first user signal to conductive mat #1. The conductive mat #1 is associated with the user #1. A second DSC 28 is implemented to drive and simultaneously to sense a second user signal to conductive mat #2. The conductive mat #2 is associated with the user #2. Note that any number of additional DSCs implemented to drive and simultaneously sense additional user signals to additional conductive mats that may alternatively be associated with additional users may also be implemented.

In an example of operation and implementation, user #1 interacts with the one or more touch sensors 1510 when being associated with (e.g., standing on) conductive mat #1. When doing so, a first DSC 28 transmits a first user signal via conductive mat #1 that is capacitively coupled via capacitive coupling (CC) via the user #1 to the one or more touch sensors 1510. The one or more processing modules 1530 is configured to detect the first user signal via one or more of the DSCs 28 that are coupled between the one or more processing modules 1530 and the one or more touch sensors 1510. The one or more processing modules 1530 is configured to discriminate the first user signal from the respective signals that are driven from the one or more of the DSCs 28 that are coupled between the one or more processing modules 1530 and the one or more touch sensors 1510. The one or more processing modules 1530 is configured to identify not only the interaction of a user with the one or more touch sensors 1510, but also configured to identify which user (e.g., and which conductive mat associated with which respective user) is interacting with the one or more touch sensors 1510.

FIG. 16 is a schematic block diagram of an embodiment 1600 of a user identification capable touch sensor implemented with seats associated with users in accordance with the present invention. A touch sensor system includes one or more touch sensors 1610. The one or more touch sensors 1610 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 1610 are implemented to detect user interaction based on user touch (e.g., via capacitive coupling (CC) from a user to the one or more touch sensors 1610).

At the top of the diagram, different respective users are associated with different respective seats. A seat is implemented to couple a signal via a user that is detected by the one or more touch sensors 1610. When different respective signals are transmitted from the different seats, the one or more touch sensors 1610 is implemented to detect via which of the seats this signal has been coupled (and correspondingly via which of the users this signal has been coupled). This allows the determination of which user is interacting with the one or more touch sensors 1610.

At the bottom of the diagram, one or more processing modules 1630 is coupled to drive-sense circuits (DSCs) 28. Note that the one or more processing modules 1630 may include integrated memory and/or be coupled to other memory. At least some of the memory stores operational instructions to be executed by the one or more processing modules 1630. A first group of one or more DSCs 28 is/are implemented to drive and simultaneously to sense respective one or more signals provided to the one or more touch sensors 1610.

In addition, a first DSC 28 is implemented to drive and simultaneously to sense a first user signal to seat #1. The seat #1 is associated with the user #1. A second DSC 28 is implemented to drive and simultaneously to sense a second user signal to seat #2. The seat #2 is associated with the user #2. Note that any number of additional DSCs implemented to drive and simultaneously sense additional user signals to additional seats that may alternatively be associated with additional users may also be implemented.

In an example of operation and implementation, user #1 interacts with the one or more touch sensors 1610 when being associated with (e.g., sitting in) seat #1. When doing so, a first DSC 28 transmits a first user signal via seat #1 that is capacitively coupled via capacitive coupling (CC) via the user #1 to the one or more touch sensors 1610. The one or more processing modules 1630 is configured to detect the first user signal via one or more of the DSCs 28 that are coupled between the one or more processing modules 1630 and the one or more touch sensors 1610. The one or more processing modules 1630 is configured to discriminate the first user signal from the respective signals that are driven from the one or more of the DSCs 28 that are coupled between the one or more processing modules 1630 and the one or more touch sensors 1610. The one or more processing modules 1630 is configured to identify not only the interaction of a user with the one or more touch sensors 1610, but also configured to identify which user (e.g., and which seat associated with which respective user) is interacting with the one or more touch sensors 1610.

FIG. 17 is a schematic block diagram of an embodiment 1700 of a user identification capable touch sensor implemented with drive-sense circuit interfaces associated with users in accordance with the present invention. A touch sensor system includes one or more touch sensors 1710. The one or more touch sensors 1710 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 1710 are implemented to detect user interaction based on user touch (e.g., via capacitive coupling (CC) from a user to the one or more touch sensors 1710).

At the top of the diagram, different respective users are associated with different drive-sense circuit interfaces (DSC I/F). A DSC I/F is implemented to couple a signal via a user that is detected by the one or more touch sensors 1710. Examples of such DSC I/F include any means by which a signal may be coupled via a user. Examples of a DSC I/F include one or more of a pen, a conductive mat, a seat, a seat belt, a cell phone, a smart phone, a key fob, a watch, an active wrist-band, a personal digital assistant (PDA), or a clip-on element. In some examples, note that the DSC I/F includes a DSC 28 therein (e.g., a DSC I/F includes a DSC 28 therein that is configured to transmit a signal via a user that is detected by the one or more touch sensors 1710). In general, a DSC I/F may be viewed as any element, component, etc. that is configured to couple a signal via a user that is detected by the one or more touch sensors 1710. In some examples, such coupling is via capacitive coupling (CC) from the DSC I/F to the user.

When different respective signals are transmitted from the different DSC I/Fs, the one or more touch sensors 1710 is implemented to detect via which of the DSC I/Fs this signal has been coupled (and correspondingly via which of the users this signal has been coupled). This allows the determination of which user is interacting with the one or more touch sensors 1710.

At the bottom of the diagram, one or more processing modules 1730 is coupled to drive-sense circuits (DSCs) 28. Note that the one or more processing modules 1730 may include integrated memory and/or be coupled to other memory. At least some of the memory stores operational instructions to be executed by the one or more processing modules 1730. A first group of one or more DSCs 28 is/are implemented to drive and simultaneously to sense respective one or more signals provided to the one or more touch sensors 1710.

In addition, a first DSC 28 is implemented to drive and simultaneously to sense a first user signal to DSC I/F #1. The DSC I/F #1 is associated with the user #1. A second DSC 28 is implemented to drive and simultaneously to sense a second user signal to DSC I/F #2. The DSC I/F #2 is associated with the user #2. Note that any number of additional DSCs implemented to drive and simultaneously sense additional user signals to additional DSC I/Fs that may alternatively be associated with additional users may also be implemented.

In an example of operation and implementation, user #1 interacts with the one or more touch sensors 1710 when being associated with DSC I/F #1. When doing so, a first DSC 28 transmits a first user signal via DSC I/F #1 that is capacitively coupled via capacitive coupling (CC) via the user #1 to the one or more touch sensors 1710. The one or more processing modules 1730 is configured to detect the first user signal via one or more of the DSCs 28 that are coupled between the one or more processing modules 1730 and the one or more touch sensors 1710. The one or more processing modules 1730 is configured to discriminate the first user signal from the respective signals that are driven from the one or more of the DSCs 28 that are coupled between the one or more processing modules 1730 and the one or more touch sensors 1710. The one or more processing modules 1730 is configured to identify not only the interaction of a user with the one or more touch sensors 1710, but also configured to identify which user (e.g., and which DSC I/F associated with which respective user) is interacting with the one or more touch sensors 1710.

In an example of operation and implementation, a touch sensor system includes a plurality of touch sensors, a plurality of drive-sense circuits operably coupled to the plurality of touch sensors, memory that stores operational instructions, and a processing module operably coupled to the drive-sense circuit of the plurality of drive-sense circuits and to the memory.

When enabled, a drive-sense circuit of the plurality of drive-sense circuits is configured to drive a first signal via a single line coupling to a touch sensor of the plurality of touch sensors and simultaneously sense, via the single line, the first signal and, when present, a second signal coupled to the touch sensor of the plurality of touch sensors, wherein the second signal is uniquely associated with a user. The drive-sense circuit of the plurality of drive-sense circuits is also configured to process at least one of the first signal or the second signal to generate a digital signal that is representative of an electrical characteristic of the touch sensor of the plurality of touch sensors.

The processing module, when enabled, is configured to execute the operational instructions to process the digital signal to detect interaction of the user with the touch sensor. Also, the processing module, when enabled, is configured to execute the operational instructions to determine whether the interaction of the user with the touch sensor compares favorably with authorization. Based on unfavorable comparison of the interaction of the user with the touch sensor with the authorization, the processing module, when enabled, is configured to execute the operational instructions to abort execution of one or more operations associated with the interaction of the user with the touch sensor.

Alternatively, based on favorable comparison of the interaction of the user with the touch sensor with the authorization, the processing module, when enabled, is configured to execute the operational instructions to facilitate execution of the one or more operations associated with the interaction of the user with the touch sensor.

In some examples, the drive-sense circuit of the plurality of drive-sense circuits, when enabled, is further configured to drive the first signal via the single line coupling to the touch sensor of the plurality of touch sensors and simultaneously sense, via the single line, the first signal and, when present, a third signal coupled to the touch sensor of the plurality of touch sensors, wherein the third signal is uniquely associated with another user and to process at least one of the first signal, the second signal, or the third signal to generate the digital signal that is representative of the electrical characteristic of the touch sensor of the plurality of touch sensors. The processing module, when enabled, is further configured to execute the operational instructions to process the digital signal to detect other interaction of the other user with the touch sensor, determine whether the other interaction of the other user with the touch sensor compares favorably with authorization.

Based on unfavorable comparison of the other interaction of the other user with the touch sensor with the authorization, the processing module, when enabled, is configured to abort execution of one or more other operations associated with the other interaction of the other user with the touch sensor. Alternatively, based on favorable comparison of the other interaction of the other user with the touch sensor with the authorization, the processing module, when enabled, is configured to facilitate execution of the one or more other operations associated with the other interaction of the other user with the touch sensor.

In even other examples, another drive-sense circuit of the plurality of drive-sense circuits, when enabled, is configured to drive a third signal via another single line coupling to another touch sensor of the plurality of touch sensors and simultaneously sense, via the other single line, the third signal and, when present at a time that is different than when the second signal is present and sensed via the single line by the drive-sense circuit of the plurality of drive-sense circuits, the second signal coupled to the other touch sensor of the plurality of touch sensors and to process at least one of the third signal or the second signal to generate another digital signal that is representative of another electrical characteristic of the other touch sensor of the plurality of touch sensors.

The processing module, when enabled, is further configured to execute the operational instructions to process the other digital signal to detect other interaction of the user with the other touch sensor and to determine an angle of approach of the user to the touch sensor system based on the interaction of the user with the touch sensor and the other interaction of the user with the other touch sensor.

Note that the touch sensor system may be implemented using a variety of means include any one or more of a touchscreen, a button, an electrode, an external controller, rows of electrodes, columns of electrodes, a matrix of buttons, and/or an array of buttons.

In addition, in some examples, the drive-sense circuit of the plurality of drive-sense circuits further includes a power source circuit operably coupled to the touch sensor of the plurality of touch sensors via the single line, wherein, when enabled, the power source circuit is configured to provide the first signal that includes an analog signal via the single line coupling to the touch sensor of the plurality of touch sensors, and wherein the analog signal includes at least one of a DC (direct current) component or an oscillating component. The drive-sense circuit of the plurality of drive-sense circuits further includes a power source change detection circuit operably coupled to the power source circuit.

When enabled, the power source change detection circuit is configured to detect an effect on the analog signal that is based on the electrical characteristic of the touch sensor of the plurality of touch sensors and to generate the digital signal that is representative of the electrical characteristic of the touch sensor of the plurality of touch sensors.

In some examples, the power source circuit includes a power source to source at least one of a voltage or a current to the touch sensor of the plurality of touch sensors via the single line. In some examples, the power source change detection circuit includes a power source reference circuit configured to provide at least one of a voltage reference or a current reference, and a comparator configured to compare the at least one of the voltage and the current provided to the touch sensor of the plurality of touch sensors to the at least one of the voltage reference and the current reference to produce the analog signal.

In addition, in some examples, note that another drive-sense circuit of the plurality of drive-sense circuits, when enabled, configured to couple the second signal to the user via a drive-sense circuit interface that includes at least one of a pen, a conductive mat, a seat, a seat belt, a cell phone, a smart phone, a key fob, a watch, an active wrist-band, a personal digital assistant (PDA), or a clip-on element, and/or any other element via which a signal may be coupled via a user via capacitively coupling (CC) to one or more touch sensors.

FIG. 18 is a schematic block diagram of an embodiment 1800 of a user identification capable touch sensor implemented within an automobile in accordance with the present invention. A touch sensor system includes one or more touch sensors 1810. The one or more touch sensors 1810 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 1810 are implemented to detect user interaction based on user touch (e.g., via capacitive coupling (CC) from a user to the one or more touch sensors 1810).

At the top of the diagram, different respective users are associated with seats in the vehicle and/or different drive-sense circuit interfaces (DSC I/F). A seat and/or DSC I/F is implemented to couple a signal via a user that is detected by the one or more touch sensors 1810. Examples of such DSC I/F include any means by which a signal may be coupled via a user. Examples of a DSC I/F include one or more of a pen, a conductive mat, a seat, a seat belt, a cell phone, a smart phone, a key fob, a watch, an active wrist-band, a personal digital assistant (PDA), or a clip-on element as described previously. In the context of the vehicle, any element within the vehicle that may be associated with a user may alternatively serve as a DSC I/F. For example, a seat within a vehicle may include various types of wiring, electronics, heating elements, cooling elements, actuators for seats positioning, a seatbelt, etc. Any such elements associated with the seat of the vehicle may serve as a DSC I/F. In an example of operation and implementation, a DSC is configured to transmit a signal via the DSC I/F, via a user, such that the signal is used to detect user interaction based on user touch (e.g., via capacitive coupling (CC) from a user to the one or more touch sensors 1810).

In some examples, note that the DSC I/F includes a DSC 28 therein (e.g., a DSC I/F includes a DSC 28 therein that is configured to transmit a signal via a user that is detected by the one or more touch sensors 1810). In general, a DSC I/F may be viewed as any element, component, etc. that is configured to couple a signal via a user that is detected by the one or more touch sensors 1810. In some examples, such coupling is via capacitive coupling (CC) from the DSC I/F to the user.

At the bottom of the diagram, one or more processing modules 1830 is coupled to drive-sense circuits (DSCs) 28. Note that the one or more processing modules 1830 may include integrated memory and/or be coupled to other memory. At least some of the memory stores operational instructions to be executed by the one or more processing modules 1830. A first group of one or more DSCs 28 is/are implemented to drive and simultaneously to sense respective one or more signals provided to the one or more touch sensors 1810.

In addition, a first DSC 28 is implemented to drive and simultaneously to sense a first user signal to seat #1 and/or DSC I/F #1. The seat #1 and/or DSC I/F #1 is associated with the user #1. A second DSC 28 is implemented to drive and simultaneously to sense a second user signal to seat #2 and/or DSC I/F #2. The seat #2 and/or DSC I/F #2 is associated with the user #2. Note that any number of additional DSCs implemented to drive and simultaneously sense additional user signals to additional seats and/or DSC I/Fs that may alternatively be associated with additional users may also be implemented.

In an example of operation and implementation, user #1 interacts with the one or more touch sensors 1810 when being associated with DSC I/F #1. When doing so, a first DSC 28 transmits a first user signal via DSC I/F #1 that is capacitively coupled via capacitive coupling (CC) via the user #1 to the one or more touch sensors 1810. The one or more processing modules 1830 is configured to detect the first user signal via one or more of the DSCs 28 that are coupled between the one or more processing modules 1830 and the one or more touch sensors 1810. The one or more processing modules 1830 is configured to discriminate the first user signal from the respective signals that are driven from the one or more of the DSCs 28 that are coupled between the one or more processing modules 1830 and the one or more touch sensors 1810. The one or more processing modules 1830 is configured to identify not only the interaction of a user with the one or more touch sensors 1810, but also configured to identify which user (e.g., and which DSC I/F associated with which respective user) is interacting with the one or more touch sensors 1810.

FIG. 19 is a schematic block diagram of another embodiment 1900 of a user identification capable touch sensor implemented within an automobile in accordance with the present invention. A touch sensor system includes one or more touch sensors 1910. The one or more touch sensors 1910 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 1910 are implemented to detect user interaction based on user touch (e.g., via capacitive coupling (CC) from a user to the one or more touch sensors 1910).

At the top of the diagram, a user is associated with a seat in the vehicle and/or a drive-sense circuit interfaces (DSC I/F). A seat and/or DSC I/F is implemented to couple a signal via the user that is detected by the one or more touch sensors 1910. Examples of such DSC I/F include any means by which a signal may be coupled via a user. Examples of a DSC I/F include one or more of a pen, a conductive mat, a seat, a seat belt, a cell phone, a smart phone, a key fob, a watch, an active wrist-band, a personal digital assistant (PDA), or a clip-on element as described previously. In the context of the vehicle, any element within the vehicle that may be associated with a user may alternatively serve as a DSC I/F. For example, a seat within a vehicle may include various types of wiring, electronics, heating elements, cooling elements, actuators for seats positioning, a seatbelt, passenger/driver detection functionality, etc. Any such elements associated with the seat of the vehicle may serve as a DSC I/F. In an example of operation and implementation, a DSC is configured to transmit a signal via the DSC I/F, via a user, such that the signal is used to detect user interaction based on user touch (e.g., via capacitive coupling (CC) from a user to the one or more touch sensors 1910).

In some examples, note that the DSC I/F includes a DSC 28 therein (e.g., a DSC I/F includes a DSC 28 therein that is configured to transmit a signal via a user that is detected by the one or more touch sensors 1910). In general, a DSC I/F may be viewed as any element, component, etc. that is configured to couple a signal via a user that is detected by the one or more touch sensors 1910. In some examples, such coupling is via capacitive coupling (CC) from the DSC I/F to the user.

At the bottom of the diagram, one or more processing modules 1930 is coupled to drive-sense circuits (DSCs) 28. Note that the one or more processing modules 1930 may include integrated memory and/or be coupled to other memory. At least some of the memory stores operational instructions to be executed by the one or more processing modules 1930. A first group of one or more DSCs 28 is/are implemented to drive and simultaneously to sense respective one or more signals provided to the one or more touch sensors 1910.

In addition, a first DSC 28 is implemented to drive and simultaneously to sense a first user signal to seat and/or DSC I/F. The seat and/or DSC I/F is associated with the user #1. In this diagram, only a single DSC/first DSC 28 is configured to couple a signal via a user via seat and/or DSC I/F to detect user interaction based on user touch (e.g., via capacitive coupling (CC) from the user to the one or more touch sensors 1910).

In an example of operation and implementation, the user interacts with the one or more touch sensors 1910 when being associated with seat and/or DSC I/F. When doing so, a first DSC 28 transmits a first user signal via DSC I/F that is capacitively coupled via capacitive coupling (CC) via the user to the one or more touch sensors 1910. The one or more processing modules 1930 is configured to detect the first user signal via one or more of the DSCs 28 that are coupled between the one or more processing modules 1930 and the one or more touch sensors 1910. The one or more processing modules 1930 is configured to discriminate the first user signal from the respective signals that are driven from the one or more of the DSCs 28 that are coupled between the one or more processing modules 1930 and the one or more touch sensors 1910. The one or more processing modules 1930 is configured to identify not only the interaction of a user with the one or more touch sensors 1910, but also configured to identify the user (e.g., and which DSC I/F associated with which respective user) is interacting with the one or more touch sensors 1910.

In automotive touch screen applications (e.g., such as with respect to FIG. 18 and/or FIG. 19), some features of the one or more touch sensors are disabled when the vehicle is in motion. This is a safety measure deigned to prevent driver distraction. The unique identification of users as described herein, e.g., the driver of the vehicle, allows for the discrimination of the driver from the passenger so that the passenger can interact with the one or more touch sensors while the vehicle is in motion while the driver cannot interact with the one or more touch sensor. This allows for the passenger to continue to interact with the one or more touch sensors while the driver is not permitted to do so.

Note that there may be some situations in which only identification of the driver is desirable (e.g., such as in FIG. 19). For example, there may be instances in which any user besides the driver of the vehicle is authorized to interact with the one or more touch sensors (e.g., while vehicle is in motion). However, such functionality may be included so that unique identification of each of the respective users within the vehicle is made (e.g., the driver, one or more passengers, etc.).

In an example of operation and implementation, a DSC 28 is configured to drive the signal that is transmitted via capacitive coupling (CC) to a user (e.g., the driver). Such capacitive coupling (CC) to the user may be implemented via any number of means including those described above. Note that the signal from the DSC 28 may operate at a unique frequency (or multiple frequencies independently or simultaneously). The frequency can hop on a pre-arranged pattern or a handshake may be established with a one or more processing modules 1930, and the DSC is directed by the one or more processing modules 1930 which frequency to use.

In some examples, the signal transmitted from the DSC 28 that is coupled via the user includes an Identifier (ID) code that is also broadcast providing multi-factor disambiguation. In certain examples, the DSC 28 is powered by an electronics power supply already in the seat of the vehicle (e.g., passenger detect, heated seats, power controls, etc.) For power efficiency, the broadcasting driver can be turned on (or even cycled only when there is a driver/passenger detected in the corresponding seat). The capacitive coupling (CC) coupling can be done through conductive fibers in the seat, a conductive pad inside the seat or any other means by which capacitively coupling (CC) couple via the user may be performed.

Also, in some examples, capacitive sensors in the driver and passenger seats are employed in a feedback loop to the one or more processing modules 1930. These sensors can be connected to the same one or more processing modules 1930 that is driving the on-board one or more touch sensors 1910. Initially, for power management, the seat sensors could be in a low power (or disconnected) state. When a user interacts with the one or more touch sensors 1910, the one or more processing modules 1930 activates the sensors in the seats using a unique frequency for the driver and passenger. If the touch on the one or more touch sensors 1910 is registered using the driver-assigned frequency, the one or more processing modules 1930 will not respond with a touch activation. If the touch is registered using the passenger frequency, touch events are reported by the one or more processing modules 1930. If both frequencies are registered, the touch one or more processing modules 1930 would not respond.

Note that there are many variations to such unique user identification techniques. In addition, as described in certain of the following diagrams, additional functionality may be included to identify one or more users uniquely alternatively to or in conjunction with the unique signaling being coupled via a user including detection of a user hovering over the one or more touch sensors, detection of the angle of approach by which a user is approaching the one or more touch sensors, etc.

Figure 20:
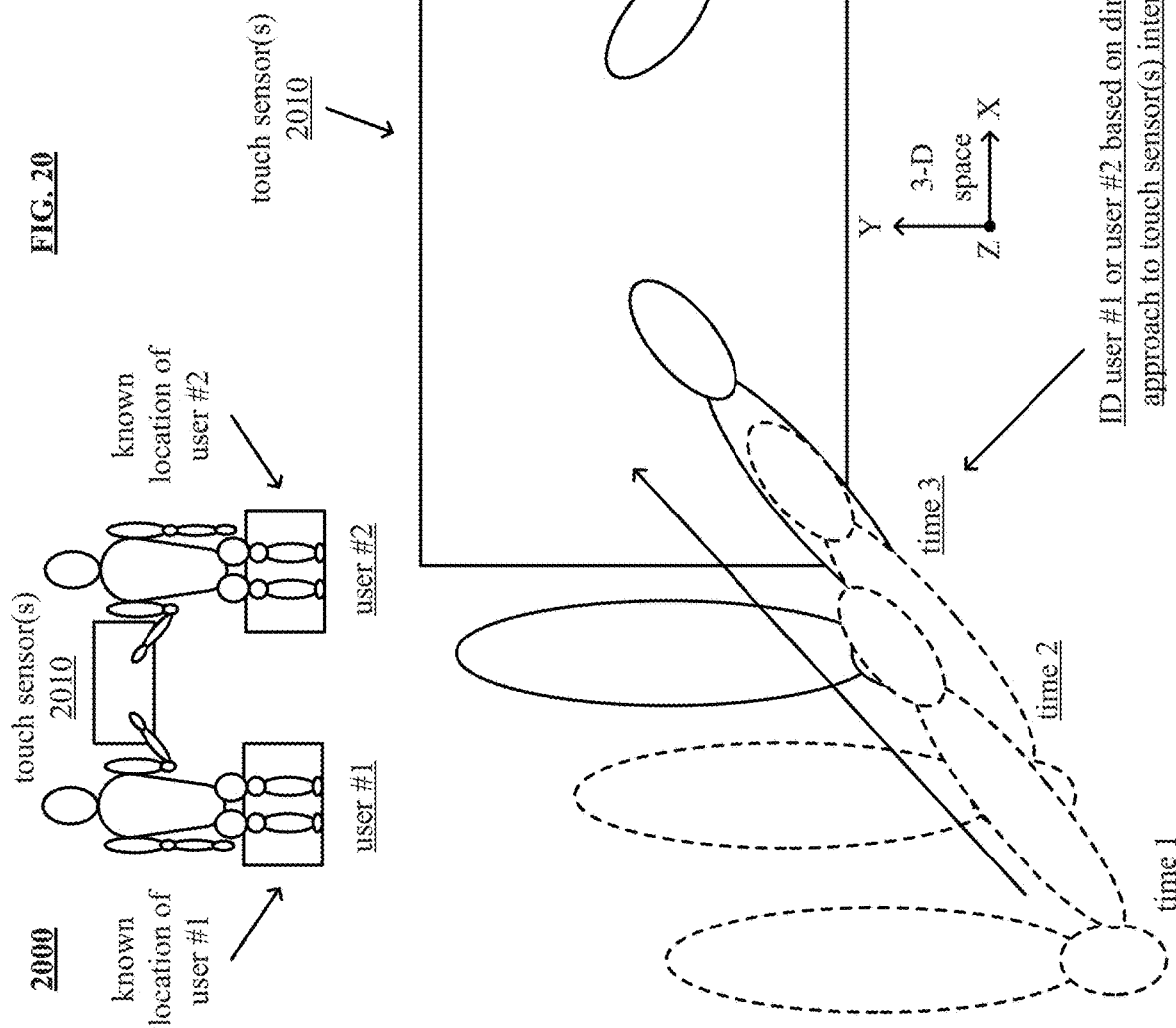
FIG. 20 is a schematic block diagram of an embodiment of a user identification capable touch sensor in accordance with the present invention.

FIG. 20 is a schematic block diagram of an embodiment 2000 of a user identification capable touch sensor in accordance with the present invention. A touch sensor system includes one or more touch sensors 2010. The one or more touch sensors 2010 may be of any of a variety of one or more types including any one or more of a touchscreen, a button, an electrode, an external controller, rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types. The one or more touch sensors 2010 are implemented to detect user interaction based on user touch (e.g., via capacitive coupling (CC) from a user to the one or more touch sensors 2010).

In addition, the one or more touch sensors 2010 is configured to detect the presence of the user before physically touching the one or more touch sensors 2010. For example, as a user is initiating interaction with the one or more touch sensors 2010, the one or more touch sensors 2010 is configured to detect the existence of the user proximity to the touchscreen. For example, considering a three-dimensional space, XYZ, where X and Y are the horizontal and vertical axes in the diagram and Z is the axis extending out of and into the diagram, as a user is approaching the one or more touch sensors 2010, the one or more touch sensors 2010 is configured to detect the existence and location of the user in that process.

As described with respect to other diagrams, one or more processing modules is coupled to drive-sense circuits (DSCs) 28. Note that the one or more processing modules may include integrated memory and/or be coupled to other memory. At least some of the memory stores operational instructions to be executed by the one or more processing modules. A first group of one or more DSCs 28 is/are implemented to drive and simultaneously to sense respective one or more signals provided to the one or more touch sensors 2010.

In some examples, the one or more processing modules determines or receives information corresponding to one or more known locations of one or more users with respect to the one or more touch sensors 2010 (e.g., which may be known beforehand, predetermined, determined based on detection of the one or more users, etc.). In such situations, the one or more processing modules is configured to use the information corresponding to the one or more known locations of the one or more users in accordance with determining the angle of approach of the one or more users to the one or more touch sensors 2010.

Considering a user depicted on the left-hand side of the diagram, at different respective and successive times 1, 2, 3, as the user is approaching the one or more touch sensors 2010, the one or more processing modules is configured to determine the position of the user with respect to the three-dimensional space, XYZ, in reference to the one or more touch sensors 2010. For example, the one or more processing modules is configured to determine the position of the user at time 1 and subsequently a different position of the user at time 2. The one or more touch sensors modules than estimates the angle of approach of the user to the one or more touch sensors 2010 based on these two positions.

In addition, the one or more processing modules is configured to perform comparison of a first angle of approach of first user interaction with a second angle of approach of second user interaction to determine which respective user is initiating interaction with the one or more touch sensors 2010.

Figure 21:
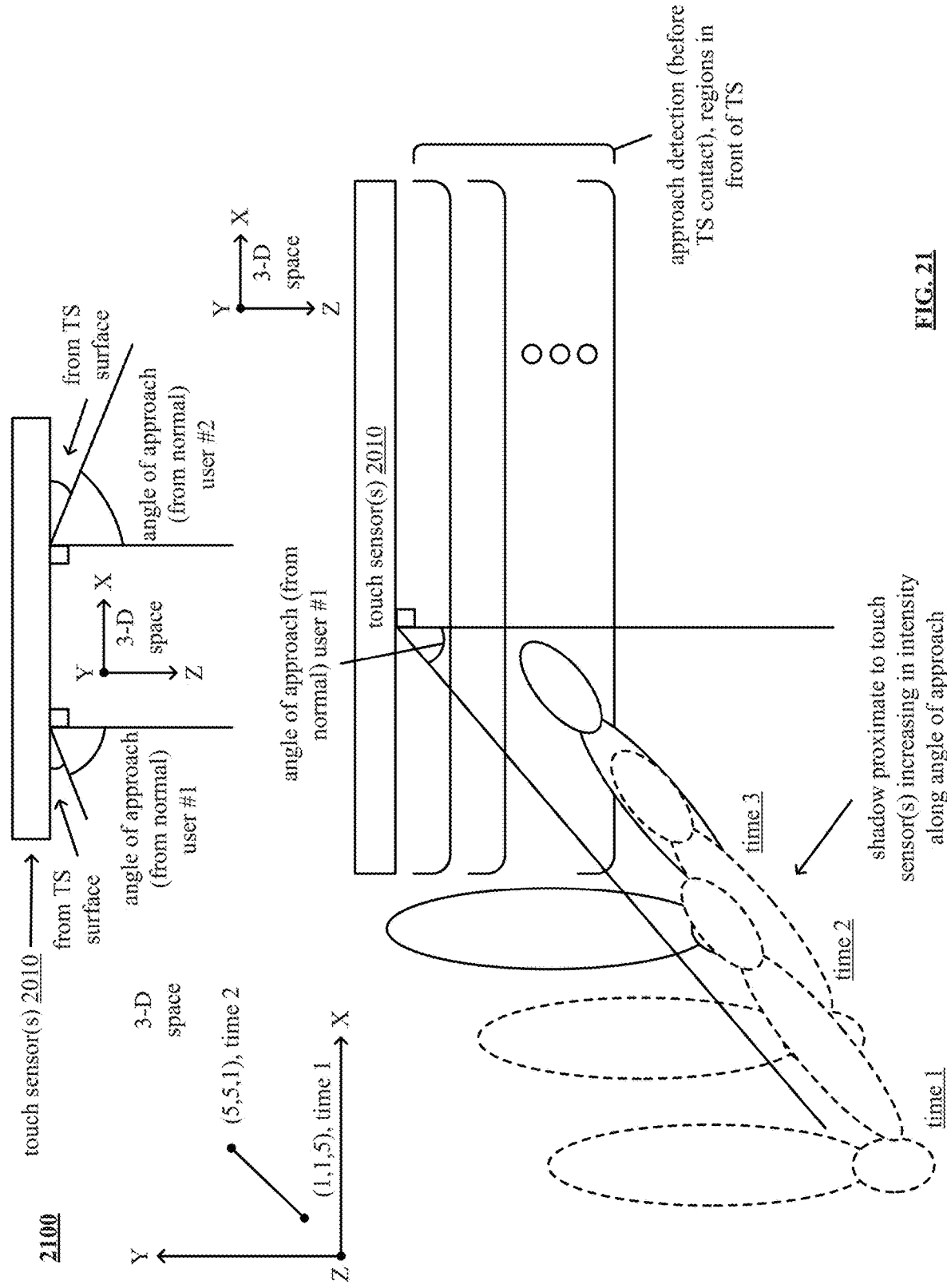
FIG. 21 is a schematic block diagram of another embodiment of a user identification capable touch sensor in accordance with the present invention.

FIG. 21 is a schematic block diagram of another embodiment 2100 of a user identification capable touch sensor in accordance with the present invention. This diagram shows the one or more touch sensors 2010 is including a flat surface. Note that the angle of approach may be determined based on with respect to normal of the surface of one or more touch sensors 2010 for the actual surface of one or more touch sensors 2010 themselves. Alternatively, the angle of approach may be determined based on three-dimensional vector extending from the surface of the one or more touch sensors 2010.

In an example, in the three-dimensional space, XYZ, consider that the position of the user time 1 is estimated to be (X1, Y1, Z1), and that the that the position of the user time 2 is estimated to be (X2, Y2, Z2), then the angle of approach of the user initiating interaction with the one or more touch sensors 2010 is based on a vector extending from the one or more touch sensors 2010 as defined by ([X2−X1], [Y2−Y1]), [Z2−Z1]).

In a specific example, in the three-dimensional space, XYZ, consider that the position of the user time 1 is estimated to be (1, 1, 5), and that the that the position of the user time 2 is estimated to be (5, 5, 1), then the angle of approach of the user initiating interaction with the one or more touch sensors 2010 is based on a vector extending from the one or more touch sensors 2010 as defined by ([X2−X1], [Y2−Y1]), [Z2−Z1])=([1−5], [1−5]), [5−1])=(−4,−4,4). In this specific example, the one or more processing modules is configured to determine that this angle of approach is associated with a user located approximately to the left-hand side or left-hand portion of the one or more touch sensors 2010.

Alternatively, if the angle approach corresponded to a three-dimensional vector extending from the right-hand side or right hand portion of the one or more touch sensors 2010, then the one or more processing modules that this angle of approach is associated with a user located approximately to the right-hand side or right-hand portion of the one or more touch sensors 2010.

In an example of operation and implementation, consider that the one or more touch sensors 2010 are implemented within the vehicle that includes the driver's seat on the left-hand side of the one or more touch sensors 2010. When the angle of approach of the user to the one or more touch sensors 2010 is determined to be from the left-hand side or left-hand portion of the one or more touch sensors 2010, then the one or more processing modules determines that such user interaction is associated with the driver. Alternatively, when the angle of approach of the user to the one or more touch sensors 2010 is determined to be from the right-hand side or right-hand portion of the one or more touch sensors 2010, then the one or more processing modules determines that such user interaction is associated with another passenger in the vehicle who is not the driver.

Figure 22:
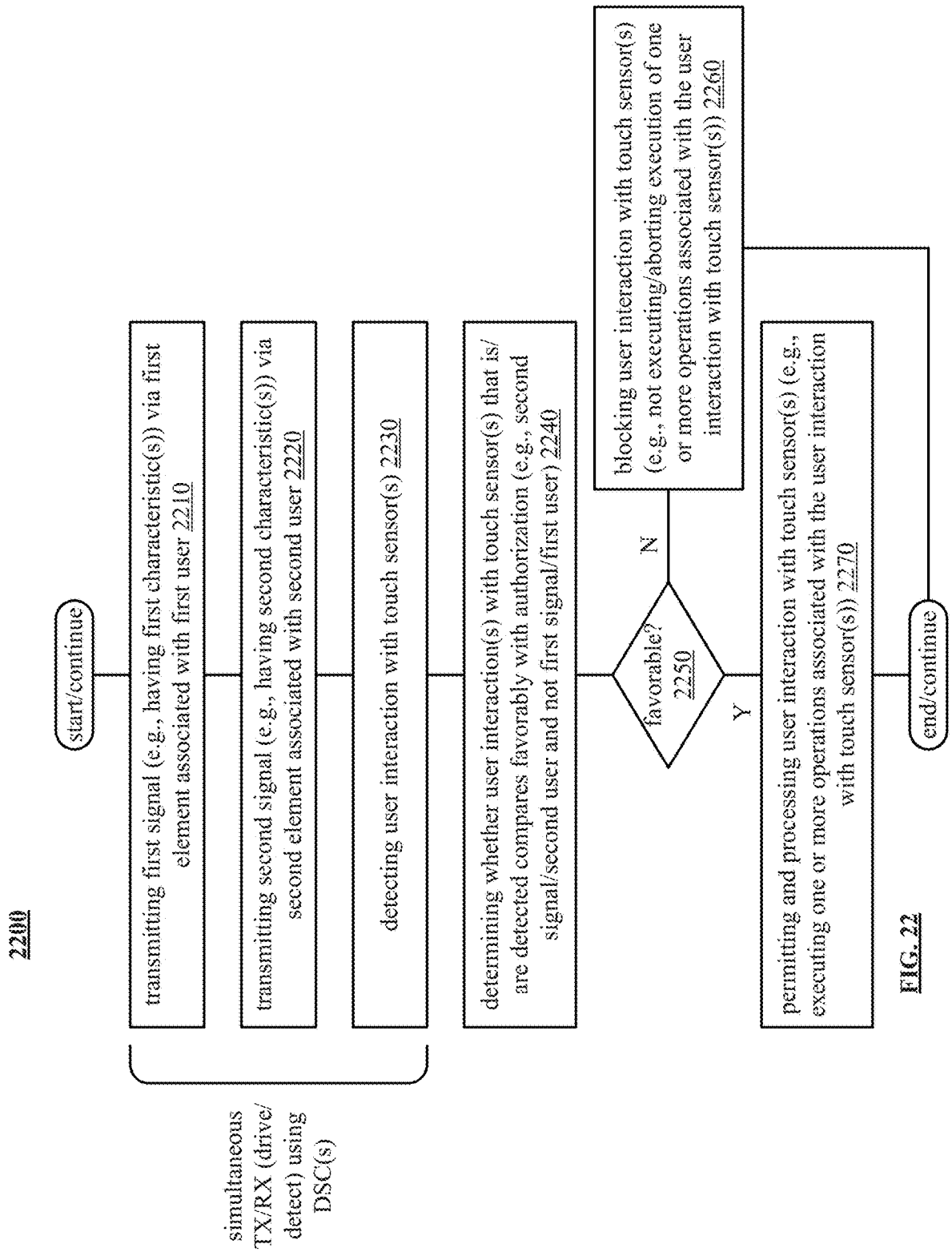
FIG. 22 is a schematic block diagram of an embodiment of a method for execution by one or more devices in accordance with the present invention.

FIG. 22 is a schematic block diagram of an embodiment of a method 2200 for execution by one or more devices in accordance with the present invention. The method 2200 operates in step 2210 by transmitting a first signal via a first element associated with a first user. The first signal includes one or more characteristics that allow for unique identification of the first user. The method 2200 also operates in step 2220 by transmitting a second signal via a second element associated with a second user. The second signal includes one or more characteristics that allow for unique identification of the second user.

The method 2200 operates in step 2230 by detecting user interaction with one or more touch sensors. Note that the operations within the steps 2210, 2220, and 2230 may be performed using one or more DSCs that are configured to perform simultaneous transmit and receive via a single line (e.g., simultaneous drive and detect via a single line).

The method 2200 operates in step 2240 by determining whether user interaction with the one or more touch sensors compares favorably with authorization. In some examples, the determination is made whether or not the user interaction is associated with second user and not the first user.

Based on a determination that the user interaction with the one or more touch sensors compares favorably with authorization, the method 2200 operates via step 2250 and step 2270 by permitting them processing the user interaction with the one or more touch sensors. In some examples, this involves execution of one or more operations associated with the user interaction with the one or more touch sensors. Such one or more operations may be associated with any one or more functions that are directed or controlled via the user interaction with the one or more touch sensors.

Alternatively, based on a determination that the user interaction with the one or more touch sensors compares unfavorably with authorization, the method 2200 operates via step 2250 and step 2260 blocking the user interaction with the one or more touch sensors. In some examples, this involves failing to execute or aborting execution of the one or more operations associated with the user interaction with the one or more touch sensors. In even other examples, this involves discarding the user interaction with the one or more touch sensors.

Figure 23:
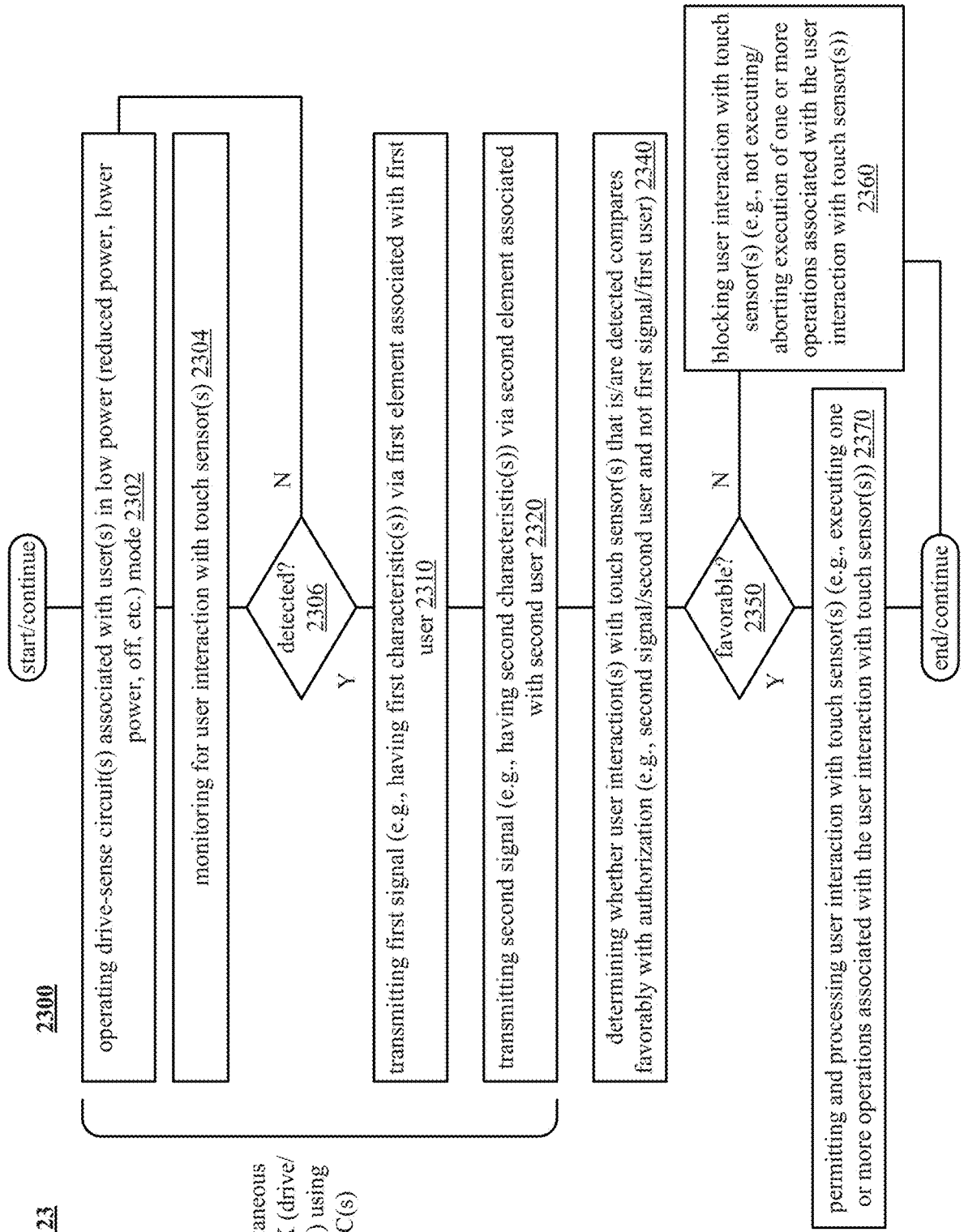
FIG. 23 is a schematic block diagram of another embodiment of a method for execution by one or more devices in accordance with the present invention.

FIG. 23 is a schematic block diagram of another embodiment of a method 2300 for execution by one or more devices in accordance with the present invention. The method 2300 operates in step 2302 by operating one or more drive-sense circuits (DSCs) associated with one or more users and low-power mode. Such low-power mode may include one or more of reduced power, lower power, off, etc.

The method 2300 operates in step 2304 by monitoring for user interaction with one or more touch sensors. Based on failure to detect user interaction with the one or more touch sensors in step 2306, the method 2300 loops back to step 2302.

Based on detection of user interaction with the one or more touch sensors in step 2310, the method 2300 operates in step 2310 by transmitting a first signal via a first element associated with a first user. The first signal includes one or more characteristics that allow for unique identification of the first user. The method 2300 also operates in step 2320 by transmitting a second signal via a second element associated with a second user. The second signal includes one or more characteristics that allow for unique identification of the second user.

Note that the operations within the steps 2302, 2304, 2306, 2310, and 2320 may be performed using one or more DSCs that are configured to perform simultaneous transmit and receive via a single line (e.g., simultaneous drive and detect via a single line).

The method 2300 operates in step 2340 by determining whether user interaction with the one or more touch sensors compares favorably with authorization. In some examples, the determination is made whether or not the user interaction is associated with second user and not the first user.

Based on a determination that the user interaction with the one or more touch sensors compares favorably with authorization, the method 2300 operates via step 2350 and step 2370 by permitting them processing the user interaction with the one or more touch sensors. In some examples, this involves execution of one or more operations associated with the user interaction with the one or more touch sensors. Such one or more operations may be associated with any one or more functions that are directed or controlled via the user interaction with the one or more touch sensors.

Alternatively, based on a determination that the user interaction with the one or more touch sensors compares unfavorably with authorization, the method 2300 operates via step 2350 and step 2360 blocking the user interaction with the one or more touch sensors. In some examples, this involves failing to execute or aborting execution of the one or more operations associated with the user interaction with the one or more touch sensors. In even other examples, this involves discarding the user interaction with the one or more touch sensors.

Figure 24:
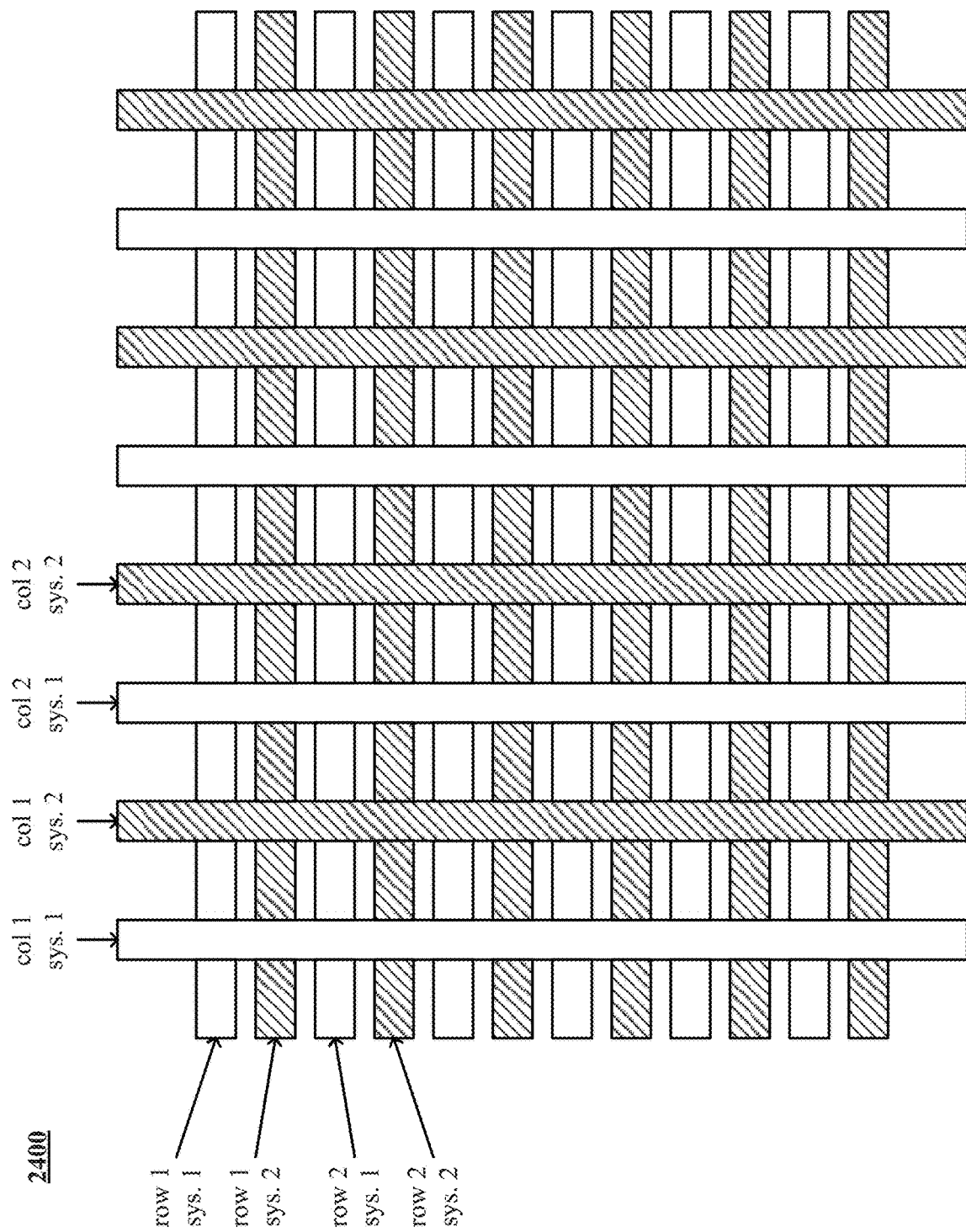
FIG. 24 is a schematic block diagram of an embodiment of a portion of a touch sensor that includes two touch sensors in accordance with the present invention.

FIG. 24 is a schematic block diagram of an embodiment 2400 of a portion of a touch sensor that includes two touch sensors in accordance with the present invention. This diagram shows the first touch sensor that includes electrodes that are arranged in a first set of rows and a first of columns. In addition, the diagram shows a second set touch sensor that includes electrodes that are arranged in a second set of rows and a second set of columns. For example, the first touch sensor includes rows identified as row 1, sys. 1 (row 1, system 1), row 2, sys. 1 (row 2, system 1), and columns identified as col 1, sys. 1 (col 1, system 1), col 2, sys. 1 (col 2, system 1). The second touch sensor includes rows identified as row 1, sys. 2 (row 1, system 2), row 2, sys. 2 (row 2, system 2), and columns identified as col 1, sys. 2 (col 1, system 2), col 2, sys. 2 (col 2, system 2).

In this diagram as well as other examples in embodiments included herein, note that while the configuration of the respective touch sensors (e.g., two touch sensors in this particular diagram) are shown in a row and column format, in general, the configuration of a touch sensor including respective electrodes that are implemented and two were more touch sensors may be arranged in any desired configuration in accordance with any desired pattern (e.g., Manhattan pattern, diamond pattern, and/or any other desired configuration in accordance with any desired pattern). In addition, note that land multiple respective touch sensors are implemented, any two were more of them may be implemented in different configurations in accordance with different patterns. For example, at first touch sensor may be implemented in accordance with a Manhattan pattern, while a second touch sensor may be implemented in accordance with a diamond pattern. In general, different respective touch sensors implemented within the system including two or more touch sensors may be independently implemented in accordance with any desired number of configurations in accordance with any desired number of desired patterns.

In addition, note that the two or more touch sensors 1410 may be of any of a variety of one or more types including rows of electrodes, columns of electrodes, a matrix of buttons, an array of buttons, and/or any other configuration by which interaction with the touch sensor may be performed. With respect to the various embodiments, implementations, etc. of various respective touch sensors as described herein, note that they may also be of any such variety of one or more types.

In an example of operation and implementation, the two respective touch sensors operate independently of one another, such that one of the touch sensors is redundant to the other. In another example of operation and implementation, the two respective time sensors operate cooperatively with respect one another such that their operation is cooperative and may transition in and out of different perspective modes of operation including those in which they both operate simultaneously, in which only one of them is operating at a time, in which one of them is operating to verify the operation of the other, in which there is operation in accordance with one or more power management considerations, and/or other modes of operation.

In some examples as described herein, a single Procap sensor is connected to two independent and redundant touch systems consisting of all electronics, power supply, connectors, etc. Although two systems provide redundancy, this can be extended to n systems, where n is a positive integer greater than or equal to 3. In this diagram particularly, with respect to one possible example, a single Procap sensor, showing a Manhattan pattern, is divided up into to two respective touch sensors. By taking every other row and column to be used, respectively as the first and second touch sensors. Each section is connected to an independent touch system. Each touch system can also communicate with each other if desired in some embodiments.

Many advantages are provided by constructing an overall touch system in this manner. For example, in one implementation, it uses the same technology for both sensor systems. This can provide for lower cost than combining two complete systems of dissimilar technologies. It can operate in hi-resolution mode with both touch systems operating. In addition, it is fully functional in a lower resolution mode if one of the touch systems fails (e.g., in a failure mode, the operation can be automatically adapted for optimal operation at reduced resolution). It can be operated in a single touch sensor mode for power savings. Also, a single touch sensor provides a low profile of a true zero-height profile for in-cell systems (e.g., in accordance with a redundant touch in an in-cell implementation). The two touch systems can query each other to verify full functionality and report deviations from that expectation. Also, it can be constructed using a wide variety of single and multi-layer materials depending on cost, ergonomic, environmental or industrial design requirements. Also, in a failure situation with respect to one or more of the touch sensors, the working system can "call home" and a replacement unit can be sent to the customer without the customer even knowing that one system is down.

Figure 25:
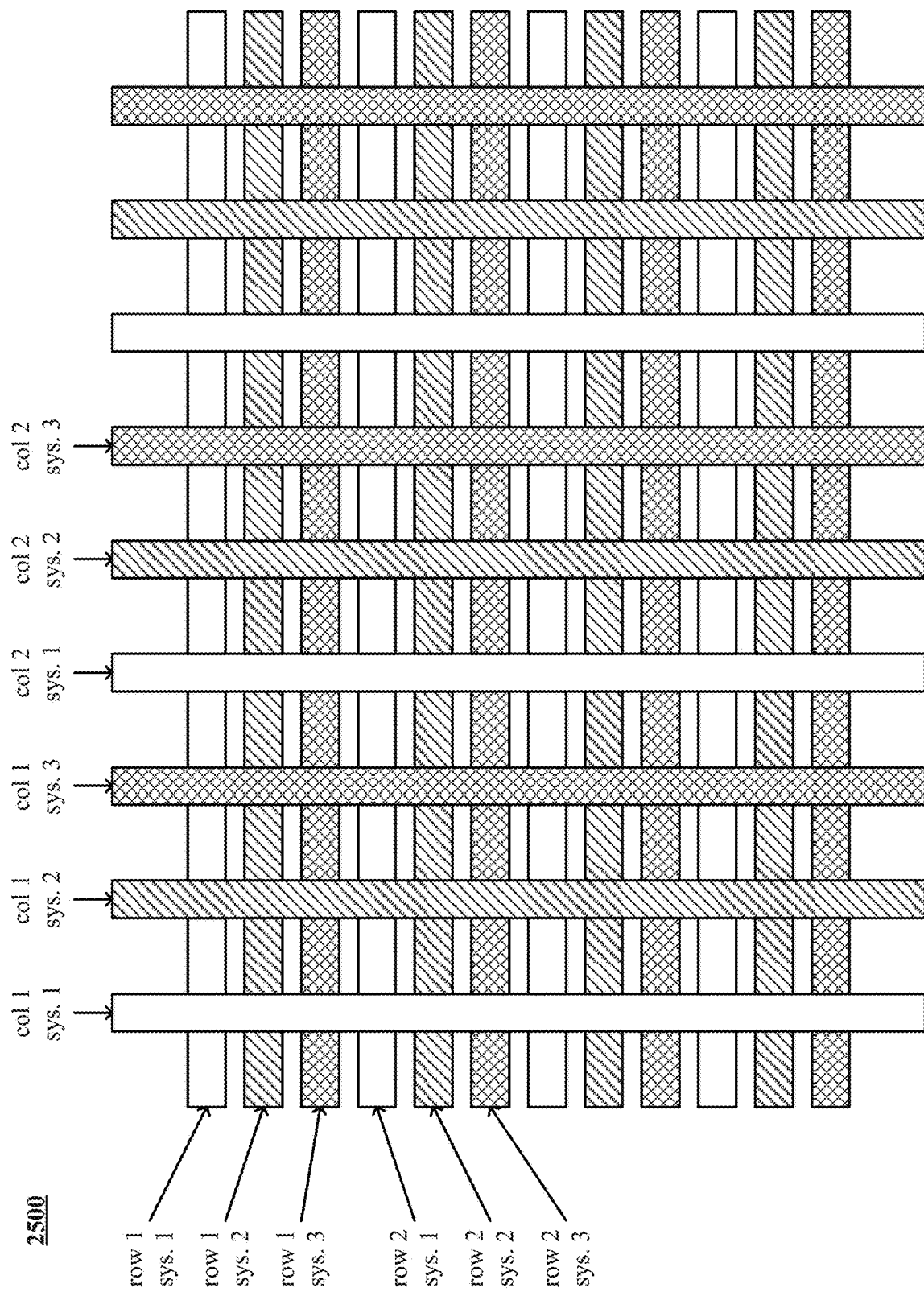
FIG. 25 is a schematic block diagram of an embodiment of a touch sensor that includes three touch sensors in accordance with the present invention.

FIG. 25 is a schematic block diagram of an embodiment 2500 of a touch sensor that includes three touch sensors in accordance with the present invention. This diagram shows three respective touch sensors that each respectively include electrodes that are arranged in respective sets of rows and columns. For example, the first touch sensor includes rows identified as row 1, sys. 1 (row 1, system 1), row 2, sys. 1 (row 2, system 1), and columns identified as col 1, sys. 1 (col 1, system 1), col 2, sys. 1 (col 2, system 1). The second touch sensor includes rows identified as row 1, sys. 2 (row 1, system 2), row 2, sys. 2 (row 2, system 2), and columns identified as col 1, sys. 2 (col 1, system 2), col 2, sys. 2 (col 2, system 2). The third touch sensor includes rows identified as row 1, sys. 3 (row 1, system 3), row 2, sys. 3 (row 2, system 3), and columns identified as col 1, sys. 3 (col 1, system 3), col 2, sys. 3 (col 2, system 3).

In an example of operation and implementation, the three respective touch sensors operate independently of one another. For example, the first touch sensor operates primarily, and the two other touch sensors operate redundantly to the first touch sensor. In another example of operation and implementation, the three respective time sensors operate cooperatively with respect one another such that their operation is cooperative and may transition in and out of different perspective modes of operation including those in which they both operate simultaneously, in which only one of them is operating at a time, in which one of them is operating to verify the operation of the other, in which there is operation in accordance with one or more power management considerations, and/or other modes of operation.

Figure 26:
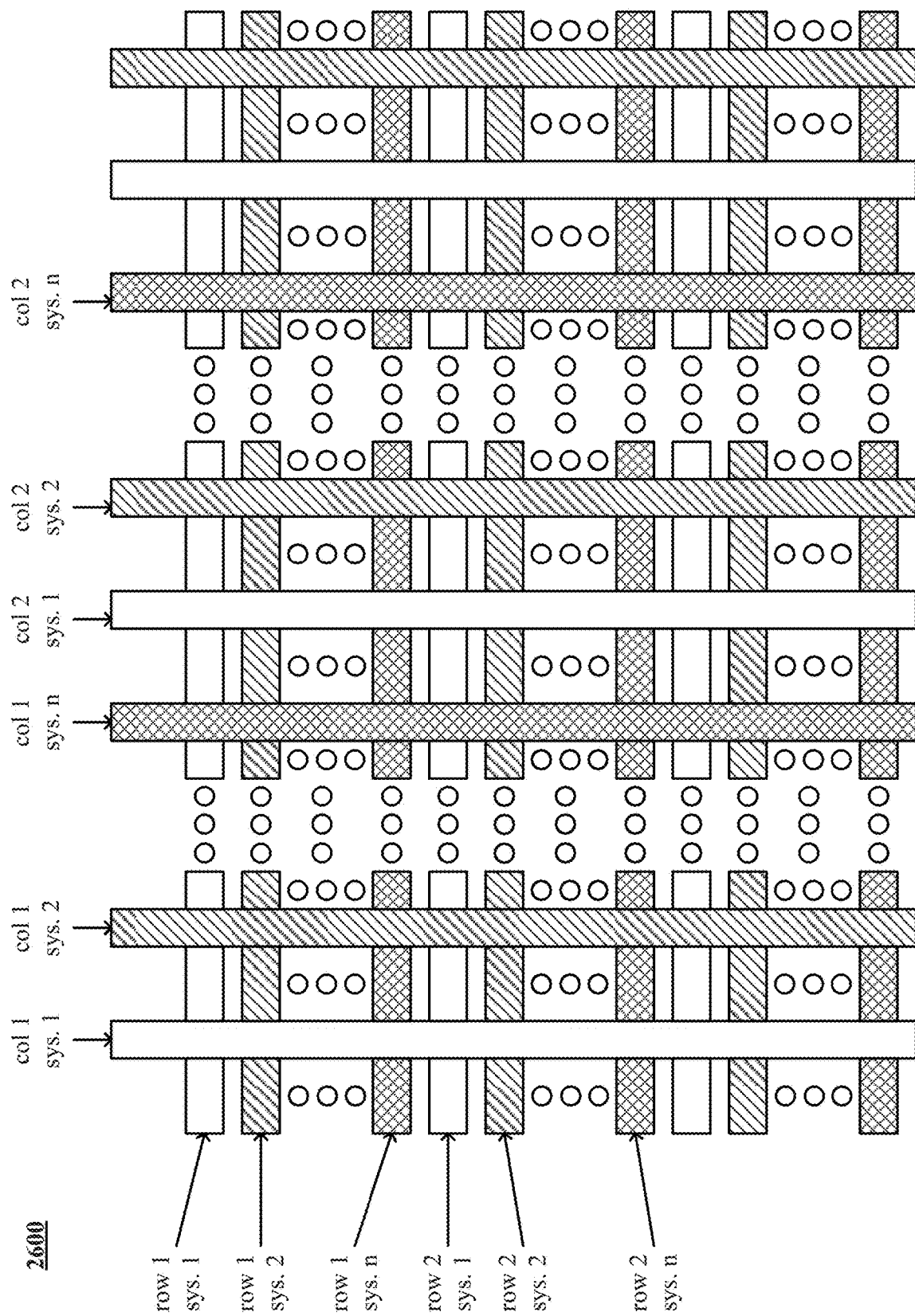
FIG. 26 is a schematic block diagram of an embodiment of a that includes n touch sensors in accordance with the present invention, where n is a positive integer greater than or equal to 3.

FIG. 26 is a schematic block diagram of an embodiment 2600 of a that includes n touch sensors in accordance with the present invention, where n is a positive integer greater than or equal to 3. This diagram shows n (where n is a positive integer greater than or equal to 3) respective touch sensors that each respectively include electrodes that are arranged in respective sets of rows and columns. For example, the first touch sensor includes rows identified as row 1, sys. 1 (row 1, system 1), row 2, sys. 1 (row 2, system 1), and columns identified as col 1, sys. 1 (col 1, system 1), col 2, sys. 1 (col 2, system 1). The second touch sensor includes rows identified as row 1, sys. 2 (row 1, system 2), row 2, sys. 2 (row 2, system 2), and columns identified as col 1, sys. 2 (col 1, system 2), col 2, sys. 2 (col 2, system 2). The nth touch sensor includes rows identified as row 1, sys. n (row 1, system n), row 2, sys. n (row 2, system n), and columns identified as col 1, sys. n (col 1, system n), col 2, sys. n (col 2, system n). In general, any desired number of touch sensors may be implemented within a given device.

Figure 27:
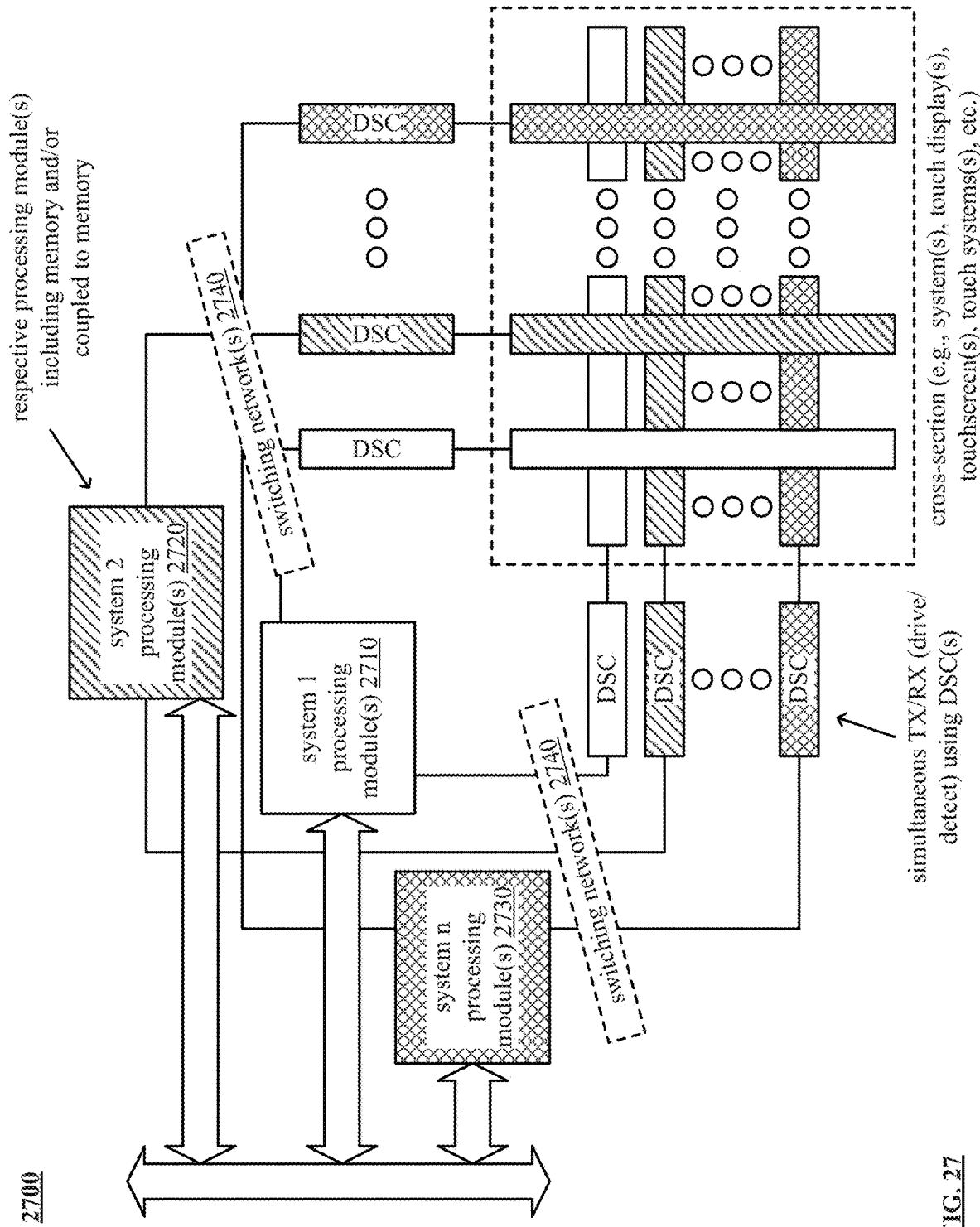
FIG. 27 is a schematic block diagram of an embodiment of a touch sensor system in accordance with the present invention.

FIG. 27 is a schematic block diagram of an embodiment 2700 of a touch sensor system in accordance with the present invention. In this diagram, on the lower right-hand side, a cross-section of two or more touch sensors is shown. In general, note that any desired number of touch sensors may be implemented. A number of DSCs are implemented to drive and simultaneously to sense signals via the respective electrodes of the respective touch sensors. For example, a first group of DSCs are implemented to drive and simultaneously to sense signals via the respective electrodes of the first touch sensor. A second group of DSCs are implemented to drive and simultaneously to sense signals via the respective electrodes of the second touch sensor.

In this diagram, different respective processing modules are implemented for the respective touch sensors. Also, with respect to the one or more processing modules included in this diagram and/or any other diagram herein, note that the one or more processing modules 1430 may include integrated memory and/or be coupled to other memory. At least some of the memory stores operational instructions to be executed by the one or more processing modules.

For example, for the first touch sensor, referenced as system 1, one or more processing modules 2710 is coupled to the first group of DSCs that are implemented to drive and simultaneously to sense signals via the respective electrodes of the first touch sensor. Similarly, for the second touch sensor, referenced as system 2, one or more processing modules 2720 is coupled to the second group of DSCs that are implemented to drive and simultaneously to sense signals via the respective electrodes of the second touch sensor. When more than two respective touch sensors are implemented, for the nth touch sensor, referenced as system n, one or more processing modules 2730 is coupled to the nth group of DSCs that are implemented to drive and simultaneously to sense signals via the respective electrodes of the nth touch sensor.

If desired in certain embodiments, one or more switching networks 2740 are implemented to allow selective coupling of the respective groups of DSCs to the respective electrodes of the respective touch sensors. In addition, with respect to a single touch sensor, note that different respective subsets of the electrodes therein may be operated at different respective times.

In an example of operation and implementation, considering the system 1, the one or more processing modules 2710 is configured via the one or more switching networks 2740 to drive and simultaneously to sense signals via different respective subsets of the electrodes of the first touch sensor. For example, any particular example, only the every Xth row electrode and only the every Yth column electrode (where X and Y are respective positive integers greater than or equal to 2) are operational at a given time. Then, have a different time, only the every Ath row electrode and only the every Bth column electrode (where A and B are respective positive integers greater than or equal to 2) are operational. In general, different respective modes of operation that use different respective subsets of the electrodes of the first touch sensor at different times. Similar operation may be performed with respect to the second touch sensor and optionally any other touch sensors as well.

Also, the first touch sensor, the second touch sensor, and optionally any additional touch sensors, may be implemented to operate cooperatively such that communication is performed between the respective one or more processing modules associated there with. For example, the one or more processing modules 2710 associated with the first touch sensor and the one or more processing modules 2720 associated with the second touch sensor are in communication with one another via one or more communication paths. The respective one or more processing modules 2710 and 2720 operate and coordinate the operation of the first touch sensor and the second touch sensor. In general, when more than two touch sensors are implemented, the respective one or more processing modules associated with each of the respective touch sensors may operate cooperatively with one another to enter into and switch among various modes of operation.

In certain of the subsequent diagrams, different respective touch sensors are sometimes referred to as different respective systems. For example, a first system corresponds to the electrodes, one or more processing modules, one or more DSCs, etc. associated with a first touch sensor. A second system corresponds to the electrodes, one or more processing modules, one or more DSCs, etc. associated with a second touch sensor.

Figure 28:
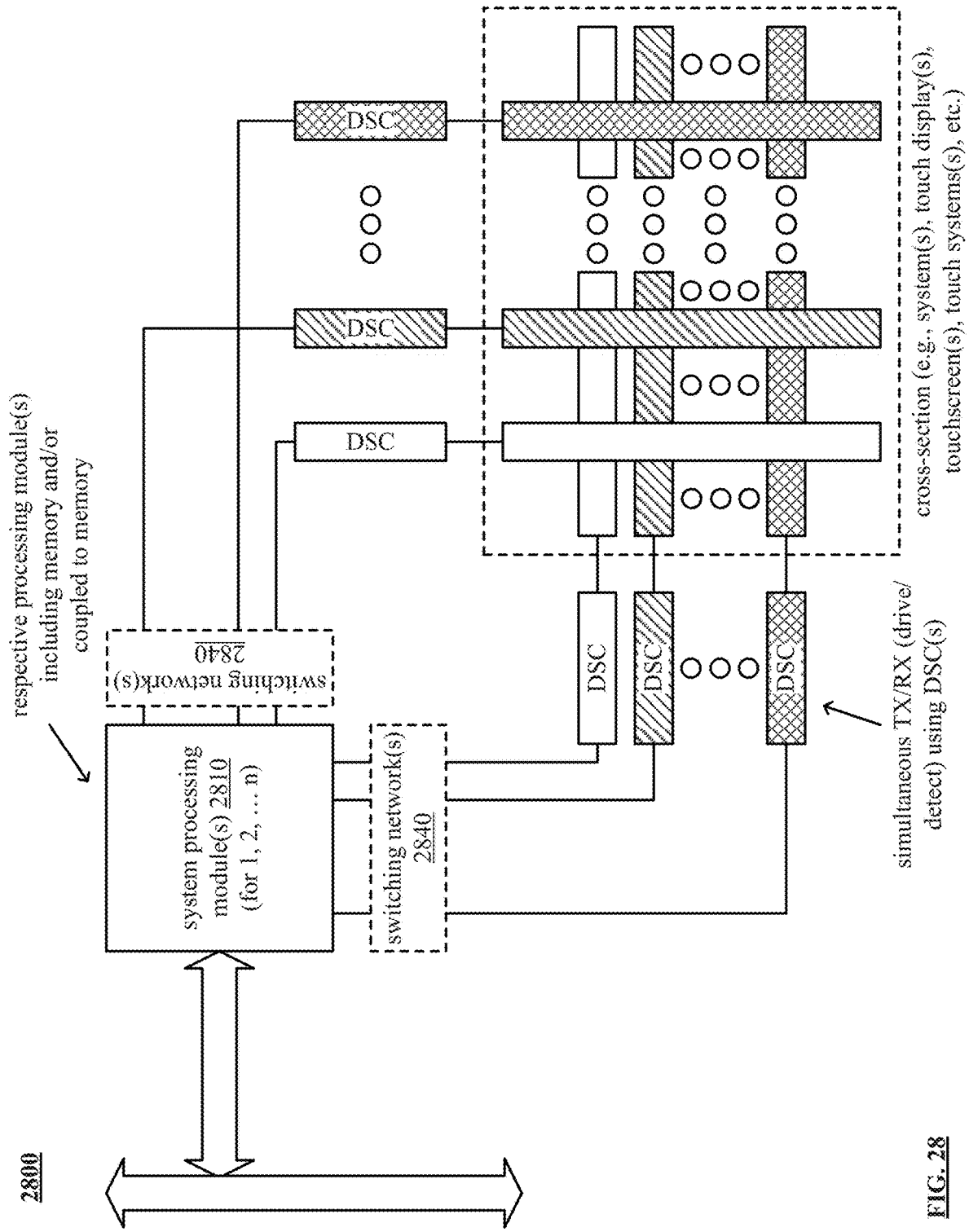
FIG. 28 is a schematic block diagram of another embodiment of a touch sensor system in accordance with the present invention.

FIG. 28 is a schematic block diagram of another embodiment 2800 of a touch sensor system in accordance with the present invention. This diagram has some similarities to the previous diagram, with at least one difference being that one or more processing modules 2810 is implemented to coordinate operation of the respective touch sensors (e.g., associated with system 1, 2, and optionally up to n, where n is a positive integer greater than or equal to 3). Note that one or more switching networks 2840 may optionally be implemented to allow selectivity (e.g., in cooperation with and/or via direction or instruction from the one or more processing modules 2010) regarding which respective touch sensors are operational at any given time, the operational mode by which any one or more of the touch sensors is operational at a given time, which respective electrodes of any one or more of the touch sensors is operational at a given time, etc.

FIG. 29A is a schematic block diagram of another embodiment of a method 2900 for execution by one or more devices in accordance with the present invention. The method 2900 operates by operating a first system in step 2910. The method 2900 operates by operating a second system in step 2920. Note that the second system may be operated redundantly to or alternatively to the first system. In certain embodiments, a method 2900 also operates by operating an nth system in step 2930, where n is a positive integer greater than or equal to 3. Note that the nth system may be operated redundantly to or alternatively to the first and/or second systems.

In addition, note that the operations of the steps 2910 and 2920 may be operated independently with respect one another and/or simultaneously. In some examples, note that the operations of the steps 2910, 2920, and 2930 may be operated independently with respect one another and/or simultaneously.

FIG. 29B is a schematic block diagram of another embodiment of a method 3000 for execution by one or more devices in accordance with the present invention. The method 2901 operates by operating a first system in step 2911. The method 2901 operates by operating a second system in step 2921 cooperatively with the first system. In certain embodiments, a method 2901 also operates by operating an nth system in step 2931, where n is a positive integer greater than or equal to 3, cooperatively with the first and second systems.

In this embodiment, when operating only the first system, the overall touch system operates based on a first resolution. When operating using both the first and second systems, the overall touch system operates based on a second resolution that is different than the first resolution. When operating using the first, second, and up to the nth systems, the overall touch system operates based on an nth resolution that is different than the first resolution and the second resolution. In addition, note that different respective granularity is within each respective first, second, etc. resolutions may be performed by operating different respective subsets of the electrodes associated with the different respective systems.

FIG. 30A is a schematic block diagram of another embodiment of a method 3000 for execution by one or more devices in accordance with the present invention. The method 3000 operates in step 3010 by operating based on the first system. The method 3000 operates in step 3020 by performing diagnostics on a second system.

In one example, when no failure is detected in step 3030, the method 3000 loops back to the step 3010. When one or more failures are detected in step 3030, the method 3000 operates by performing one or more corrective actions in step 3035. For example, various corrective actions may include in one or more of modifying the operational mode of the overall touch system, providing an error message, communicating failure of at least one aspect of at least one of the systems, requesting a replacement unit to be provided from a manufacturer and/or service provider, notifying a user, notifying the service provider, etc. In general, any number of different respective corrective actions may be performed when one or more failures is detected based on performing diagnostics on the second system in step 3020. When possible, one or more corrective actions includes an automated process that attempts to mitigate or eliminate the error. For example, one possible corrective action may be to perform a power cycle of the for which one or more failures has been detected.

In another example, when no failure is detected in step 3030, the method 3000 operates by operating based on the second system in step 3040. The method 3000 operates in step 3050 by performing diagnostics on the first system.

In one example, when no failure is detected in step 3060, the method 3000 loops back to the step 3010 or 3040. When one or more failures are detected in step 3060, the method 3000 operates by performing one or more corrective actions in step 3065. For example, various corrective actions may include in one or more of modifying the operational mode of the overall touch system, providing an error message, communicating failure of at least one aspect of at least one of the systems, requesting a replacement unit to be provided from a manufacturer and/or service provider, notifying a user, notifying the service provider, etc. In general, any number of different respective corrective actions may be performed when one or more failures is detected based on performing diagnostics on the first system in step 3050. When possible, one or more corrective actions includes an automated process that attempts to mitigate or eliminate the error. For example, one possible corrective action may be to perform a power cycle of the for which one or more failures has been detected.

In another example, when no failure is detected in step 3060, the method 3000 operates in step 3070 by operating using a fail-free or still operable system (e.g., the first and/or second system).

FIG. 30B is a schematic block diagram of another embodiment of a method 3001 for execution by one or more devices in accordance with the present invention. The method 3001 operates in step 3011 by operating a first system. The method 3001 operates in step 3021 by operating a second system. The operation of the second systems may be performed redundantly to or cooperatively with the first system. The method 3001 operates in step 3030 by performing diagnostics on the first and/or second system.

When no failure is detected based on the first system and/or the second system in step 3041, the method 3001 loops back to performing the operations within one or more of the steps 3011, 3021, and/or 3031. When one or more failures is detected based on the first system and/or the second system in step 3041, the method 3001 operates by performing one or more corrective actions. Some examples of such corrective actions are described above. In certain examples, the method 3001 operates in step 3061 by operating using a fail-free or still operable system (e.g., the first and/or second system).

FIG. 31 is a schematic block diagram of another embodiment of a method 3100 for execution by one or more devices in accordance with the present invention. The method 3100 operates in step 3110 by operating first system. The method 3100 operates in step 3120 by operating a second system. The method 3100 operates in step 3120 by operating a second system. The operation of the second systems may be performed redundantly to or cooperatively with the first system. The method 3100 operates in step 3010 by monitoring for one or more conditions warranting a power saving operational mode. Examples of one or more conditions warranting a power saving operational mode may include reduced battery life or battery life below a particular threshold, disconnection from AC power, one or more of the systems consuming energy at a rate or level that exceeds a particular threshold, reduced performance of one or more of the systems, and/or any other consideration.

When no condition warranting a power savings operational mode are detected in step 3140, the method 3100 loops back to perform the operations within one or more of the steps 3110, 3120, and 3130.

Alternatively, when one or more conditions warranting a power savings operational mode are detected in step 3140, the method 3100 operates in step 3150 by operating in a power saving operational mode. Examples of the power saving operational mode may include operating in accordance with a reduced power, operating using fewer than all of the systems available within the overall touch sensor, operating using fewer than all of the electrodes within a given system, operating using only the first system or the second system but not both, etc.

The method 3100 also operates in step 3160 by monitoring for one or more conditions permitting exit from the power saving operational mode. Examples of one or more conditions warranting an exit from the power saving operational mode may include increased battery life or battery life above a particular threshold, connection or detection of reconnection to AC power, one or more of the systems consuming energy at a rate or level that is below a particular threshold, acceptable performance of performance of one or more of the systems, and/or any other consideration.

When one or more conditions warranting an exit from the power savings operational mode are detected in step 3170, the method 3100 loops back to perform the operations within one or more of the steps 3110, 3120, and 3130. Alternatively, when no condition warranting a power savings operational mode are detected in step 3170, the method 3100 operates via step 3170 by continuing operating in the power saving operational mode in step 3150. Alternatively, when no condition warranting a power saving operational mode are detected in step 3170, the method 3100 operates via step 3170 by ending.

And certain touch sensor applications, it may be desirable to have one or more redundant touch systems. For example, in certain application areas including aviation, automotive, industrial, medical, maritime, etc., one or more redundant systems provides continued operation of the overall system even in the event of failure of one or more of the systems. In certain applications, having one or more redundant systems can provide for failsafe for nearly failsafe operation.

In some examples redundant systems can be constructed by combining independent systems of different touch technologies. Various examples of touch sensor technologies include one or more of Analog Resistive, infrared (IR) and Camera Optical, Surface Acoustic Wave, Ultrasound, Projected Capacitive, etc. In some examples, each of the respective systems includes its own respective power supply. In other examples, two or more of the respective systems operate using a common power supply.

Within some applications, it may be prohibitively costly and undesirable to have independent respective power supplies for each of the respective systems for any number of reasons (e.g., ergonomic, industrial design, or electrical reasons). As described herein with respect to certain examples of embodiments, a single Procap (projected-capacitive) sensor, which may be implemented to include both single layer and multi-layer, can be operated by two or more independent touch controllers (e.g., based on one or more processing modules and different respective groups of DSCs, one or more switching networks, and/or other components as described herein).

In certain implementations, a more or most likely point of failure within the overall touch sensor system is not the one or more sensors themselves (e.g., a touchscreen, the electrodes of the respective touch sensors, etc.), which are typically very robust both mechanically and electrically, but a more or most likely point of failure within the overall touch sensor system is the surrounding electronics, connectors, power supply, etc. as described herein, having cost-effective redundant systems for the higher-probability failure points is both desirable and realistic. This is a very flexible system that contains many advantages, embodiments, configurations, etc.

Figure 32:
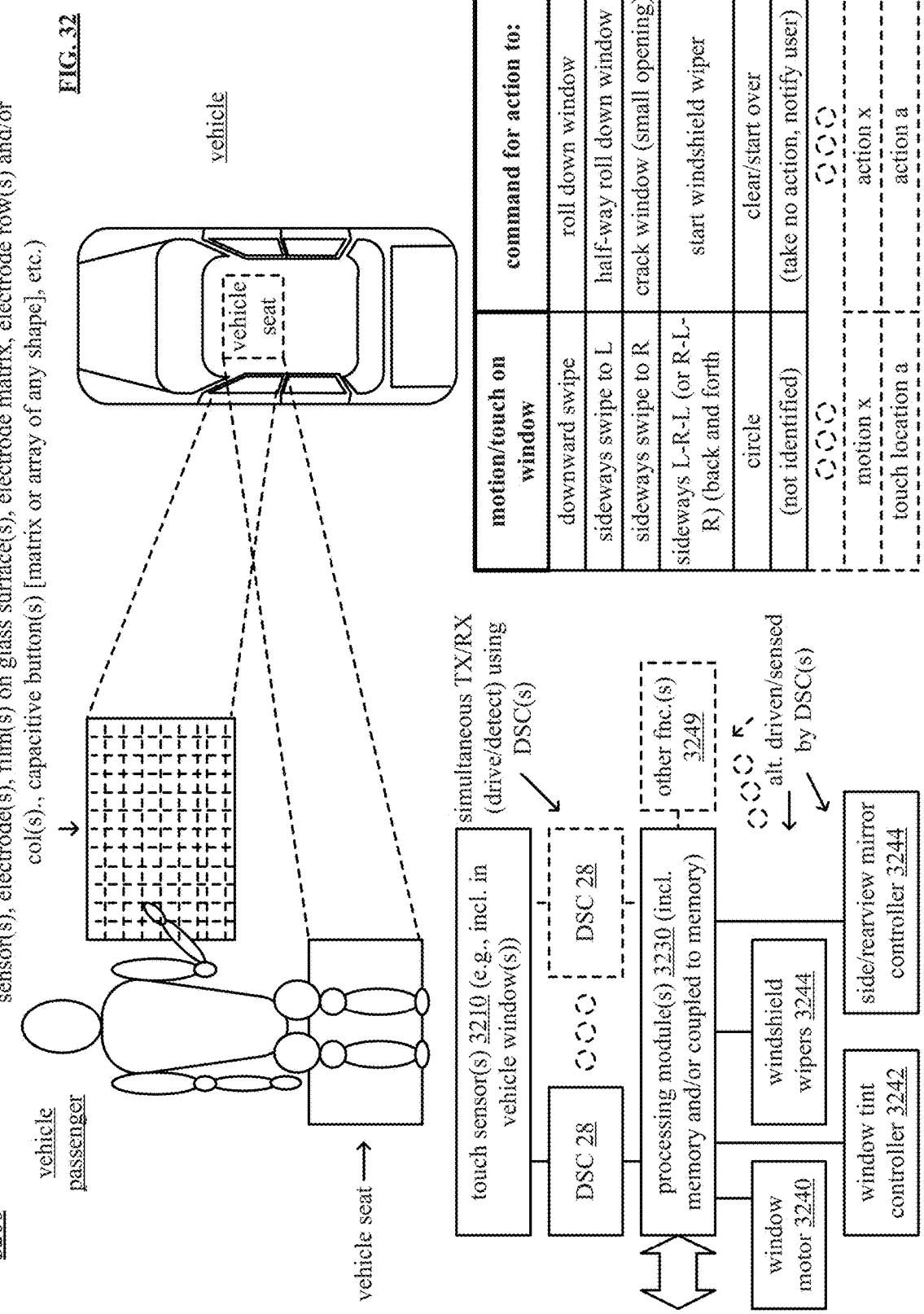
FIG. 32 is a schematic block diagram of an embodiment of a vehicle implemented with user-interactive glass feature in accordance with the present invention.

FIG. 32 is a schematic block diagram of an embodiment 3200 of a vehicle implemented with user-interactive glass feature in accordance with the present invention. A touch sensor system includes one or more touch sensors 3210. The one or more touch sensors 3210 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

At the bottom left of the diagram, one or more processing modules 3230 is coupled to one or more drive-sense circuits (DSCs) 28. Note that the one or more processing modules 3230 may include integrated memory and/or be coupled to other memory. At least some of the memory stores operational instructions to be executed by the one or more processing modules 3230. One or more DSCs 28 is/are implemented to drive and simultaneously to sense respective one or more signals provided to the one or more touch sensors 3210.

In this diagram, the one or more touch sensors 3210 are included within one or more vehicle windows. In general, the one or more touch sensors 3210 may be included in any glass feature within the vehicle. The one or more processing modules 3230 is also configured to facilitate execution of one or more operations associated with the vehicle. Some examples of such operations include operation of a window motor 3240, operation of window tint controller 3242, operation of windshield wipers 3244, operation of side and/or rearview mirror controller 3244, and/or any other functions 3249. Note that the coupling between the one or more processing modules 3230 and the various respective operations associated with the vehicle may also may be made using one or more DSCs 28. For example, the interaction and operation between one or more processing modules 3230 and the various components implemented within the vehicle to execute such operations may be made via one or more DSCs 28.

In an example of operation and implementation, a user within the vehicle, such as a vehicle passenger sitting in a vehicle seat, interacts with the one or more touch sensors 3210 implemented within a vehicle window. The motion and/or touch on the window is detected and interpreted by the one or more processing modules 3230 in accordance with facilitating the execution of the motion and/or touch on the window. Note also that different respective motions and/or touches may correspond to different respective operations. In general, different respective motions and/or touches may correspond to different respective commands provided from a user to direct operation of one or more components, systems, modules, etc. of the vehicle. Some examples of such motions and/or touches on the window are described in the table in the lower right-hand portion of the diagram. In general, any desired mapping of different respective motions and/or touches may be assigned to any desired commands for action to be performed by one or more components, systems, modules, etc. of the vehicle. The examples provided are not an exhaustive list, and in general, and any operations associated with the vehicle may be assigned to any desired motions and/or touches. In general, a motion x may be assigned for a command for action to perform an action x; similarly, a touch location a may be assigned for a command for action to perform an action z; where x and a are assignable, reconfigurable, programmable, etc.

Figure 33:
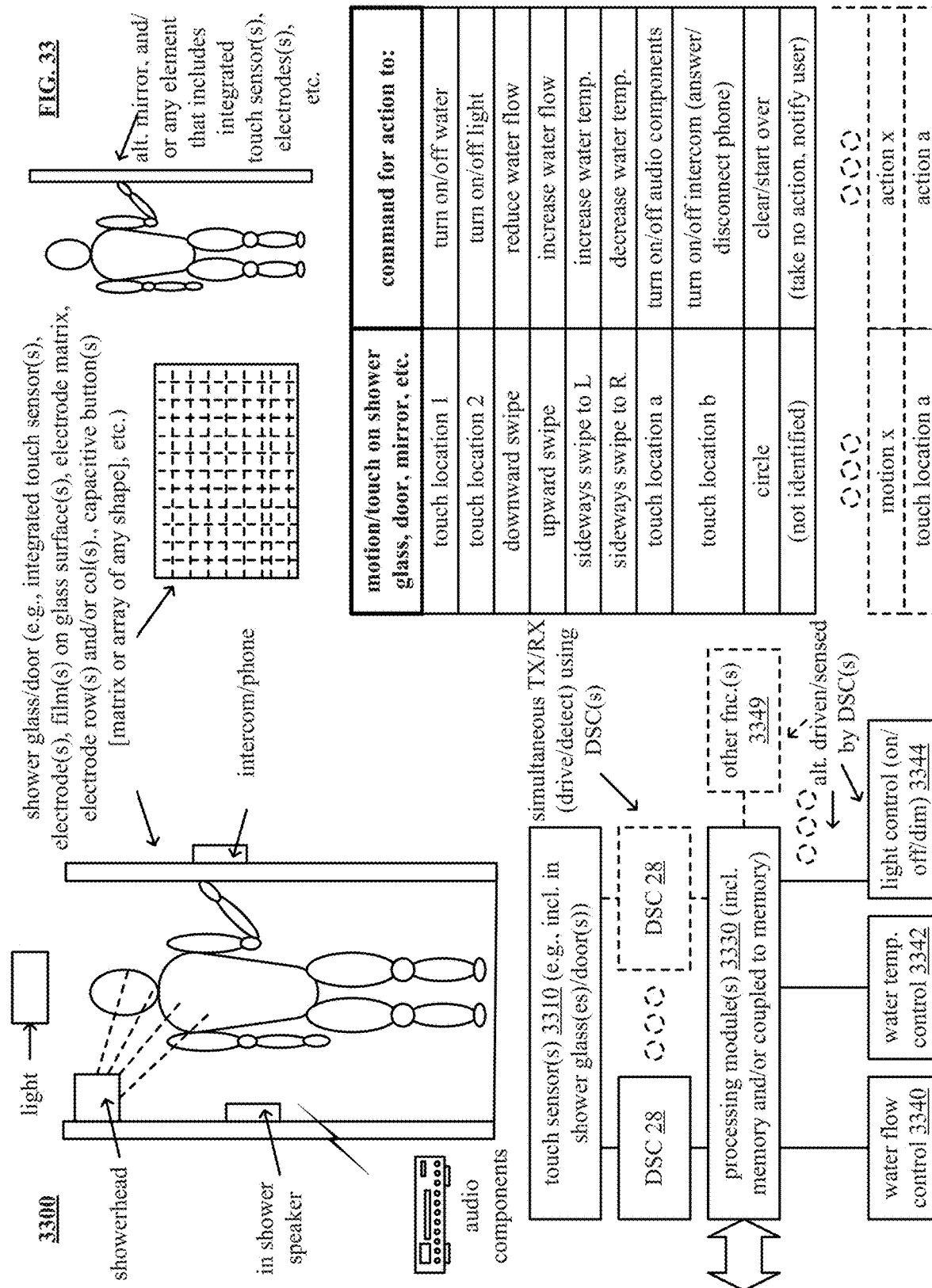
FIG. 33 is a schematic block diagram of an embodiment of a shower stall implemented with user-interactive glass feature in accordance with the present invention.

FIG. 33 is a schematic block diagram of an embodiment 3300 of a shower stall implemented with user-interactive glass feature in accordance with the present invention. A touch sensor system includes one or more touch sensors 3310. Note that the one or more touch sensors 3310 may be implemented and integrated within the glass of the shower stall. Alternatively, the one or more touch sensors 3310 may be implemented within one or more films that is/are located on the inside and/or the outside of the shower stall. The one or more touch sensors 3310 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

In addition, note that the one or more touch sensors 3310 may be implemented within nontransparent or opaque portions of the shower stall. For example, the one or more touch sensors 3310 need not be implement within clear or transparent glass. The one or more touch sensors 3310 may be implemented within tile, travertine, knobs, water controllers, etc. and/or any other surface and/or component accessible to user within the shower stall.

At the bottom left of the diagram, one or more processing modules 3330 is coupled to one or more drive-sense circuits (DSCs) 28. Note that the one or more processing modules 3330 may include integrated memory and/or be coupled to other memory. At least some of the memory stores operational instructions to be executed by the one or more processing modules 3330. One or more DSCs 28 is/are implemented to drive and simultaneously to sense respective one or more signals provided to the one or more touch sensors 3310.

In this diagram, the one or more touch sensors 3310 are included within one or more features within a shower glass and/or door. In general, the one or more touch sensors 3310 may be included in any glass feature within a home, building, place of business, etc. The one or more processing modules 3330 is also configured to facilitate execution of one or more operations associated with the environment in which the one or more touch sensors 3310 are implemented. Some examples of such operations in the context of a shower may include operation of water flow control 3340, water temperature control 3342, light control 3344 such as turning the light on or off or adjusting its brightness/dimming the light, and/or any other function associated with the environment in which the one or more touch sensors 3310 are implemented. Note that the coupling between the one or more processing modules 3330 and the various respective operations associated with the environment also may be made using one or more DSCs 28. For example, the interaction and operation between one or more processing modules 3330 and the various components associated with the environment to execute such operations may be made via one or more DSCs 28.

In an example of operation and implementation, a user within the shower interacts with the one or more touch sensors 3210 implemented within the environment of the shower stall. The motion and/or touch on the one or more touch sensors 3210 is detected and interpreted by the one or more processing modules 3230 in accordance with facilitating the execution of the motion and/or touch on the one or more touch sensors 3210. Note also that different respective motions and/or touches may correspond to different respective operations. In general, different respective motions and/or touches may correspond to different respective commands provided from a user to direct operation of one or more components, systems, modules, etc. of the environment of the shower stall. Some examples of such motions and/or touches on the window are described in the table in the lower right-hand portion of the diagram. In general, any desired mapping of different respective motions and/or touches may be assigned to any desired commands for action to be performed by one or more components, systems, modules, etc. of the environment of the shower stall. The examples provided are not an exhaustive list, and in general, and any operations associated with the environment of the shower stall may be assigned to any desired motions and/or touches. In general, a motion x may be assigned for a command for action to perform an action x; similarly, a touch location a may be assigned for a command for action to perform an action z; where x and a are assignable, reconfigurable, programmable, etc.

Figure 34:
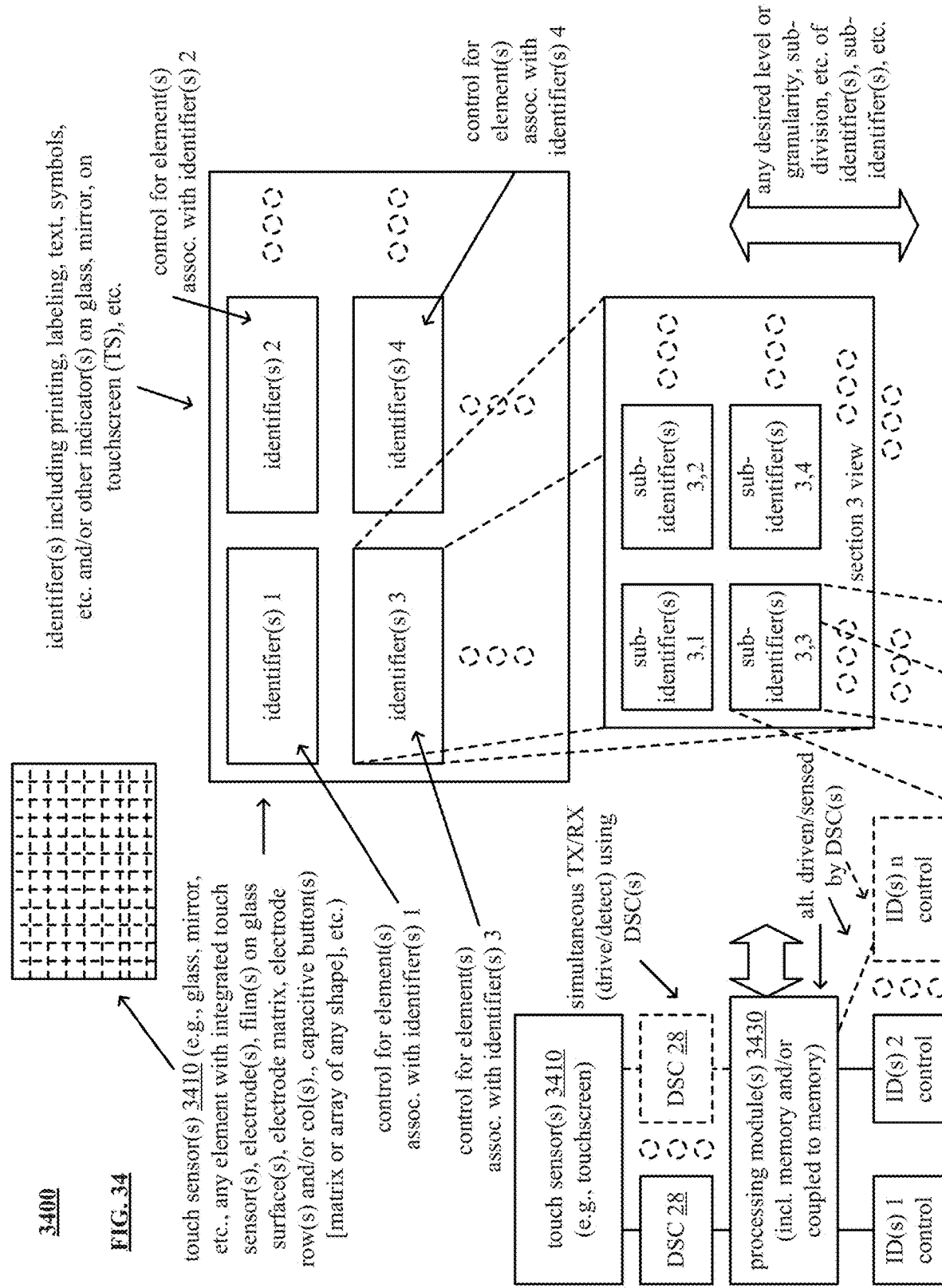
FIG. 34 is a schematic block diagram of an embodiment of a user-interactive glass feature implemented with one or more identifiers in accordance with the present invention.

FIG. 34 is a schematic block diagram of an embodiment 3400 of a user-interactive glass feature implemented with one or more identifiers in accordance with the present invention. A touch sensor system includes one or more touch sensors 3410. Note that the one or more touch sensors 3410 may be implemented and integrated within any type of element including glass, mirror, etc. Note that the one or more touch sensors 3410 may be implemented within one or more films that is/are located on the inside and/or the outside of such an element including glass, mirror, etc. The one or more touch sensors 3410 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

In addition, note that the one or more touch sensors 3410 may be implemented within nontransparent or opaque portions of the element including glass, mirror, etc. For example, the one or more touch sensors 3410 need not be implement within clear or transparent glass.

At the bottom left of the diagram, one or more processing modules 3430 is coupled to one or more drive-sense circuits (DSCs) 28. Note that the one or more processing modules 3430 may include integrated memory and/or be coupled to other memory. At least some of the memory stores operational instructions to be executed by the one or more processing modules 3430. One or more DSCs 28 is/are implemented to drive and simultaneously to sense respective one or more signals provided to the one or more touch sensors 3410.

In an example of operation and implementation, the one or more touch sensors 3410 are associated with an element on which one or more identifiers are implemented. Again, the one or more touch sensors 3410 may be implemented within the element in any of a number of ways included integrated therein, included in the film placed thereon, etc. For example, the element may include glass, mirror, a touchscreen, etc. The one or more identifiers may include printing, labeling, text, symbols, and/or any other indicators. The identifiers provide indication to a user interacting with the one or more touch sensors 3410 of where to interact in order to facilitate execution of one or more operations. For example, control for one or more elements associated with one or more identifiers is shown with respect to 4 different portions of the one or more touch sensors 3410 on the middle and right hand side portion of the diagram.

In general, if any desired number of regions associated with different respective identifiers may be included within the element that is associated with the one or more touch sensors 3410. In addition, any desired number of sub-identifiers may be included with any one of the regions in which the element is partitioned. For example, considering a section 3 that includes the one or more identifiers 3, there may be any number of sub-sections included therein. In general, any desired level of granularity, sub-division, etc. of the one or more identifiers, the one or more sub-identifiers, may be implemented with respect to the element that is associated with the one or more touch sensors 3410.

Based upon user interaction with the one or more touch sensors 3410 and specifically on the one or more identifiers associated with the one or more touch sensors 3410, the one or more processing modules 3430 facilitate execution of control of different respective operations. For example, interaction with the one or more identifiers 1 in the upper left-hand portion of the element on which the one or more identifiers are implemented facilitates execution of control of operations associated therewith.

In an example of operation and implementation, consider that the one or more identifiers 3 are associated with an audio system (e.g., such as may be implemented within a home, a place of business, a place of learning, etc.), The one or more sub-identifiers 3,1 through 3,4, etc. are associated with particular operations of the audio system that may include any one or more of turning the system on or off, adjusting volume, controlling which speakers are operational, controlling the equalizer operation of the audio system, and/or any other operations associated with the audio system.

In some examples, the use of identifiers and/or sub-identifiers may facilitate better user interaction with the one or more touch sensors 3410. Also, in other examples the use of identifiers allows for specific mapping of one or more portions of the one or more elements associated with the one or more touch sensors 3410 to be specifically assigned and mapped for different operations.

Note that the coupling between the one or more processing modules 3430 and the various respective functions associated with the identifiers also may be made using one or more DSCs 28. For example, the interaction and operation between one or more processing modules 3430 and the various components associated with the identifiers to execute such functions may be made via one or more DSCs 28.

The environments of application of such identifiers and/or sub-identifiers in conjunction with one or more touch sensors 3410 are myriad. Considering just some examples within a home, various user interactive operations may be implemented using one or more touch sensors 3410 that are associated with one or more elements and associated identifiers and/or sub-identifiers may include any one or more of thermostat controls, doorbells, light switches and/or controls, HVAC controls, security panels, door locking and/or unlocking, driveway gate control, etc. Such examples are not exhaustive, and in general, any desired user interaction with a control element may be implemented in such a manner.

In general, any user interaction with a control element in any component and/or surface may be implemented using such identifiers and/or sub-identifiers in conjunction with one or more touch sensors 3410 in conjunction with one or more elements.

Figure 35:
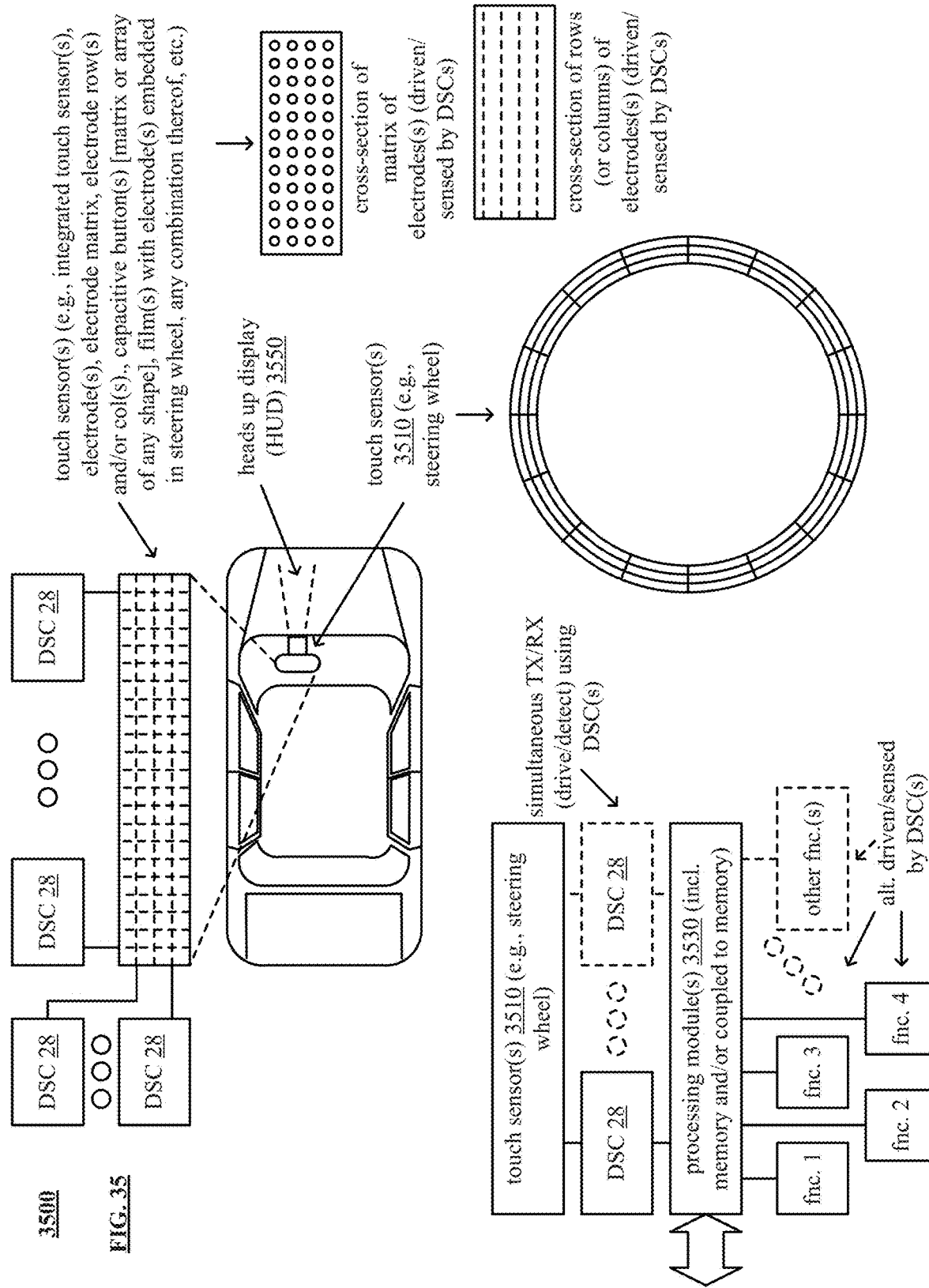
FIG. 35 is a schematic block diagram of an embodiment of a steering wheel implemented with a touch sensor in accordance with the present invention.

FIG. 35 is a schematic block diagram of an embodiment 3500 of a steering wheel implemented with a touch sensor in accordance with the present invention. A touch sensor system includes one or more touch sensors 3510. In this diagram, the one or more touch sensors 3510 are implemented within the steering wheel that is implemented within a vehicle. Note that the one or more touch sensors 3510 may be implemented within one or more films that is/are located on the inside and/or the outside of the steering wheel. The one or more touch sensors 3510 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

In addition, note that the one or more touch sensors 3510 may be implemented within nontransparent or opaque portions of the steering wheel.

At the bottom left of the diagram, one or more processing modules 3530 is coupled to one or more drive-sense circuits (DSCs) 28. Note that the one or more processing modules 3530 may include integrated memory and/or be coupled to other memory. At least some of the memory stores operational instructions to be executed by the one or more processing modules 3530. One or more DSCs 28 is/are implemented to drive and simultaneously to sense respective one or more signals provided to the one or more touch sensors 3510.

Based upon user interaction with the one or more touch sensors 3510 associated with the steering wheel, the one or more processing modules 3530 facilitate execution of control of different respective functions associated with the vehicle. Any number of different functions 1 through n associated with the vehicle may be associated with user interaction with the one or more touch sensors 3510.

Note that the coupling between the one or more processing modules 3530 and the various respective functions associated with the vehicle also may be made using one or more DSCs 28. For example, the interaction and operation between one or more processing modules 3530 and the various components associated with the vehicle to execute such functions may be made via one or more DSCs 28.

In some examples, a heads-up display (HUD) 3550 is also implemented in the vehicle. In some embodiments, a user interacts with the one or more touch sensors 3510 that are associated with the steering wheel to interact with the HUD 3550. The HUD 3550 provides a visual representation of various respective operations associated with the vehicle. For example, any display related information that may be provided via a display implemented within the vehicle, such as may be implemented in the dashboard of the vehicle between the driver and front passenger seats, may alternatively or also be displayed via the HUD 3550. Navigating and interacting throughout various menus associated with various functions, systems, etc. of the vehicle may be facilitated via the user interacting with the one or more touch sensors 3510 that are associated with the steering wheel in conjunction with the HUD 3550.

In an example of operation and implementation, a driver of the vehicle performs a particular motion and/or touches a particular location on the steering wheel to bring up a main menu that is visible to the driver of the vehicle via the HUD 3550. Then, based on the main menu displayed, the driver of the vehicle performs a particular motion and/or touches a particular location on the steering wheel to access a particular icon or portion of the main menu that is displayed via the HUD 3550, and performs a particular motion and/or touches a particular location on the steering wheel to select that particular icon or portion of the main menu that is displayed via the HUD 3550. In general, user interactivity with the one or more functions, systems, etc. of the vehicle may be facilitated via the user interacting with the one or more touch sensors 3510 that are associated with the steering wheel in conjunction with the HUD 3550.

Figure 36:
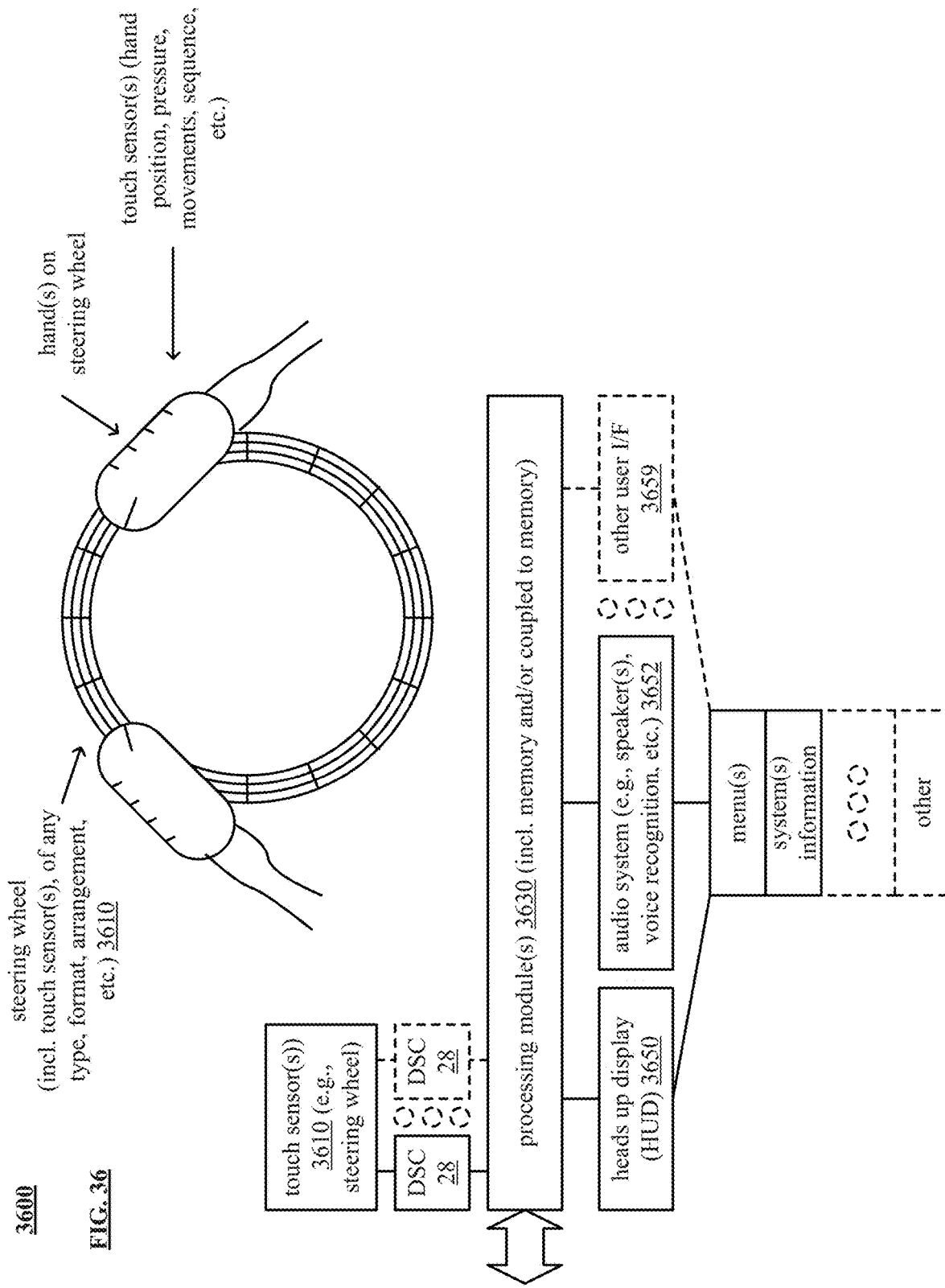
FIG. 36 is a schematic block diagram of another embodiment of a steering wheel implemented with a touch sensor in accordance with the present invention.

FIG. 36 is a schematic block diagram of another embodiment 3600 of a steering wheel implemented with a touch sensor in accordance with the present invention. A touch sensor system includes one or more touch sensors 3610. In this diagram, the one or more touch sensors 3610 are implemented within the steering wheel that is implemented within a vehicle. Note that the one or more touch sensors 3610 may be implemented within one or more films that is/are located on the inside and/or the outside of the steering wheel. The one or more touch sensors 3610 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types. In addition, note that the one or more touch sensors 3610 may be implemented within nontransparent or opaque portions of the steering wheel.

At the bottom left of the diagram, one or more processing modules 3630 is coupled to one or more drive-sense circuits (DSCs) 28. Note that the one or more processing modules 3630 may include integrated memory and/or be coupled to other memory. At least some of the memory stores operational instructions to be executed by the one or more processing modules 3630. One or more DSCs 28 is/are implemented to drive and simultaneously to sense respective one or more signals provided to the one or more touch sensors 3610.

Based upon user interaction with the one or more touch sensors 3610 associated with the steering wheel, the one or more processing modules 3630 facilitate execution of control of different respective functions associated with the vehicle. Any number of different functions 1 through n associated with the vehicle may be associated with user interaction with the one or more touch sensors 3610. In this diagram, the one or more processing modules 3630 facilitate execution of one or more operations associated with a heads up display (HUD) 3650, and audio system 3652 (e.g., which may include one or more speakers, a voice recognition system, and/or any other audio related operations), and/or any other user interface 3659 that allows information to be provided to the driver of the vehicle and/or allows input from the driver of the vehicle to be received.

Note that the coupling between the one or more processing modules 3630 and the various respective functions associated with the vehicle also may be made using one or more DSCs 28. For example, the interaction and operation between one or more processing modules 3630 and the various components associated with the vehicle to execute such functions may be made via one or more DSCs 28.

In some examples, user interactivity with the steering wheel and the one or more touch sensors 3610 associated therewith is driven in a manner similar to selectivity that is performed using the tab button on the keyboard and the enter button on the keyboard. For example, on a keyboard, when navigating a menu with multiple icons, navigation through the respective icons currently displayed may be performed using the tab button on the keyboard and when the desired icon is highlighted or currently selected, pressing the enter button on the keyboard executes the operation associated with that icon that is highlighted or currently selected. Within the operation of the one or more touch sensors 3610 and the HUD 3650, a particular motion and/or touches a particular location on the steering wheel (e.g., a tapping with the left index finger) performs the operation of navigation through the respective icons currently displayed via the HUD 3650, and a particular motion and/or touches a particular location on the steering wheel (e.g., a tapping the steering wheel with the right index finger) executes the operation associated with that icon that is highlighted or currently selected.

Note also that any desired mapping of user interaction with the one or more touch sensors 3610 associated with steering wheel may be made. For example, certain hand position on the steering wheel may be associated with a first operation, a particular pressure from the driver of the vehicle's hands on one or more portions of the steering wheel may be associated with a second operation, a particular movement of the driver of the vehicle's hands on one or more portions of the steering wheel may be associated with a third operation, a particular sequence of position, pressure, and/or movement of the driver of the vehicle's hands on one or more portions of the steering wheel may be associated with a fourth operation, etc. In general, any combination of various touches, positions, pressures, movements, sequences, tappings, rhythms, etc. and/or any other manner by which the driver of the vehicle may interact with the one or more touch sensors 3610 that are associated with steering wheel may be mapped and associated with various operations associated with the vehicle.

Note that interaction of the driver of the vehicle with the one or more touch sensors 3610 may be performed without the driver of the vehicle ever removing his or her hands from the steering wheel. The one or more processing modules 3630 facilitate interaction with the driver of the vehicle via one or more of the HUD 3650, the audio system 3652, and and/or another user interface 3659 based on one or more menus, one or more system information, and/or any other information.

Figure 37:
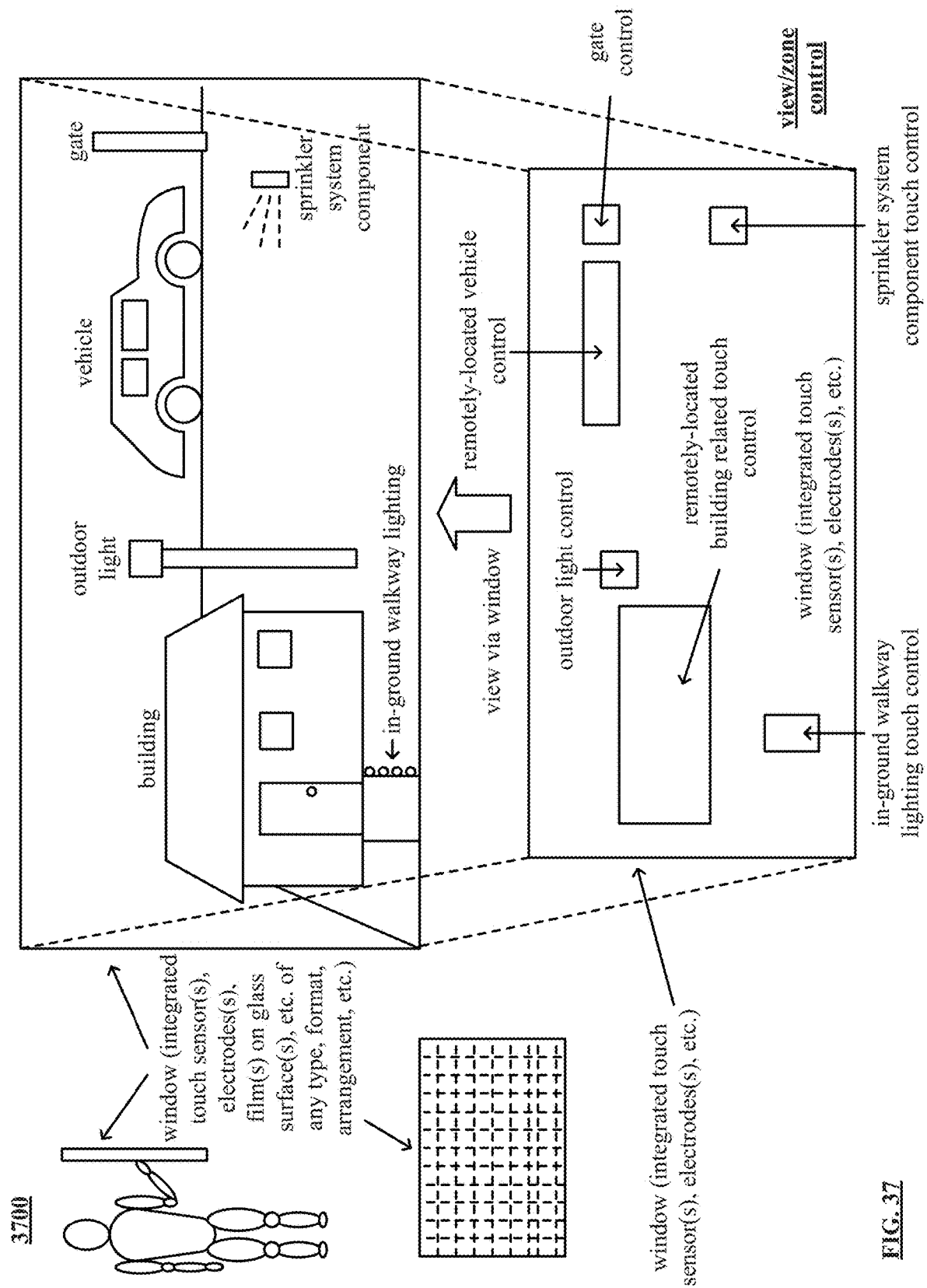
FIG. 37 is a schematic block diagram of an embodiment of a field of view user-interactive glass feature in accordance with the present invention.

FIG. 37 is a schematic block diagram of an embodiment 3700 of a field of view user-interactive glass feature in accordance with the present invention. In this diagram one or more touch sensors are associated with a window. The one or more touch sensors may be implemented in any of a variety of ways including integrated into the window, included in the film on any layer of the window, using one or more integrated touch sensors, using one or more electrodes, etc.

Different respective portions of the window and the associated portions of the one or more touch sensors that are associated with the window correspond to control operations associated with elements visible via the field of view of the window. For example, consider that the field of view of the window includes a building, and outdoor light, vehicle, a gate, the sprinkler system component, inground walkway lighting, etc. The respective portions of the one or more touch sensors that are associated with the window provide the control based on the associated with the portions of the window that include the respective elements via the field of view of the window.

For example, consider that the building is visible via the field of view of the window in a left-hand portion of the window and the inground walkway lighting is visible in the edit field of view of the window centrally below that left-hand portion of the window. Those portions of the one or more touch sensors that are located in the left-hand portion of the window provide touch control for the building (e.g., for any one or more of the respective components therein).

In an example of operation and implementation, the user interacts with the one or more touch sensors implemented in a left-hand portion of the field of view of the window to facilitate control of one or more aspects of the building and/or the inground walkway lighting. For example, a user interacting with the one or more touch sensors of the window that are included in the field of view of the window that includes the inground walkway lighting controls of the inground walkway lighting (e.g., turning them on, turning them off, controlling their brightness, etc. and/or any other control operation related to the gate inground walkway lighting).

In another example of operation and implementation, a user interacts with the one or more touch sensors implemented in an upper right-hand portion of the field of view of the window to facilitate control of the gate. For example, a user interacting with the one or more touch sensors of the window that are included in the field of view of the window that includes the gate controls of the gate (e.g., opening the gate, closing the gate, locking the gate, enabling the gate, disabling the gate, etc. and/or any other control operation related to the gate).

Similarly, with respect to the other portions of the field of view of the window, a user interacting with the one or more touch sensors implemented in the respective portions of the field of view of the window allow the user to interact with those other components.

Figure 38:
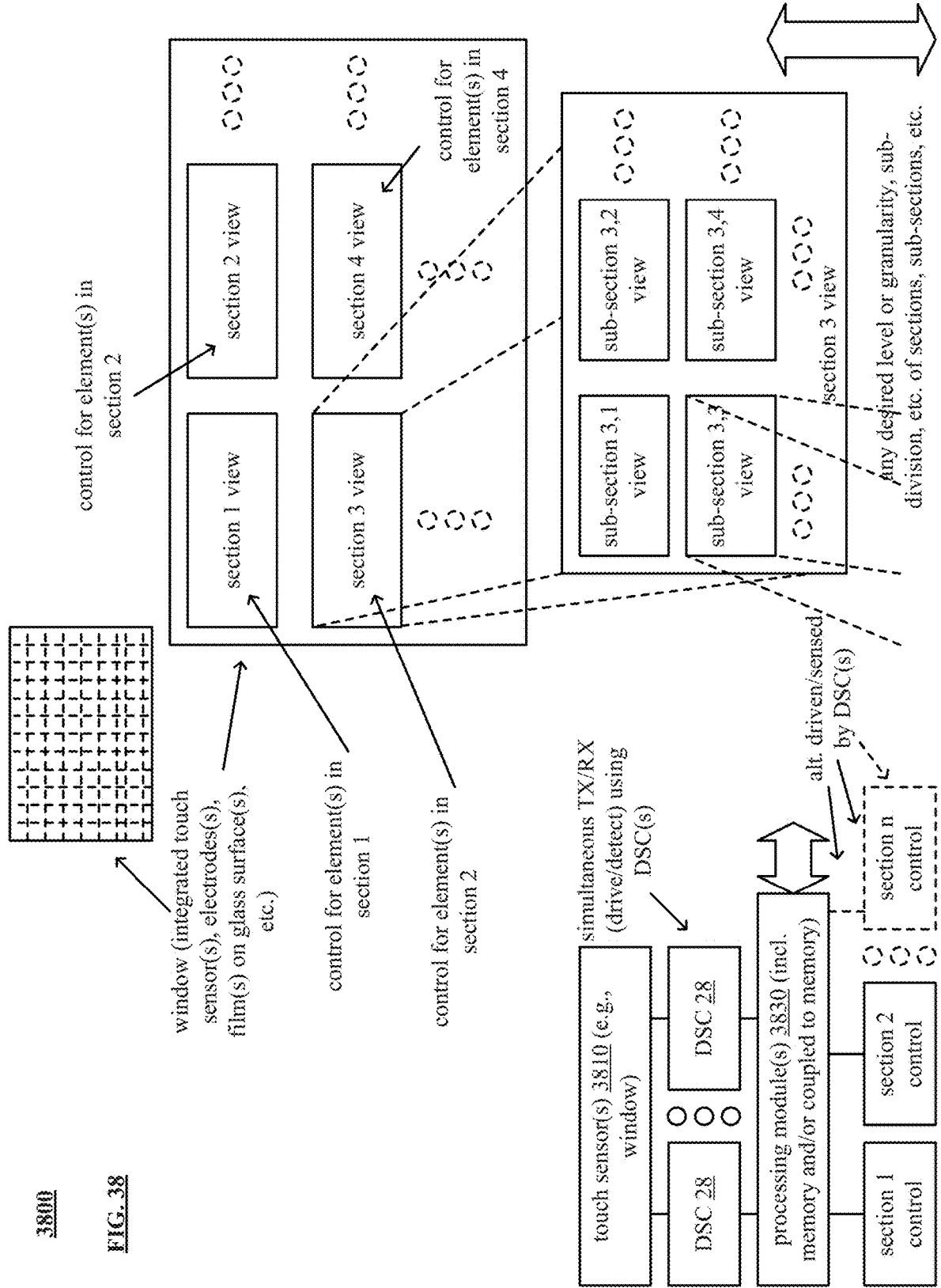
FIG. 38 is a schematic block diagram of another embodiment of a field of view user-interactive glass feature in accordance with the present invention.

FIG. 38 is a schematic block diagram of another embodiment 3800 of a field of view user-interactive glass feature in accordance with the present invention. A touch sensor system includes one or more touch sensors 3810. Note that the one or more touch sensors 3810 may be implemented and integrated within any type of element including glass, mirror, etc. Note that the one or more touch sensors 3810 may be implemented within one or more films that is/are located on the inside and/or the outside of such an element including glass, mirror, etc. The one or more touch sensors 3810 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

At the bottom left of the diagram, one or more processing modules 3830 is coupled to one or more drive-sense circuits (DSCs) 28. Note that the one or more processing modules 3830 may include integrated memory and/or be coupled to other memory. At least some of the memory stores operational instructions to be executed by the one or more processing modules 3830. One or more DSCs 28 is/are implemented to drive and simultaneously to sense respective one or more signals provided to the one or more touch sensors 3810.

In an example of operation and implementation, the one or more touch sensors 3810 are associated with elements that are visible via different respective section and/or sub-section views of the field of view of the window. For example, control for one or more elements that are visible via 4 different respective section of the field of view of the window are associated with 4 different portions of the one or more touch sensors 3810 on the middle and right hand side portion of the diagram.

In general, if any desired number of regions associated with different respective section views and/or sub-section views of the field of view of the window that may be associated with the one or more touch sensors 3810. In addition, any desired number of section views and sub-section views may be included with the field of view of the window. For example, considering a section 3 view that includes one or more elements therein based on the field of view of the window. Note that there may be any number of sub-sections included therein. In one specific example, the section 3 view includes one or more sub-section 3,1 through 3,4 views, etc. In general, any desired level of granularity, sub-division, etc. of the one or more section views, the one or more section views, may be implemented with respect to the field of view of the window that is associated with the one or more touch sensors 3810.

Based upon user interaction with the one or more touch sensors 3810 and specifically on the one or more section views and/or sub-section views that are associated with the one or more touch sensors 3810, the one or more processing modules 3830 facilitate execution of control of different respective operations. For example, interaction with the one or more section 1 view in the upper left-hand portion of the element on which the one or more identifiers are implemented execution of control of operations associated with one or more elements included within the section 1 view in the upper left-hand portion of the field of view of the window.

Note that the coupling between the one or more processing modules 3830 and the various respective functions associated with the one or more section views and/or sub-section views also may be made using one or more DSCs 28. For example, the interaction and operation between one or more processing modules 3830 and the various components associated with the one or more section views and/or sub-section views to execute such functions may be made via one or more DSCs 28.

Figure 39:
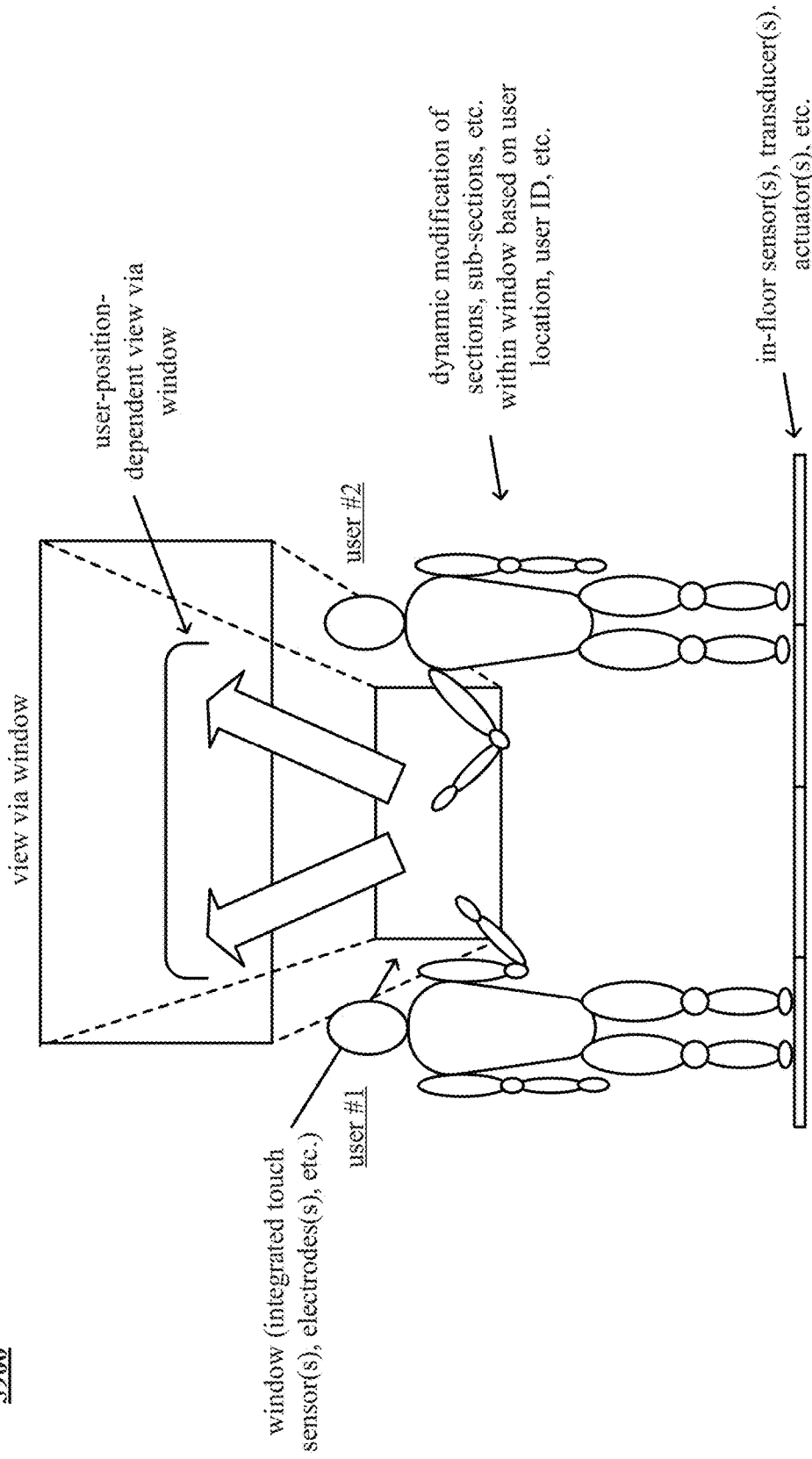
FIG. 39 is a schematic block diagram of another embodiment of a field of view user-interactive glass feature in accordance with the present invention.

FIG. 39 is a schematic block diagram of another embodiment 3900 of a field of view user-interactive glass feature in accordance with the present invention. In addition, in certain embodiments, identification of the location of a user and/or identification of the user who is interacting with the one or more touch sensors that are associated with the field of view of the window is used to perform dynamic modification of the sections and/or sub-sections within the field of view of the window. For example, one or more in floor sensors, transducers, actuators, etc. may be implemented to detect a user proximate to the window, interacting with the one or more touch sensors of the window, and/or who is likely to interact with the one or more touch sensors of the window. Based upon detection of the user, the respective one or more sections and/or sub-sections within the field of view of the window are dynamically modified based upon the expected field of view through the window based upon the location of the user.

In some examples, a signal is driven via capacitively coupling (CC) through the user to provide for unique identification of the user when interacting with the one or more touch sensors associated with the window. For example, when two respective users are interacting with the one or more touch sensors associated with the window, the two respective users may have different perspectives of the respective elements within the field of view of the window. The respective sections and/or sub-sections within the field of view of the window are dynamically adjusted appropriately for each of the two respective users when interacting with the one or more touch sensors associated with the window. For example, for a user on the left-hand side of the window, the sections and/or sub-sections within the field of view of the window are dynamically adjusted with reference to the one or more touch sensors associated with the window so that control and interactivity of the elements within the field of view from that user's perspective are appropriately aligned. Similarly, for user on the right-hand side of the window, the sections and/or sub-sections within the field of view of the window are dynamically adjusted with reference to the one or more touch sensors associated with the window so that control and interactivity of the elements within the field of view from that user's perspective are appropriately aligned. In this way, a particular portion of the one or more touch sensors can potentially provide control for different respective elements within the field of view of the window depending upon which user is interacting with the one or more touch sensors.

In an example of operation and implementation, with a reference back to FIG. 37, consider an example that a first user is located on the left-hand side of the window, and a second user is located on the right-hand side of the window. The first user views the building via a left-hand central portion of the window. The second user views that same building via a middle to right-hand portion of the window. One or more processing modules is implemented to detect not only be user interaction of the first user and the second user but also to discriminate which user interaction corresponds to the first user for the second user. As such, different respective portions of the one or more touch sensors associated with the window provide control for the same element within the field of view of the window, e.g., the building, based upon which user is interacting with the one or more touch sensors associated with the window based upon where that element within the field of view of the window, e.g., the building, is seen from the perspective of the two different users.

Figure 40:
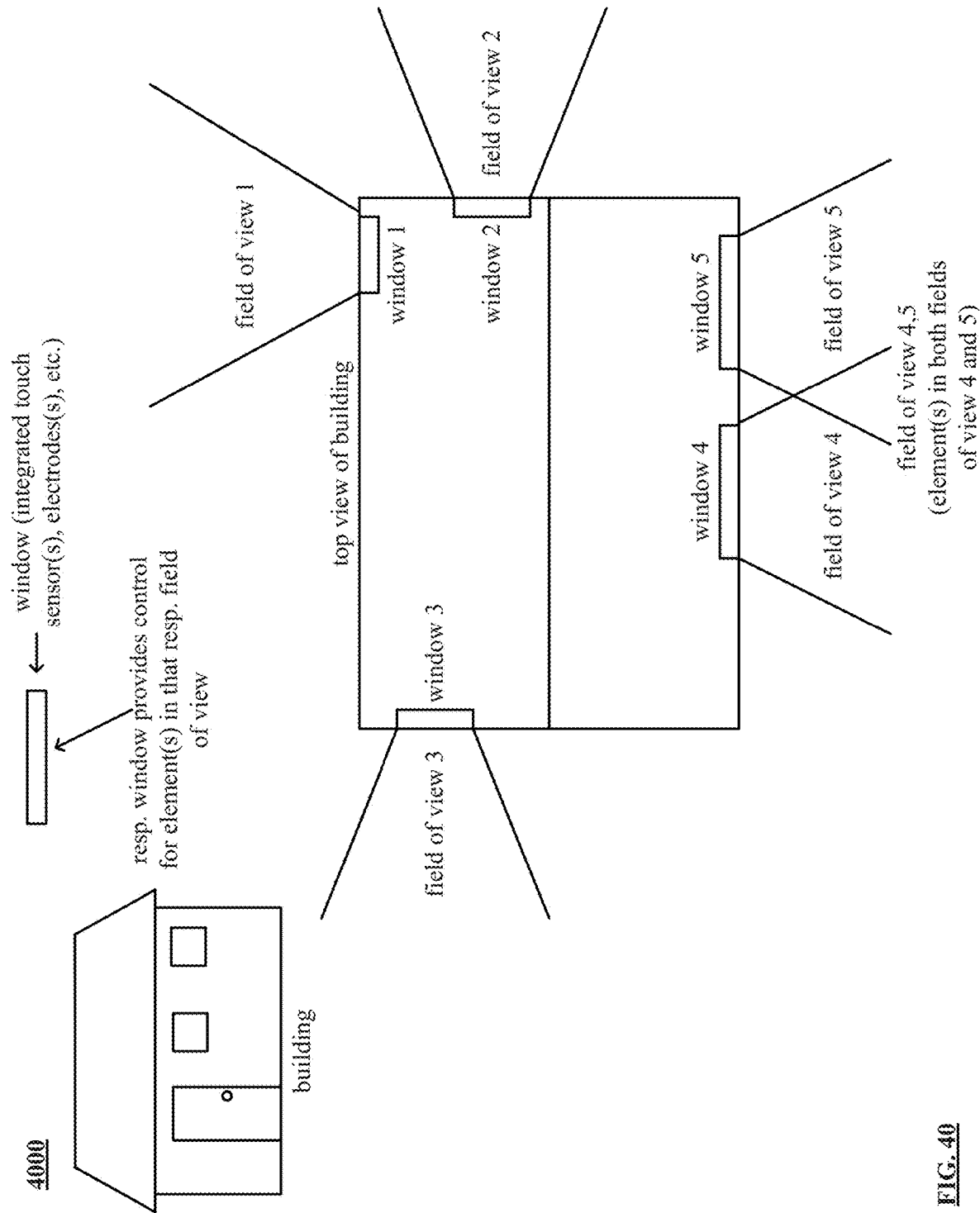
FIG. 40 is a schematic block diagram of another embodiment of a field of view user-interactive glass feature in accordance with the present invention.

FIG. 40 is a schematic block diagram of another embodiment 4000 of a field of view user-interactive glass feature in accordance with the present invention. This diagram shows different respective windows, which have different respective one or more touch sensors associated therewith, within a building providing different respective fields of view. Note that some of the fields of view may have some overlap.

The different respective one or more touch sensors associated with the different respective windows of the building provide for user interaction with respect to those elements that are visible within the respective fields of view provided from the windows.

When there is overlap between two fields of view from two different windows, note that user interaction with the one or more touch sensors associated with those two different windows may provide for control of the same element visible from those two fields of view from those two different windows.

Considering a specific example, consider that a sprinkler system is visible via the field of view 4 from window 4 and also via the field of view 5 from window 5. User interaction with the appropriate portion of the one or more touch sensors that are associated with window 4 and also user interaction with the appropriate portion of the one or more touch sensors that are associated with window 5 will control the sprinkler system (e.g., turning it on, turning it off, controlling water only and flow, controlling the rate of operation of the components therein, any timing controls, etc. and/or any other control operations associated with this breaker system).

Figure 41:
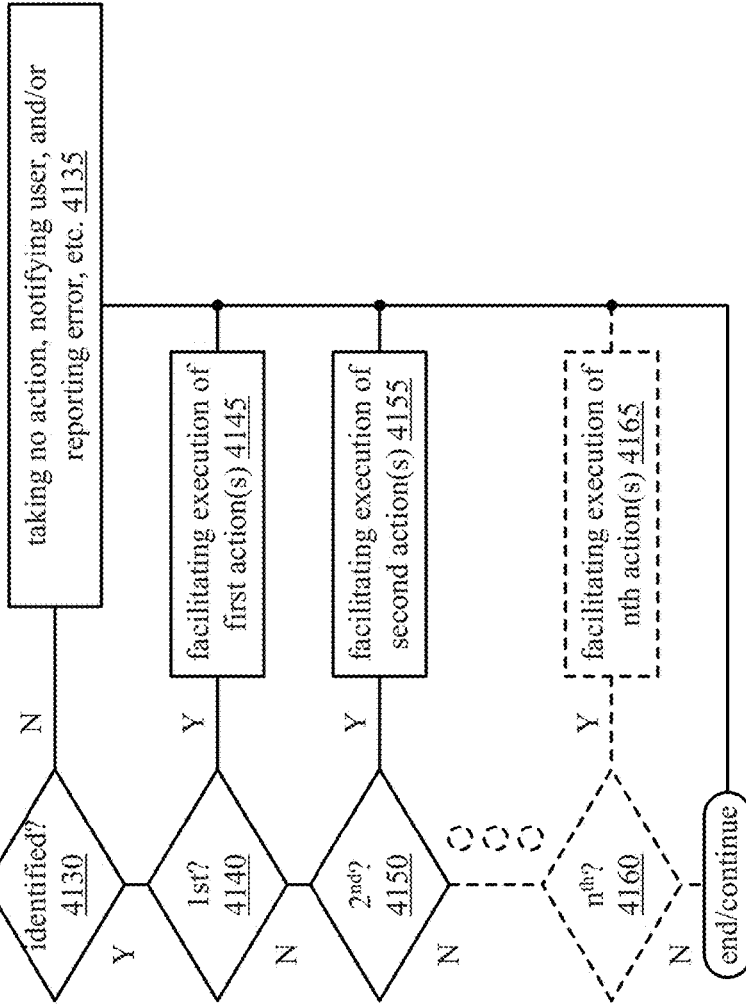
FIG. 41 is a schematic block diagram of an embodiment of another embodiment of a method for execution by one or more devices in accordance with the present invention.

FIG. 41 is a schematic block diagram of an embodiment of another embodiment of a method 4100 for execution by one or more devices in accordance with the present invention. The method 4100 operates in step 4110 by detecting motion or touch on one or more touch sensors. As described herein, note that the one or more touch sensors may be implemented in any of a number of varieties including those described herein.

The method 4100 operates in step 4120 by processing the motion or touch. Based on a failure to perform identification of the motion or touch, the method 4100 operates via step 4130 and step 4135 by performing one or more operations associated with failure to identify the motion or touch. Some examples of such operations associated with failure to identify the motion or touch may include one or more of taking no action, notifying a user, reporting an error, etc., and/or any other appropriate operation.

Based upon identification of the motion or touch, the method 4100 operates by appropriately identifying the motion or touch in accordance with one or more categories of motion or touch.

Based upon identification of the motion or touch being associated with a first category of motion or touch, the method 4100 operates via step 4140 and step 4145 by facilitating execution of a first one or more actions.

Based upon failure to perform identification of the motion or touch being associated with a first category of motion or touch, the method 4100 operates via step 4140 to step 4150 by appropriately identifying the motion or touch in accordance with other of the one or more categories of motion or touch.

Based upon identification of the motion or touch being associated with a second category of motion or touch, the method 4100 operates via step 4150 and step 4155 by facilitating execution of a second one or more actions.

In general, this process of performing identification of the motion or touch being associated with different respective categories of motion or touch can be performed based on n number of categories of motion or touch.

For example, based upon failure to perform identification of the motion or touch being associated with first through n−1 categories of motion or touch, the method 4100 operates via step 4160 by appropriately identifying the motion or touch in accordance with the nth category of motion or touch.

Based upon identification of the motion or touch being associated with an nth category of motion or touch, the method 4100 operates via step 4160 and step 4165 by facilitating execution of an nth one or more actions. In the event that the identified motion or touch is not properly associate with any of the respective categories of motion or touch, the method 4100 ends, provides an error message, provides notification to the user, provide notification to one or more other devices, etc.

Figure 42:
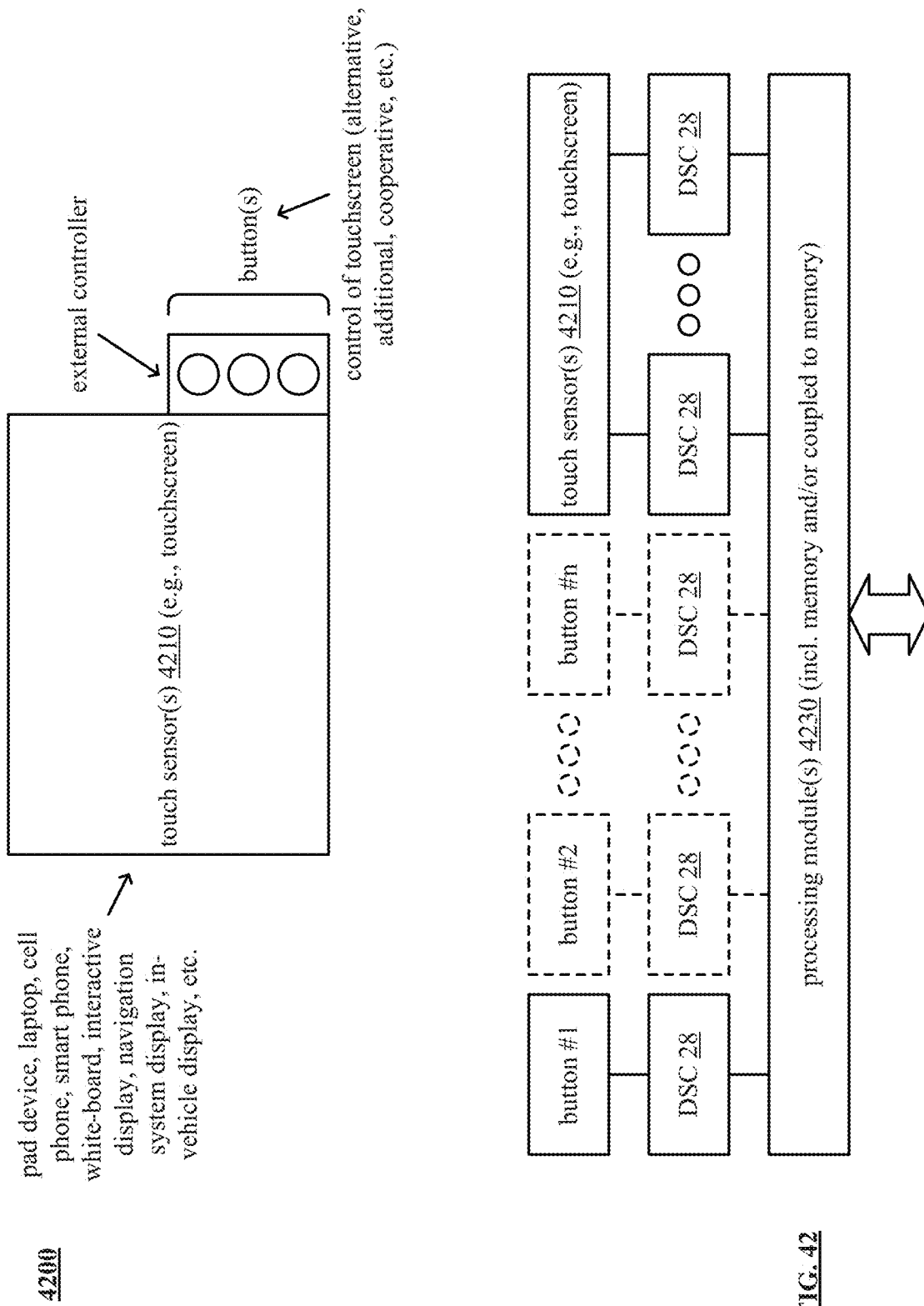
FIG. 42 is a schematic block diagram of an embodiment of a touchscreen implemented with an external controller in accordance with the present invention.

FIG. 42 is a schematic block diagram of an embodiment 4200 of a touchscreen implemented with an external controller in accordance with the present invention. In this diagram, one or more touch sensors 4210 and an external controller that includes one or more buttons are both controlled by one or more processing modules 4230. Note that the one or more touch sensors 4210 may be of any variety and type as described herein. In some examples, the one or more touch sensors 4210 are included within pad device, laptop, cell phone, smartphone, whiteboard, and interactive display, and navigation system display, and in vehicle display, etc., and/or any other type of device in which the one or more touch sensors 4210 may be implemented. Note that the manner, type, and variety of the respective one or more touch sensors may be of any desired type.

A touch sensor system includes one or more touch sensors 4210. The one or more touch sensors 4210 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. With respect to the various embodiments, implementations, etc. of various respective touch sensors as described herein, note that they may also be of any such variety of one or more types.

At the bottom of the diagram, one or more processing modules 4230 is coupled to drive-sense circuits (DSCs) 28. Note that the one or more processing modules 4230 may include integrated memory and/or be coupled to other memory. At least some of the memory stores operational instructions to be executed by the one or more processing modules 4230. A first group of one or more DSCs 28 is/are implemented to drive and simultaneously to sense respective one or more signals provided to the one or more touch sensors 4210. A first group of one or more DSCs 28 is/are implemented to drive and simultaneously to sense respective one or more signals provided to the external controller (e.g., to the one or more respective buttons implemented therein). In some examples, a respective DSC is implemented to drive and simultaneously to sense a respective one or more signals provided to a respective button on the external controller. For example, a first DSC is implemented to drive and simultaneously to sense a first respective one or more signals provided to a first respective button on the external controller, and a second DSC is implemented to drive and simultaneously to sense a second respective one or more signals provided to a second respective button on the external controller.

Note that the very same one or more processing modules 4230 is configured to drive and simultaneously to sense respective one or more signals provided to both the one or more touch sensors 4210 and the external controller via the respective DSCs.

Note that control of the touchscreen may be effectuated based on user interaction with one or more of the buttons. Such one or more buttons associated with the external controller may be alternative to, in addition to, and/or cooperative in the control effectuated via the one or more touch sensors 4210.

Figure 43:
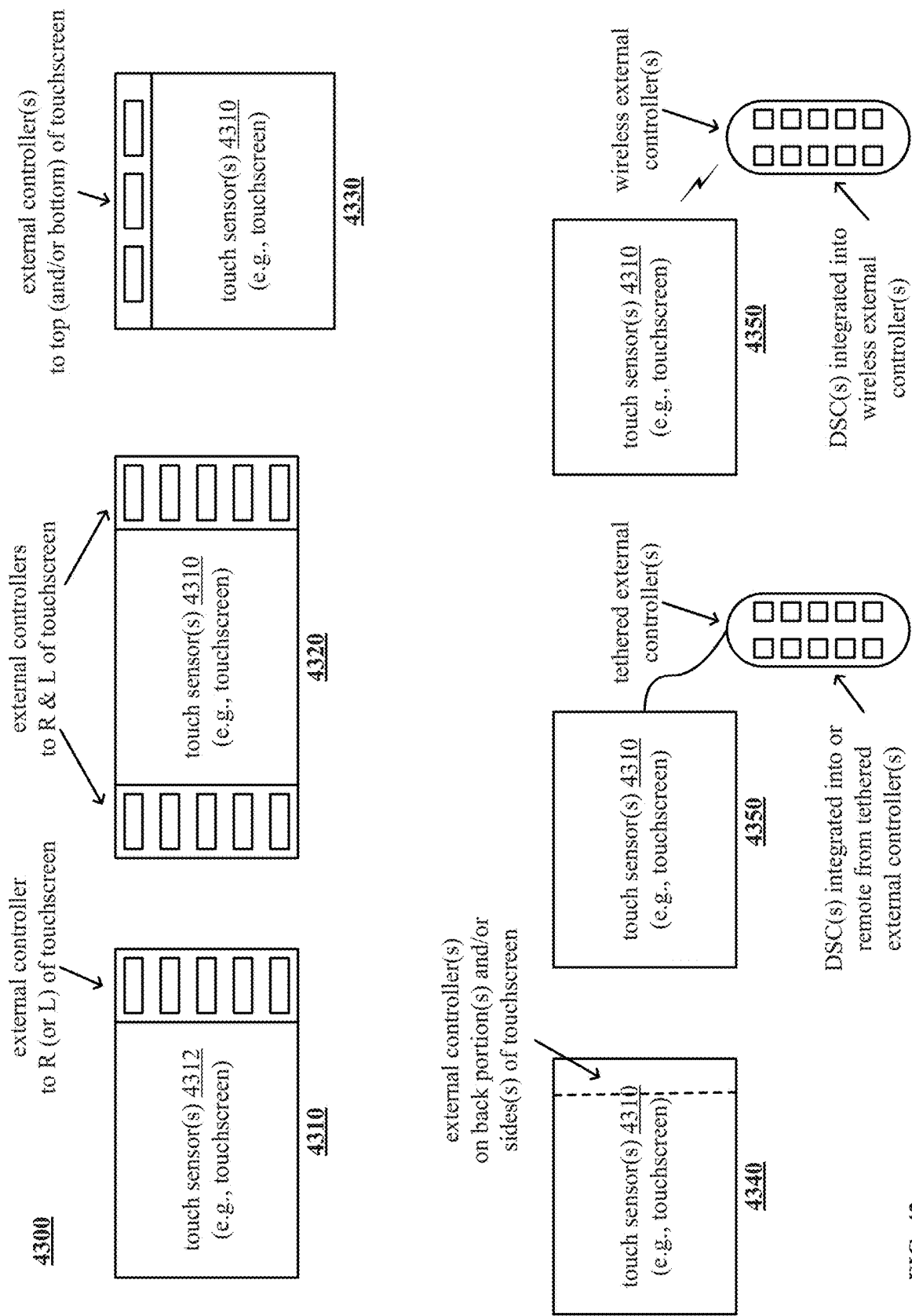
FIG. 43 is a schematic block diagram of various embodiment of touchscreens implemented with external controllers in accordance with the present invention.

FIG. 43 is a schematic block diagram of various embodiment 4300 of touchscreens implemented with external controllers in accordance with the present invention. This diagram shows multiple different examples by which an external controller may be implemented in conjunction with one or more touch sensors 4310.

Embodiment 4312 includes one or more touch sensors 4310 accompanied with an external controller that is implemented on a side of a touchscreen (e.g., on the left or right hand side of the touchscreen). Note that the very same one or more processing modules is configured to drive and simultaneously to sense respective one or more signals provided to both the one or more touch sensors 4310 and the external controller via the respective DSCs.

Embodiment 4320 includes one or more touch sensors 4310 accompanied with two external controllers that are implemented on the sides of a touchscreen. Note that the very same one or more processing modules is configured to drive and simultaneously to sense respective one or more signals provided to both the one or more touch sensors 4310 and also to both of the external controllers via the respective DSCs.

Embodiment 4330 includes one or more touch sensors 4310 accompanied with an external controller that is implemented on a top of a touchscreen. Note that the very same one or more processing modules is configured to drive and simultaneously to sense respective one or more signals provided to both the one or more touch sensors 4310 and the external controller via the respective DSCs.

Embodiment 4340 includes one or more touch sensors 4310 accompanied with one or more external controllers that is/are implemented on a back of a touchscreen. Note that the very same one or more processing modules is configured to drive and simultaneously to sense respective one or more signals provided to both the one or more touch sensors 4310 and the one or more external controllers via the respective DSCs.

Embodiment 4350 includes one or more touch sensors 4310 accompanied with one or more external controllers that is/are tethered to the one or more touch sensors 4310. Note that the very same one or more processing modules is configured to drive and simultaneously to sense respective one or more signals provided to both the one or more touch sensors 4310 and the one or more external controllers that is/are tethered via the respective DSCs. Note that the DSCs that are implemented to drive and simultaneously to sense respective one or more signals provided to the one or more external controllers that is/are tethered may be implemented within the one or more external controllers that is/are tethered and/or the element that includes the one or more touch sensors 4310.

Embodiment 4360 includes one or more touch sensors 4310 accompanied with one or more external controllers that is/are in wireless communication with the one or more touch sensors 4310. Note that the one or more processing modules is configured to drive and simultaneously to sense respective one or more signals provided to the one or more touch sensors 4310. In some examples, the one or more external controllers that is/are in wireless communication with the one or more touch sensors 4310 includes one or more respective DSCs.

Note that the DSCs that are implemented to drive and simultaneously to sense respective one or more signals provided to the one or more external controllers that is/are tethered may be implemented within the one or more external controllers that is/are tethered and/or the element that includes the one or more touch sensors 4310.

In general, note that any desired configuration of one or more touch sensors and one or more external controllers including one or more buttons may be implemented and coupled to one or more processing modules via a respective DSCs.

Figure 44:
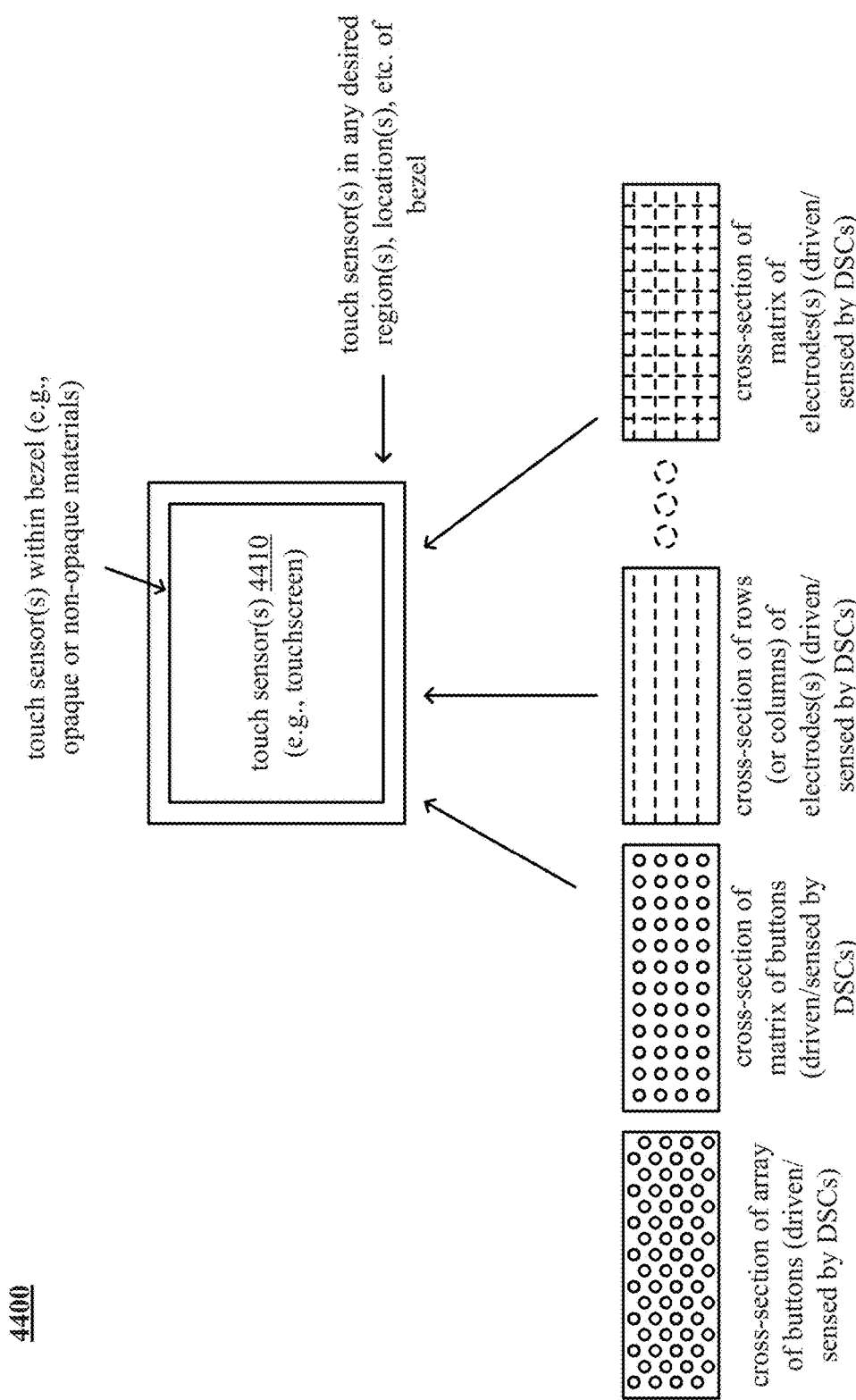
FIG. 44 is a schematic block diagram of an embodiment of a touchscreen implemented with one or more touch sensors implemented in touchscreen's bezel the in accordance with the present invention.

FIG. 44 is a schematic block diagram of an embodiment 4400 of a touchscreen implemented with one or more touch sensors implemented in touchscreen's bezel the in accordance with the present invention. This diagram shows one or more touch sensors 4410 (e.g., such as in a touchscreen implementation that includes a bezel around at least a portion of the touchscreen). Different respective configurations are also shown by one or more touch sensors may be implemented within the bezel. Note that the one or more touch sensors within the bezel may be implemented using opaque or non-opaque materials. For example, the one or more sensors implemented within the bezel need not be implemented using transparent conductive materials.

The bottom of this diagram shows some different respective options (e.g., cross-sections thereof) by which the one or more touch sensors implemented within the bezel may be implemented. For example, the one or more touch sensors implement within the bezel may include an array of buttons driven/sensed by one or more DSCs, a matrix of buttons driven/sensed by one or more DSCs, rows (or columns) of one or more electrodes driven/sensed by one or more DSCs, a matrix of electrodes driven/sensed by one or more DSCs, etc. Note that these different respective options did not compose an exhaustive list. In addition, note the different respective portions of the one or more touch sensors within the bezel may be implemented differently. For example, first portion of the one or more touch sensors within the bezel may be implemented using an array of buttons driven/sensed by one or more DSCs while a second portion of the one or more touch sensors within the bezel may be implemented using rows (or columns) of one or more electrodes driven/sensed by one or more DSCs. In general, any desired combination of different respective implementations of the one or more touch sensors may be included within the bezel.

Figure 45:
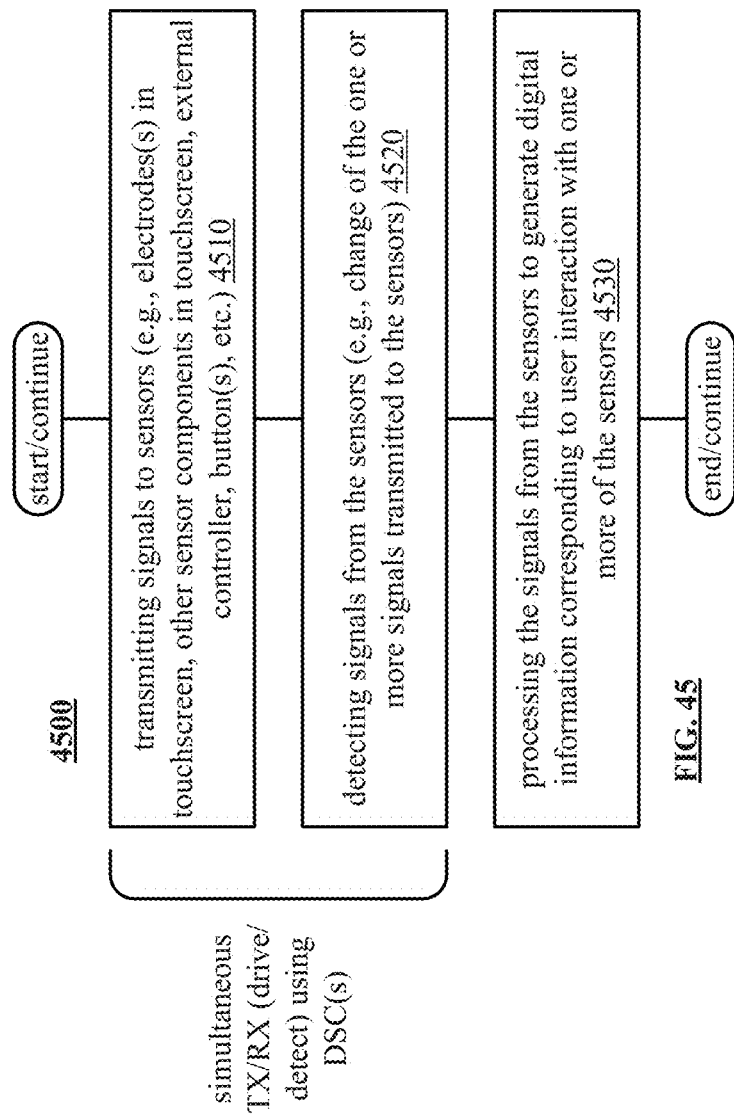
FIG. 45 is a schematic block diagram of an embodiment of another embodiment of a method for execution by one or more devices in accordance with the present invention.

FIG. 45 is a schematic block diagram of an embodiment of another embodiment of a method 4500 for execution by one or more devices in accordance with the present invention. The method 4500 operates in step 4510 by transmitting signals to sensors. For example, the sensors may be implemented in any desired format and type including any of the respective examples, embodiments, etc. as described herein.

The method 4500 operates in step 4520 by detecting signals from the sensors. For example, such detection may include detecting the change of any one or more of the signals that are being transmitted to the sensors. In addition, such detection may include detecting any one or more additional signals that are coupled into the sensors. Note that the operations of the steps 4510 and 4520 may be performed simultaneously. For example, note that the transmitting of the signals to the sensors and detecting of the signals from the sensors may be performed simultaneously. Note that one or more DSCs may be implemented to drive and simultaneously to sense one or more signals provided to the one or more sensors.

The method 4500 operates in step 4530 by processing the signals from the sensors to generate digital information corresponding to user interaction with one or more of the sensors.

Also, note that the different respective sensors may correspond to different respective portions of the system. For example, a first sensor may be associated with one or more touch sensors. A second sensor may be associated with a button of an external controller.

Figure 46:
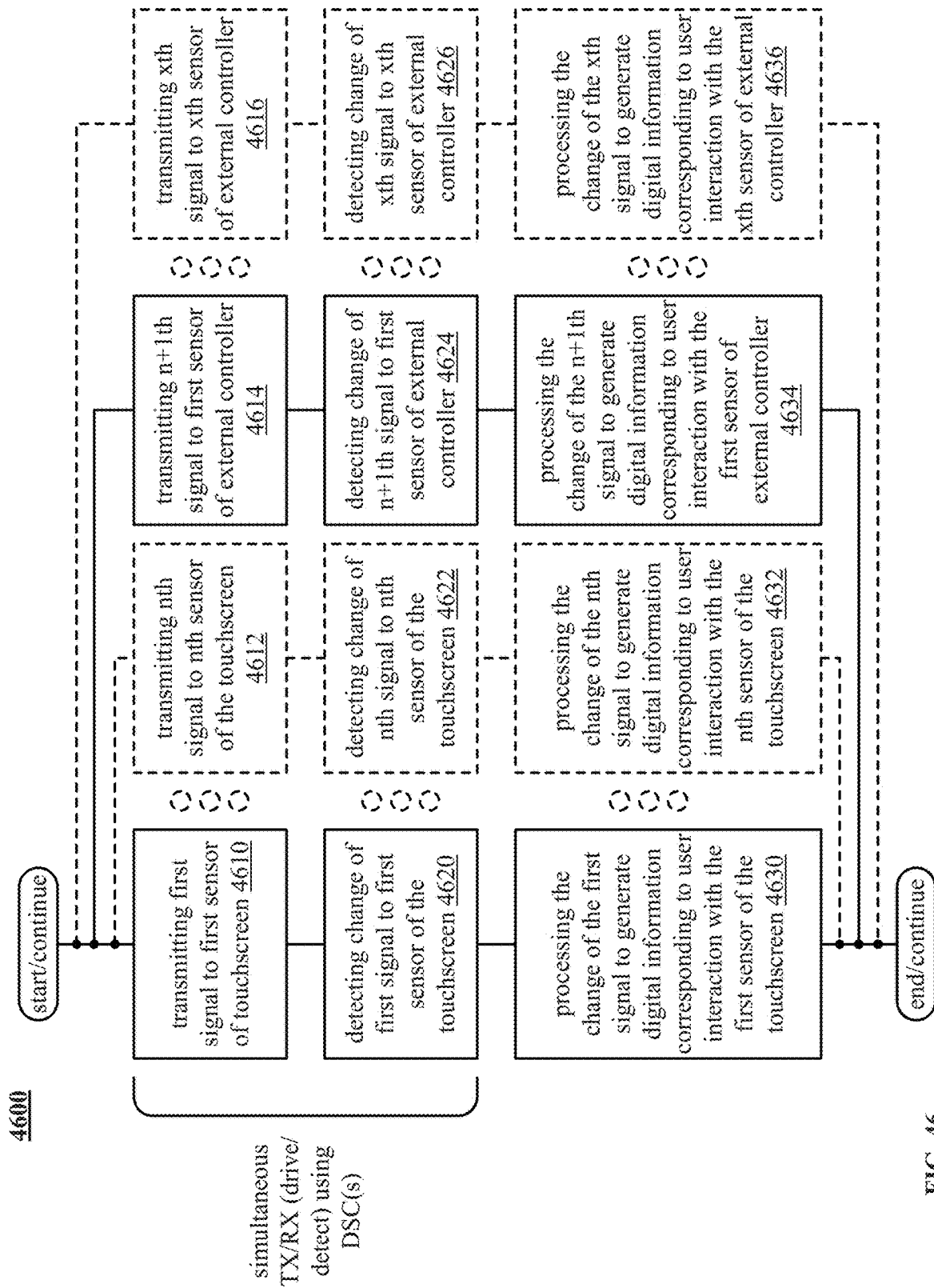
FIG. 46 is a schematic block diagram of an embodiment of another embodiment of a method for execution by one or more devices in accordance with the present invention.

FIG. 46 is a schematic block diagram of an embodiment of another embodiment of a method 4600 for execution by one or more devices in accordance with the present invention. The method 4600 operates in step 4610 by transmitting a first signal to a first sensor of a touchscreen. In addition, the method 4600 operates in step 4620 by detecting change of the first signal to the first sensor of the touchscreen. Note that the operations of the steps 4610 and 4620 may be performed simultaneously. Such operations may be performed using one or more DSCs implemented to drive and simultaneously to sense one or more signals provided to the one or more sensors. The method 4600 operates in step 4630 by processing the change of the first signal to generate digital information corresponding to user interaction with the first sensor of the touchscreen.

Optionally, any number of additional sensors of the touchscreen may be implemented and similarly operated. For example, the method 4600 operates in step 4612 by transmitting an nth signal to an nth sensor of a touchscreen. In addition, the method 4600 operates in step 4622 by detecting change of the nth signal to the nth sensor of the touchscreen. Note that the operations of the steps 4610 and 4622 may be performed simultaneously. Such operations may be performed using one or more DSCs implemented to drive and simultaneously to sense one or more signals provided to the one or more sensors. The method 4600 operates in step 4632 by processing the change of the nth signal to generate digital information corresponding to user interaction with the nth sensor of the touchscreen.

The method 4600 also operates in step 4614 by transmitting an n+1th signal to a first sensor of an external controller. In addition, the method 4600 operates in step 4623 by detecting change of the n+1th signal to the first sensor of the external controller. Note that the operations of the steps 4614 and 4624 may be performed simultaneously. Such operations may be performed using one or more DSCs implemented to drive and simultaneously to sense one or more signals provided to the one or more sensors. The method 4600 operates in step 4634 by processing the change of the n+1th signal to generate digital information corresponding to user interaction with the first sensor of the external controller.

Optionally, any number of additional sensors of the external controller may be implemented and similarly operated. For example, the method 4600 operates in step 4616 by transmitting an xth signal to an xth sensor of an external controller. In addition, the method 4600 operates in step 4626 by detecting change of the xth signal to the xth sensor of the external controller. Note that the operations of the steps 4610 and 4626 may be performed simultaneously. Such operations may be performed using one or more DSCs implemented to drive and simultaneously to sense one or more signals provided to the one or more sensors. The method 4600 operates in step 4636 by processing the change of the xth signal to generate digital information corresponding to user interaction with the xth sensor of the external controller.

Figure 47:
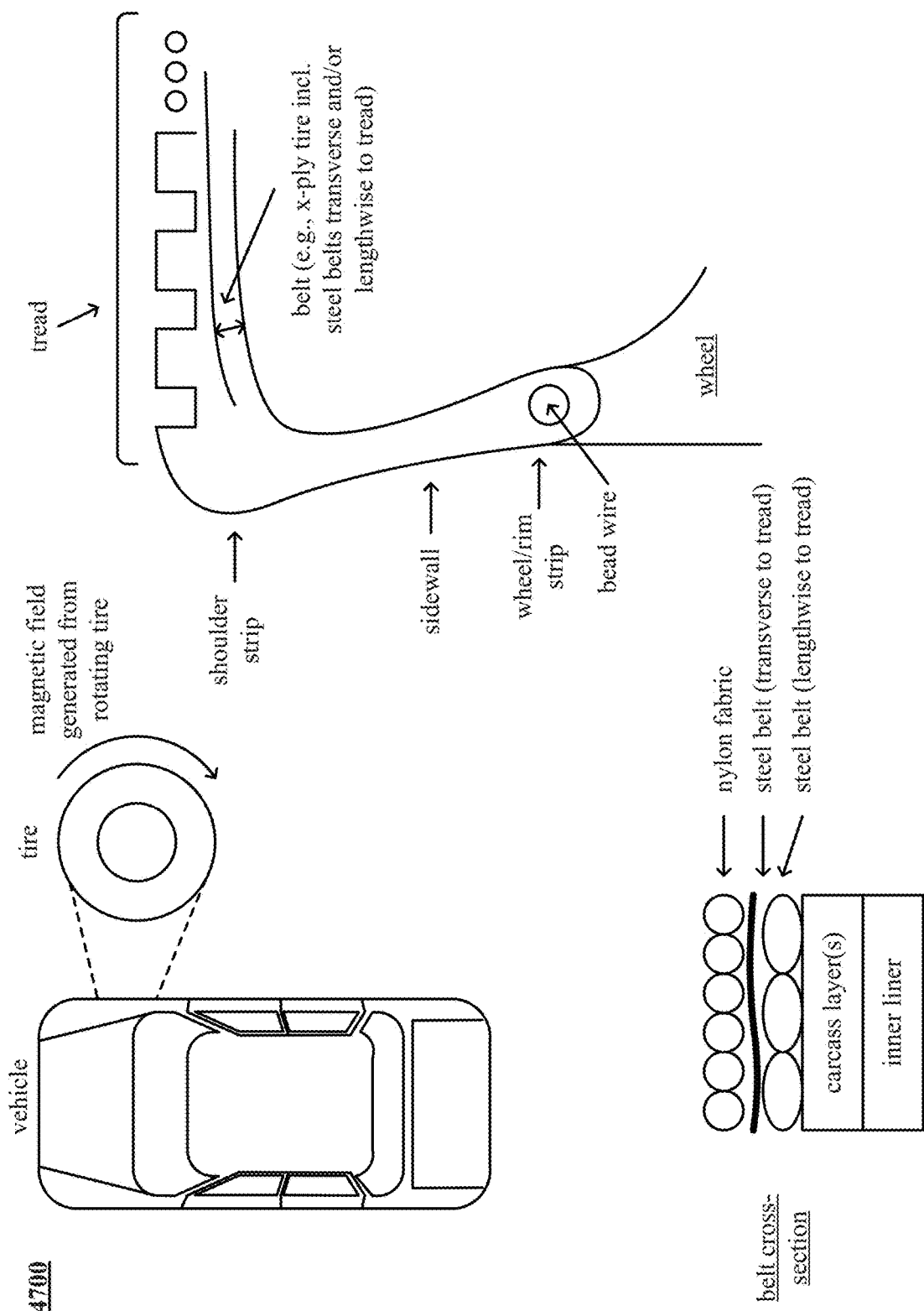
FIG. 47 is a schematic block diagram of an embodiment of a radial tire in accordance with the present invention.

FIG. 47 is a schematic block diagram of an embodiment 4700 of a radial tire in accordance with the present invention. A vehicle typically includes four tires that are in contact with the road or ground during the vehicle's operation. Certain types of vehicles include more than four tires (e.g., some trucks include two front tires and four rear tires, two on each side, some commercial vehicles include larger numbers of tires sometimes up to 18 tires that are in contact with the road around during the vehicle's operation, etc.).

A radial tire is a particular type of vehicle entire that includes cord plies that are arranged in one or more directions with respect to the tread of the tire. The right-hand side of the diagram includes a cross-section of radial tire. Generally speaking, within a radial tire, a series of plies of cord reinforces the tire. The network or cords is implemented to give shape and strength to the tire, and that section is oftentimes referred to as the carcass layers. Considering the radial tire from the portion that is in contact with the road, the radial tire includes tread, below which is a belt composed of one or more layers and/oral minors, a shoulder strip on the outside of the tire, a sidewall, and a wheel/rim strip. Typically, a bead wire is included within the radial tire near where the tire interfaces with the wheel. In addition, a bead chafer and bead filler may be included above and/or around the bead wire nearby the wheel/rim strip of the tire.

Referring to a cross-section of the belt of the tire, an x-ply (where x is some positive integer) includes steel belts transverse and/or lengthwise to the tread. In some examples, the belt is composed of the nylon fabric, a steel belt that is transverse to the tread, a steel belt that is lengthwise to the tread, one or more carcass layers, and an inner liner.

During normal operation of the vehicle, as the tire is rotating, magnetic field is generated from the rotating tire. The one or more steel belts within a radial tire generate a magnetic field as the tire rotates.

Figure 48:
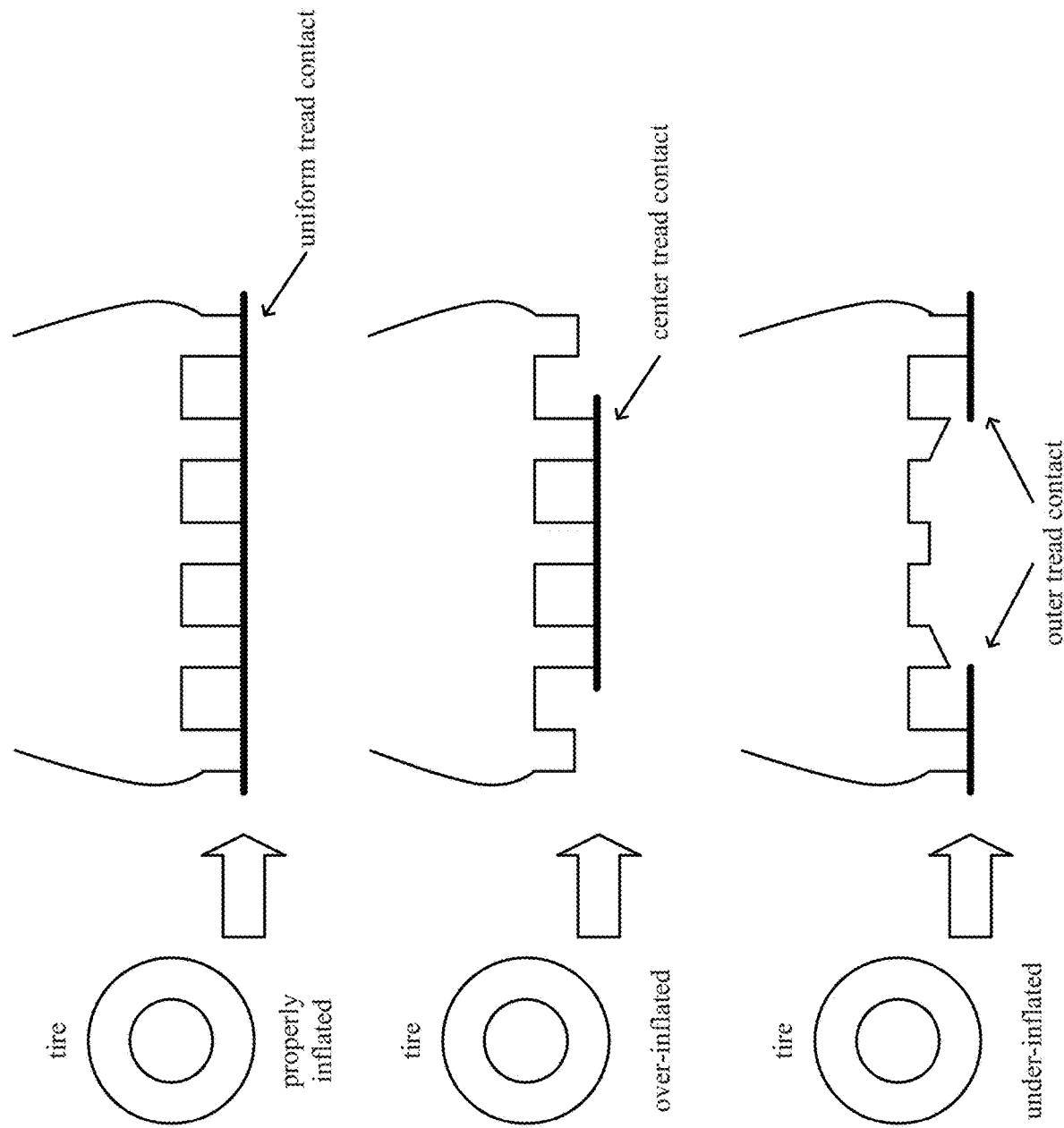
FIG. 48 is a schematic block diagram of an embodiment of a various degrees of inflation of a tire in accordance with the present invention.

FIG. 48 is a schematic block diagram of an embodiment 4800 of a various degrees of inflation of a tire in accordance with the present invention. This diagram shows various examples of types of inflation with respect to tire. At the top of the diagram, a properly inflated tire will generally maintain uniform tread contact with the road or ground across the entire tread of the tire.

In the middle of the diagram, an over-inflated tire will generally have tread contact with the road or ground only in the middle portion of the tread (e.g., center tread contact). At the bottom of diagram, an under-inflated tire will generally have tread contact with the road or ground on the outer portions of the tread (e.g., outer tread contact).

The shape of the tire will be modified based on the amount of error pressure and/or degree of inflation of the tire. In addition, the shape of the one or more steel belts within a radial tire will accordingly be modified based on amount of air pressure and/or degree of inflation of the tire.

As a tire is rotating and as a magnetic field is being generated by the rotating one or more steel belts of the tire, when there is a change of amount of air pressure and/or degree of inflation of the tire (e.g., based on a puncture, a rupture, flat, loss of air pressure, etc.), then one or more characteristics of the magnetic field will also be changed based on the shape of the tire being changed and the physical displacement of the one or more steel treads and/or bead wire of the tire.

For example, when the tire has gone flat during the vehicle's motion operation, the one or more steel treads and/or bead wire of the tire will not have a substantially uniform distribution around the center of the wheel. For example, on the bottom of the wheel near the road or ground, the one or more steel treads and/or bead wire of the tire will be in a substantially straight line and relatively closer to the center of the wheel. However, on the side and on the top of the tire, the one or more steel treads and/or bead wire of the tire may still exhibit a substantially uniform distribution around the center of the wheel. This transition from an inflated tire to a flat tire will result in a modification and change of the magnetic field being generated by the rotating tire. Detection of this modification and change of the magnetic field may be used to determine an adverse condition with respect to the tire.

A tire pressure monitoring system is implemented using one or more DSCs as described herein in conjunction with one or more devices operative to detect and/or a monitor magnetic fields. Appropriate monitoring of the magnetic field that is generated by radio tire allows for monitoring of the tire and correlating that magnetic field to potential problems with the tire (e.g., puncture, rupture, flat, loss of air pressure, etc.).

Figure 49:
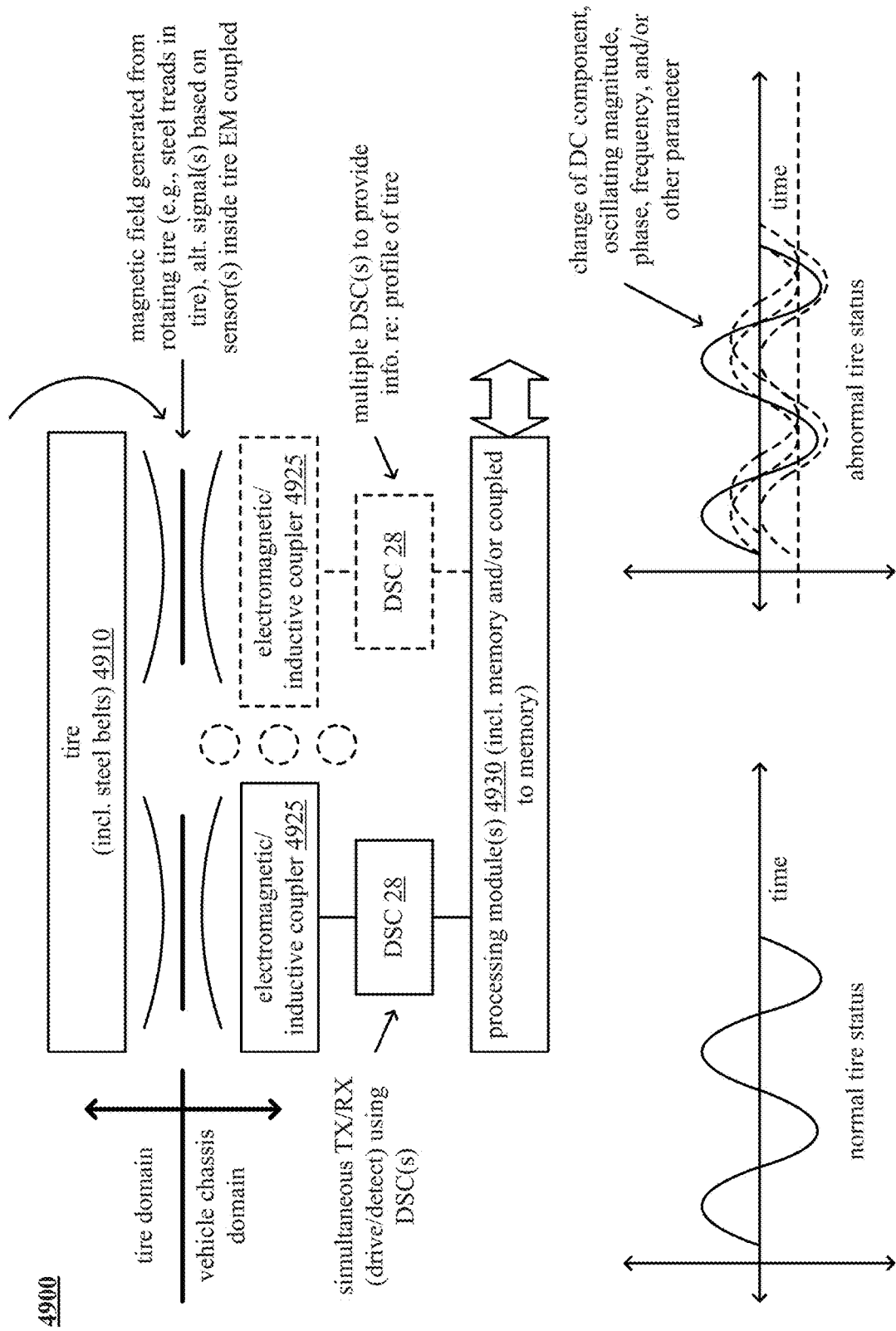
FIG. 49 is a schematic block diagram of an embodiment of a tire monitoring system in accordance with the present invention.

FIG. 49 is a schematic block diagram of an embodiment 4900 of a tire monitoring system in accordance with the present invention. At the top of the diagram, one or more processing modules 4930 is coupled to drive-sense circuits (DSCs) 28. Note that the one or more processing modules 4930 may include integrated memory and/or be coupled to other memory. At least some of the memory stores operational instructions to be executed by the one or more processing modules 4930.

In some examples, a respective DSC 28 is implemented to drive and simultaneously to sense a respective one or more signals provided to a respective electromagnetic/inductive coupler 4925 that is proximate to a radial tire 4910 that includes one or more steel belts. For example, a first DSC 28 is implemented to drive and simultaneously to sense a first respective one or more signals provided to a first electromagnetic/inductive coupler 4925 that is proximate to a radial tire 4910, and a second DSC 28 is implemented to drive and simultaneously to sense a second respective one or more signals provided to a second electromagnetic/inductive coupler 4925 that is proximate to a radial tire 4910. Generally speaking note that the one or more electromagnetic/inductive couplers 4925 are implemented in a vehicle chassis domain and the tire 4910 is implemented in the tire domain. The magnetic field that is generated by the one or more steel belts of the tire and/or the bead wire of the tire is coupled from the tire domain to the vehicle chassis domain and particularly into the one or more electromagnetic/inductive couplers 4925.

Note that the magnetic field is generated from the rotating tire. The one or more steel treads and/or the bead wire generate one or more magnetic fields in the proximity of the rotating tire. In one example, an appropriately implemented and placed electromagnetic/inductive coupler 4925, which is driven and simultaneously sensed by DSC 28, allows for monitoring of the one or more magnetic fields generated by the rotating tire. In another example, appropriately implemented and placed electromagnetic/inductive couplers 4925, which are driven and simultaneously sensed by DSCs 28, allow for monitoring of the one or more magnetic fields generated by the rotating tire.

Regardless of the particular implementation (e.g., a single electromagnetic/inductive coupler 4925 driven and simultaneously sensed by a single DSC 28, or multiple electromagnetic/inductive coupler 4925 driven and simultaneously sensed by multiple DSCs 28), the one or more processing modules 4930 is configured to process the signals that are sensed via the one or more DSCs 28 to generate a digital signal that is representative of an electrical characteristic of the one or more electromagnetic/inductive couplers 4925, which is representative of the magnetic field that is generated by the rotating tire.

At the bottom left of the diagram, consider that a sinusoid signal is transmitted to a DSC 28 that is coupled to an electromagnetic/inductive coupler 4925, then when the tire is operating in a steady state mode of operation (e.g., a relatively constant degree of inflation and/or air pressure corresponding to normal tire status), detection of that sinusoidal signal via the DSC 28 is made.

At the bottom right of the diagram, then when the tire is operating in a non-steady state mode of operation (e.g., abnormal tire status that may be associated to one or more of puncture, rupture, flat, loss of air pressure, etc.), detection of change of that sinusoidal signal via the DSC 28 is made. For example, based upon some type of abnormal tire status, the shape of the tire will change and the magnetic field generated by the rotating one or more steel belts and/or bead wire of the tire will effectuate change of one or more of the electrical characteristics of the electromagnetic/inductive coupler 4925. Note that the change of that sinusoidal signal via the DSC 28 may be manifested in any of a number of ways including a change of PC component, oscillating magnitude, phase, frequency, and/or any other parameter associated with signal that is driven the DSC 28 and simultaneously sensed there from.

Figure 50:
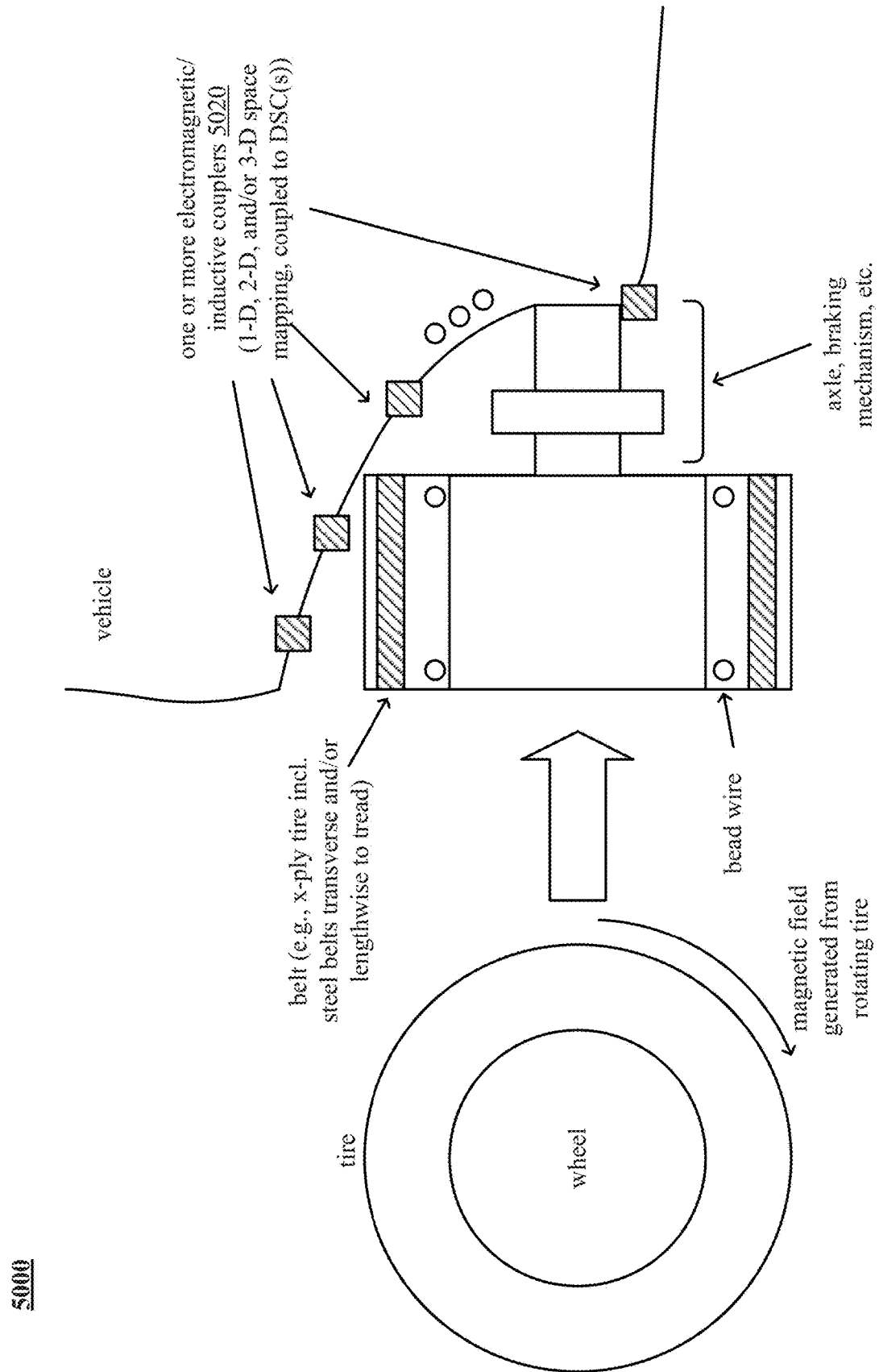
FIG. 50 is a schematic block diagram of another embodiment of a tire monitoring system in accordance with the present invention.

FIG. 50 is a schematic block diagram of another embodiment 5000 of a tire monitoring system in accordance with the present invention. This diagram shows the tire rotating and the magnetic fields generated therefrom. An axle, braking mechanism, etc. couples the wheel to the vehicle chassis. The tire is mounted to the wheel.

As the tire rotates, a magnetic field is generated by the rotating one or more steel belts and/or bead wire of the tire. This magnetic field will effectuate change of one or more of the electrical characteristics of the electromagnetic/inductive coupler 4925. One or more electromagnetic/inductive couplers 5020 is arranged in any desired configuration to facilitate monitoring of the magnetic field that is generated by the rotating tire. For example, electromagnetic/inductive couplers 5020 may be arranged in a straight line (e.g., one dimensional space, 1-D) on the vehicle chassis to monitor the magnetic field is generated by the rotating tire. Alternatively, electromagnetic/inductive couplers 5020 may be arranged in a planar array (e.g., two dimensional space, 2-D) on the vehicle chassis to monitor the magnetic field is generated by the rotating tire. In even another embodiment, electromagnetic/inductive couplers 5020 may be arranged in any three-dimensional configuration (e.g., three dimensional space, 3-D) on the vehicle chassis to monitor the magnetic field is generated by the rotating tire.

Figure 51:
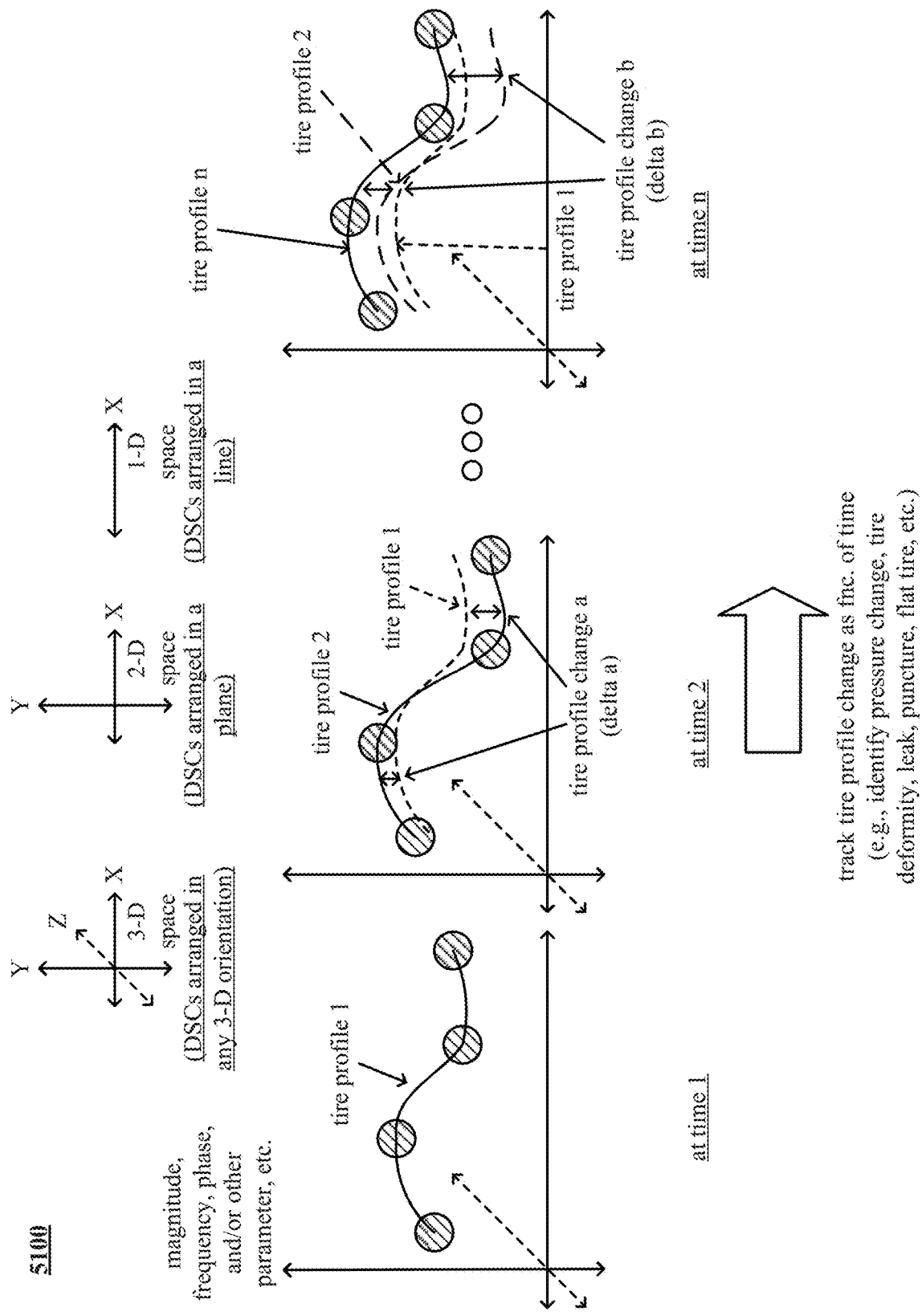
FIG. 51 is a schematic block diagram of an embodiment of tire profile monitoring in accordance with the present invention.

FIG. 51 is a schematic block diagram of an embodiment 5100 of tire profile monitoring in accordance with the present invention. As mentioned above, one or more electromagnetic/inductive couplers may be arranged in any desired configuration (e.g., 1-D space, 2-D space, 3-D space) on the vehicle chassis to monitor the magnetic field is generated by the rotating tire.

In a multiple electromagnetic/inductive coupler implementation, a tire profile that is associated with the magnetic field generated by the rotating tire may be generated at different respective times. For example, a tire profile 1 is generated at the time 1, a tire profile 2 is generated at the time 2, etc.

One or more processing modules is configured to process signals coupled from one or more DSCs that are based on one or more electromagnetic/inductive couplers to generate one or more tire profiles associated with the magnetic field is generated by the rotating tire. For example, consider an implementation that includes 4 electromagnetic/inductive couplers. A tire profile 1 is generated at the time 1 that is based on measurements associated with those 4 electromagnetic/inductive couplers. Similarly, a tire profile 2 is generated at the time 2 that is based on measurements associated with those 4 electromagnetic/inductive couplers. Generally speaking, this process may be performed any number of times up to n, where n is a positive integer.

As the shape of the tire changes, the magnetic field being generated by the rotating tire will also change. Detection of changes of the tire profile at different times (e.g., a delta or the difference a between the tire profile 1 at time 1 and the tire profile 2 at time 2, and/or a delta or the difference b between the tire profile 2 at time 2 and the tire profile n at time n) allows for identification of an adverse condition with respect to the tire (e.g., puncture, rupture, flat, loss of air pressure, etc.).

In addition, note that a single electromagnetic/inductive coupler 5020 may alternatively be implemented on the vehicle chassis to monitor the magnetic field is generated by the rotating tire. Instead of generating a higher profile that includes multiple measurements associated with multiple electromagnetic/inductive couplers, a single measurement associated with a single electromagnetic/inductive coupler is used. Similarly, detection of changes of that measurement at different times may be used for identification of an adverse condition with respect to the tire (e.g., puncture, rupture, flat, loss of air pressure, etc.).

FIG. 52 is a schematic block diagram of another embodiment 5200 of a tire monitoring system in accordance with the present invention. In this diagram, one or more sensors 5240 is associated with the tire. For example, the one or more sensors 5240 may be implemented within one or more liners associated with the tire.

At the top of the diagram are examples of liners that include one or more sensors within a tire. Note that a liner may be implemented within the inner lining of a tire, integrated into the tire built, installed during tire mounting, etc. and/or otherwise associated with and/or implemented with the tire. Note that any desired implementation of sensors may be implemented within the one or more liners associated with the tire. For example, different liners may be implemented based on different patterns inside of the tire such as based on a mesh, matrix of sensors, one or more electrodes in a first direction (e.g., around tire, start/end), one or more electrodes in two directions. For example, considering some possible cross-sections of sensors include an array of sensors driven/sensed by one or more DSCs, a matrix of sensors driven/sensed by one or more DSCs, one or more rows (or columns) of electrodes/sensors driven/sensed by one or more DSCs, a matrix of electrodes sensors driven/sensed by one or more DSCs, etc.

One or more processing modules 5240 is coupled to drive-sense circuits (DSCs) 28. Note that the one or more processing modules 5240 may include integrated memory and/or be coupled to other memory. At least some of the memory stores operational instructions to be executed by the one or more processing modules 5240. A DSC 28 is implemented to drive and simultaneously to sense one or more signals provided to one of the one or more sensors 5230.

When there is a change of amount of air pressure and/or degree of inflation of the tire (e.g., based on a puncture, a rupture, flat, loss of air pressure, etc.) and/or an actual physical modification of one or more of the sensors implemented within the one or more liners associated with the tire (e.g., based on a puncture, a rupture, flat, etc.), the one or more DSCs 28 will detect, based on a change of electrical characteristic of one or more of the sensors, an adverse condition with respect to the tire.

In addition, one or more energy harvesters 5210 is implemented within the tire and/or wheel. The tire includes one or more energy harvesters 5210 to energize (e.g., drive/sense) the one or more sensors within the tire.

Examples of energy harvester including any one or more of the following: photovoltaic: generating electric power by converting photon irradiation such as solar iteration into electricity, piezoelectric effect: converts mechanical strain into electric current or voltage, pyroelectric: pyroelectric effect converts a temperature change into electric current or voltage (e.g., analogous to the piezoelectric effect, which is another type of ferroelectric behavior), thermoelectrics: a thermal gradient formed between two dissimilar conductors produces a voltage, electrostatic (capacitive): changing capacitance of vibration-dependent capacitors (e.g., vibrations separate the plates of a charged variable capacitor, and mechanical energy is converted into electrical energy), magnetic induction: magnets wobbling on a cantilever are sensitive to even small vibrations and generate microcurrents by moving relative to conductors due to Faraday's law of induction (e.g., the kinetic/rotational energy of the rotating tire baby converted into electrical energy using magnetic induction). Note that these examples do not compose an exhaustive list and other forms of energy harvesting may be implemented.

Within the tire, the one or more energy harvesters 5210 provides electric energy that is stored in one or more energy storage elements 5220. A non-exhaustive list of examples of the one or more energy storage elements 5220 include a capacitor, a battery, etc. The one or more energy storage elements 5220 provides energy to the one or more processing modules 5240, the one or more DSCs 28, and one or more communication modules 5250. The one or more communication modules 5250 is configured to perform communication to and from one or more other communication modules associated with the vehicle chassis that are also in communication with one or more other processing modules implemented to process the signals provided from the tire to identify an adverse condition with respect to the tire. For example, such communication may be performed wirelessly, via electromagnetic (EM) induction, near-field communication (NFC), etc., and/or other means.

Figure 53:
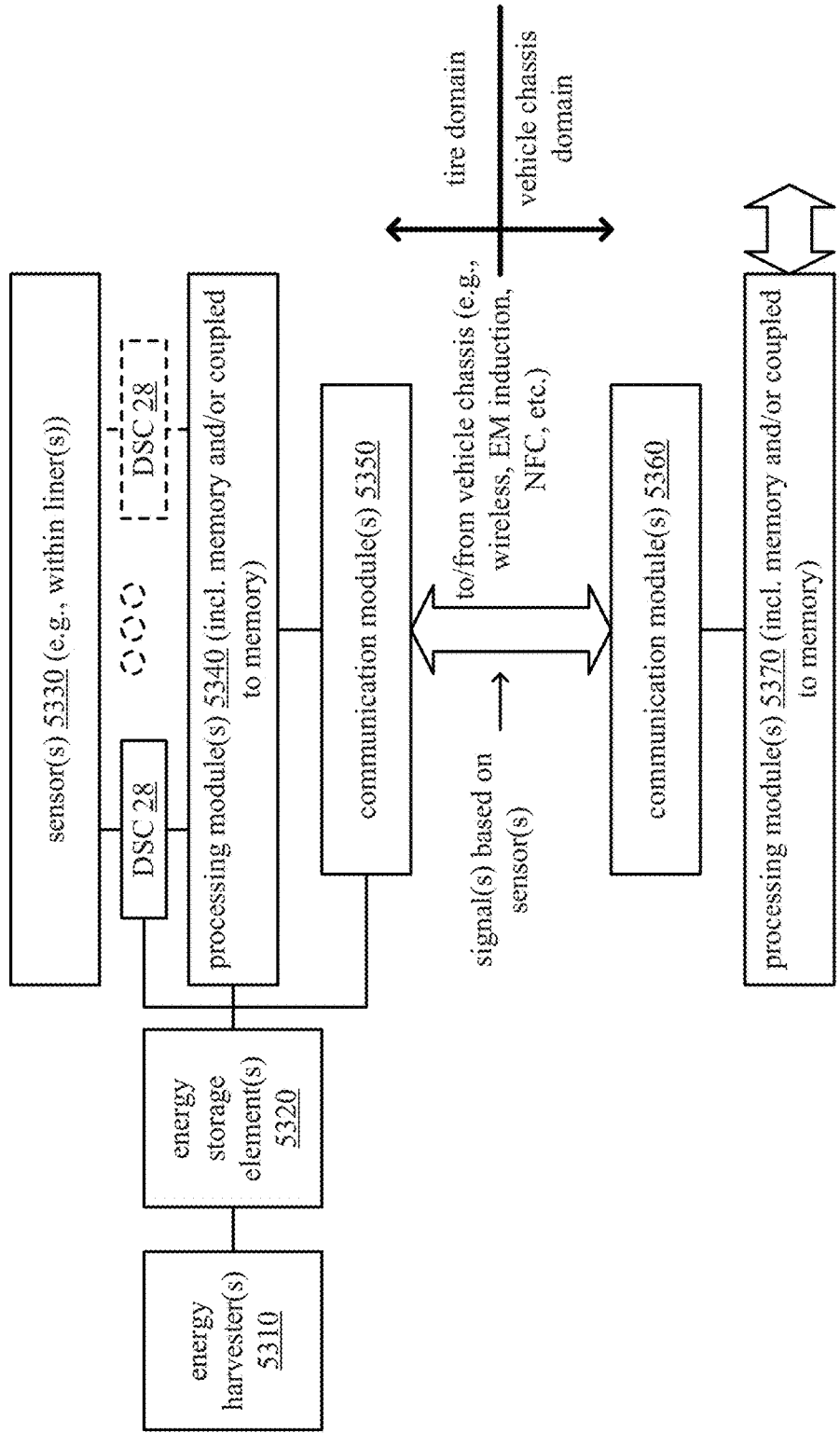
FIG. 53 is a schematic block diagram of another embodiment of a tire monitoring system in accordance with the present invention.

FIG. 53 is a schematic block diagram of another embodiment 5300 of a tire monitoring system in accordance with the present invention. This diagram shows one possible implementation by which communication from one or more devices within the tire is communicated to one or more devices within the vehicle chassis.

One or more energy harvesters 5310 is implemented to generate energy that is stored in one or more energy storage elements 5320. One or more processing modules 28, one or more communication modules 5350, and one or more DSCs are powered and/or energized by the energy from the one or more energy storage elements 5320. In addition, one or more sensors 5330 are implemented within tire. As described herein, any number of different limitations may be used by which the one or more sensors 5330 are implemented within the tire. For example, they may be implemented within one or more liners within the tire.

The one or more processing modules 5340 is coupled to drive-sense circuits (DSCs) 28. Note that the one or more processing modules 5340 may include integrated memory and/or be coupled to other memory. At least some of the memory stores operational instructions to be executed by the one or more processing modules 5340. A DSC 28 is implemented to drive and simultaneously to sense one or more signals provided to one of the one or more sensors 5330.

The one or more communication modules 5370 is configured to support communications with one or more other communication modules 5360 that are implemented within the vehicle chassis domain. In addition, one or more other processing modules 5370 is coupled to the one or more communication modules 5370. Note that the one or more processing modules 5370 may include integrated memory and/or be coupled to other memory. At least some of the memory stores operational instructions to be executed by the one or more processing modules 5370. The one or more processing modules 5370 is configured to interact with and or communicate with any one or more other system, device, module, circuitry, component, etc. within the vehicle.

Note also that the elements within this diagram may be viewed as being implemented in a vehicle chassis domain or a tire domain. For example, the one or more elements within the tire may be viewed as being implemented within the tire domain, and the one or more elements within the vehicle may be viewed as being within the vehicle chassis domain. Also, note that the communication between the one or more communication modules 5350 and 5360 may be performed in accordance with number of different means (e.g., wirelessly, via electromagnetic (EM) induction, near-field communication (NFC), etc., and/or other means).

Figure 54:
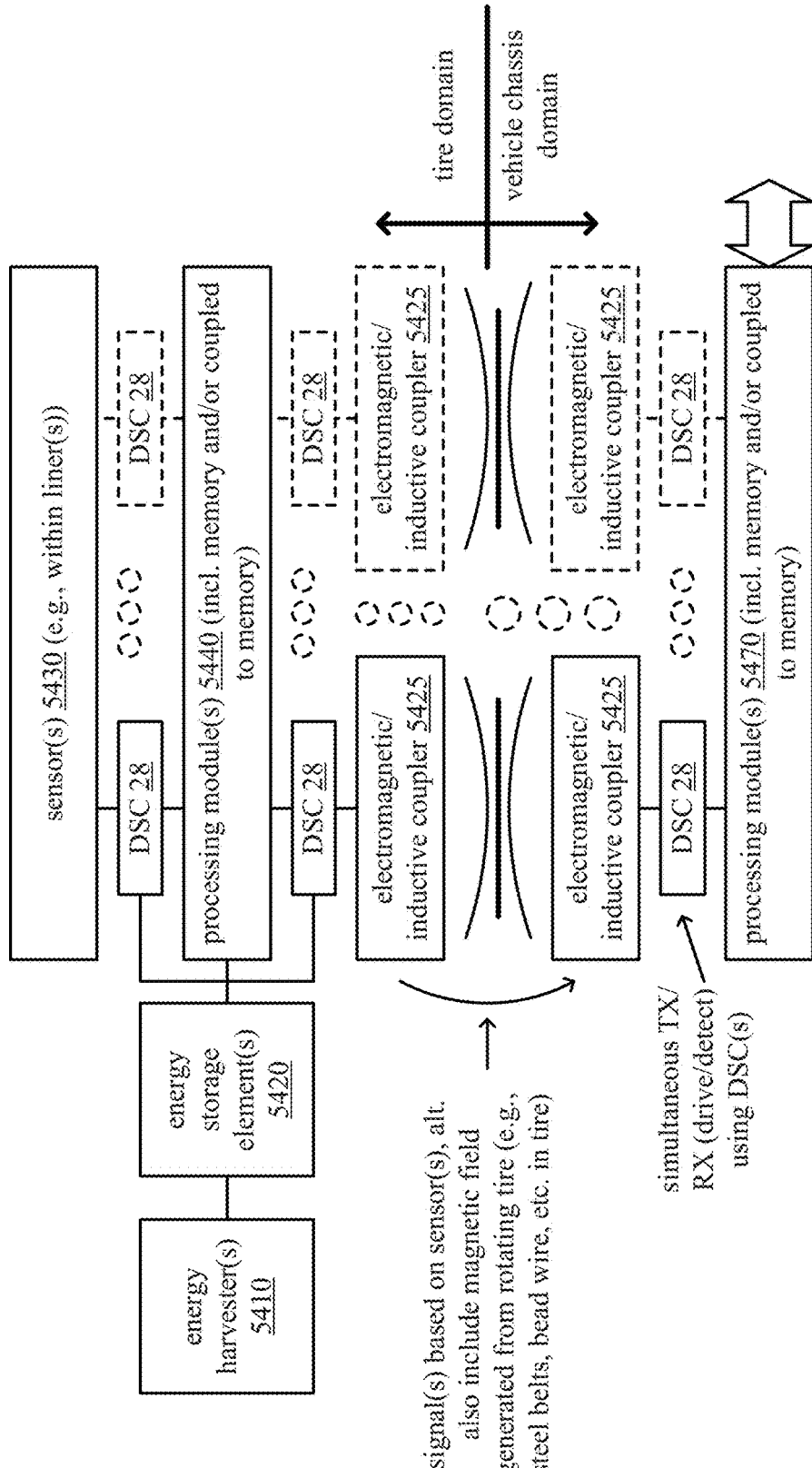
FIG. 54 is a schematic block diagram of another embodiment of a tire monitoring system in accordance with the present invention.

FIG. 54 is a schematic block diagram of another embodiment 5400 of a tire monitoring system in accordance with the present invention. This diagram shows one possible implementation by which communication from one or more devices within the tire is communicated to one or more devices within the vehicle chassis.

One or more energy harvesters 5410 is implemented to generate energy that is stored in one or more energy storage elements 5420. One or more processing modules 28, one or more communication modules 5450, and one or more DSCs are powered and/or energized by the energy from the one or more energy storage elements 5420. In addition, one or more sensors 5430 are implemented within tire. As described herein, any number of different limitations may be used by which the one or more sensors 5430 are implemented within the tire. For example, they may be implemented within one or more liners within the tire.

The one or more processing modules 5440 is coupled to drive-sense circuits (DSCs) 28. Note that the one or more processing modules 5440 may include integrated memory and/or be coupled to other memory. At least some of the memory stores operational instructions to be executed by the one or more processing modules 5440. A DSC 28 and a first one or more DSCs 28 is implemented to drive and simultaneously to sense one or more signals provided to one of the one or more sensors 5430. A DSC 28 in a second one or more DSCs 28 is implemented to drive and simultaneously to sense one or more signals provided to one of the one or more electromagnetic/inductive couplers 5425 implemented within the tire domain.

Communication is performed between one or more electromagnetic/inductive couplers 5425 implemented within the tire domain and another one or more electromagnetic/inductive couplers 5425 implemented within the tire domain implemented within the vehicle chassis domain. In addition, one or more other processing modules 5470 is coupled to the second one or more DSCs 28 is implemented to drive and simultaneously to sense one or more signals provided to one of the one or more electromagnetic/inductive couplers 5425 implemented within the vehicle chassis domain.

Note that the one or more processing modules 5470 may include integrated memory and/or be coupled to other memory. At least some of the memory stores operational instructions to be executed by the one or more processing modules 5470. The one or more processing modules 5470 is configured to interact with and or communicate with any one or more other system, device, module, circuitry, component, etc. within the vehicle.

In addition, note that the signals communicated between the respective first one or more DSCs 28 implemented within the tire domain and the second one or more DSCs 28 implemented within the vehicle chassis domain are not only based on information related to the one or more touch sensors 5430 that are associated with the tire, but they may also include information related to the magnetic field generated from a rotating tire. For example, from the rotating one or more steel belts and/or bead wire of the tire. Note that the second one or more DSCs 28 implemented within the vehicle chassis domain are capable not only to detect signals via the one or more electromagnetic/inductive couplers 5425 implemented within the tire and vehicle chassis domains, but are also capable to detect any signal that is coupled into the one or more electromagnetic/inductive couplers 5425 implemented within the tire and vehicle chassis domains.

This diagram particularly shows communication between the tire domain in the vehicle chassis domain being performed based on electromagnetic (EM) induction. Note also that the communication between the communication between the tire domain in the vehicle chassis domain may alternatively be performed in accordance with number of different means (e.g., wirelessly, near-field communication (NFC), etc., and/or other means).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A user-interactive steering wheel system, the system comprising:
    a plurality of touch sensors implemented within a steering wheel of a vehicle;
    a plurality of drive-sense circuits operably coupled to the plurality of touch sensors, wherein, when enabled, a drive-sense circuit of the plurality of drive-sense circuits is configured to:
        drive a signal via a single line coupling to a touch sensor of the plurality of touch sensors and simultaneously sense, via the single line, change of the signal that is based on interaction of a user with the touch sensor of the plurality of touch sensors within steering wheel that changes an electrical characteristic of the touch sensor of the plurality of touch sensors; and
        process the signal to generate a digital signal that is representative of the electrical characteristic of the touch sensor of the plurality of touch sensors;
    memory that stores operational instructions; and
    one or more processing modules operably coupled to the drive-sense circuit of the plurality of drive-sense circuits and to the memory, wherein, when enabled, the one or more processing modules is configured to execute the operational instructions to:
        process the digital signal to detect the interaction of the user with the touch sensor of the plurality of touch sensors within steering wheel; and
        determine at least one function associated with the vehicle that corresponds to the interaction of the user with the touch sensor of the plurality of touch sensors within steering wheel.

2. The system of claim 1, wherein the one or more processing modules, when enabled, is further configured to execute the operational instructions to:
    facilitate execution of the at least one function associated with the vehicle based on the interaction of the user with the touch sensor of the plurality of touch sensors within steering wheel.

3. The system of claim 1, wherein the drive-sense circuit of the plurality of drive-sense circuits, when enabled, is further configured to:
    drive the signal via the single line coupling to the touch sensor of the plurality of touch sensors and simultaneously sense, via the single line, change of the signal that is also based on a another signal coupled to the touch sensor of the plurality of touch sensors within steering wheel from the user that also changes the electrical characteristic of the touch sensor of the plurality of touch sensors, wherein the another signal is uniquely associated with the user.

4. The system of claim 3, wherein the one or more processing modules, when enabled, is further configured to execute the operational instructions to:
    determine whether the interaction of the user with the touch sensor of the plurality of touch sensors within steering wheel compares favorably with authorization; and
    based on unfavorable comparison of the interaction of the user with the touch sensor of the plurality of touch sensors within steering wheel with the authorization, abort execution of the at least one function associated with the vehicle based on the interaction of the user with the touch sensor of the plurality of touch sensors within steering wheel.

5. The system of claim 3, wherein the one or more processing modules, when enabled, is further configured to execute the operational instructions to:
    determine whether the interaction of the user with the touch sensor of the plurality of touch sensors within steering wheel compares favorably with authorization; and
    based on favorable comparison of the interaction of the user with the touch sensor of the plurality of touch sensors within steering wheel with the authorization, facilitate execution of the at least one function associated with the vehicle based on the interaction of the user with the touch sensor of the plurality of touch sensors within steering wheel.

6. The system of claim 1 further comprising:
    another drive-sense circuit of the plurality of drive-sense circuits, wherein, when enable, the another drive-sense circuit of the plurality of drive-sense circuits is configured to:
        drive another signal via another single line coupling to another touch sensor of the plurality of touch sensors and simultaneously sense, via the another single line, change of the another signal that is based on interaction of the user with the another touch sensor of the plurality of touch sensors within steering wheel that changes an electrical characteristic of the another touch sensor of the plurality of touch sensors; and
        process the another signal to generate another digital signal that is representative of the electrical characteristic of the another touch sensor of the plurality of touch sensors;
    the one or more processing modules is also operably coupled to the another drive-sense circuit of the plurality of drive-sense circuits and to the memory, wherein the one or more processing modules, when enabled, is further configured to execute the operational instructions to:
        process the another digital signal to detect the interaction of the user with the another touch sensor of the plurality of touch sensors within steering wheel; and
        determine at least one other function associated with the vehicle that corresponds to the interaction of the user with the another touch sensor of the plurality of touch sensors within steering wheel.

7. The system of claim 1, further comprising:
    a heads up display (HUD) operably coupled to the one or more processing modules, wherein, when enabled, the HUD is configured to:
        display a menu that is visible to the user; and
        indicate selection of an icon or a portion of the menu by the user based on the interaction of the user with the touch sensor of the plurality of touch sensors within steering wheel.

8. The system of claim 7, wherein the one or more processing modules, when enabled, is further configured to execute the operational instructions to:

facilitate execution of the at least one function associated with the vehicle based on the selection of the icon or the portion of the menu by the user based on the interaction of the user with the touch sensor of the plurality of touch sensors within steering wheel, wherein the at least one function associated with the vehicle corresponds to the icon or the portion of the menu and selection of the selection of the icon or the portion of the menu by the user authorizes execution of the at least one function associated with the vehicle.

9. The system of claim 1, wherein the interaction of the user with the touch sensor of the plurality of touch sensors within steering wheel includes at least one of a touch, a hand position, a pressure, a movement, a sequence, a tapping, or a rhythm made by the user on a portion of the steering wheel that includes the touch sensor of the plurality of touch sensors within steering wheel.

10. The system of claim 1, wherein:
the at least one function associated with the vehicle corresponds to the interaction of the user with the touch sensor of the plurality of touch sensors; and
at least one other function associated with the vehicle corresponds to another interaction of the user with the touch sensor of the plurality of touch sensors.

11. The system of claim 1, wherein the at least one function associated with the vehicle is associated with a heads up display (HUD) of the vehicle, an audio system of the vehicle, or a user interface of the vehicle that is configured at least one of to provide information to the user or to receive input from the user.

12. The system of claim 1, wherein the drive-sense circuit further comprises:
a power source circuit operably coupled to the touch sensor of the plurality of touch sensors within the steering wheel via the single line, wherein, when enabled, the power source circuit is configured to provide the signal that includes an analog signal via the single line coupling to the touch sensor, and wherein the analog signal includes at least one of a DC (direct current) component or an oscillating component; and
a power source change detection circuit operably coupled to the power source circuit, wherein, when enabled, the power source change detection circuit is configured to:
detect an effect on the analog signal that is based on the electrical characteristic of the touch sensor of the plurality of touch sensors within the steering wheel; and
generate the digital signal that is representative of the electrical characteristic of the touch sensor of the plurality of touch sensors within the steering wheel.

13. The system of claim 12 further comprising:
the power source circuit including a power source to source at least one of a voltage or a current to the touch sensor of the plurality of touch sensors within the steering wheel via the single line; and
the power source change detection circuit including:
a power source reference circuit configured to provide at least one of a voltage reference or a current reference; and
a comparator configured to compare the at least one of the voltage and the current provided to the touch sensor of the plurality of touch sensors within the steering wheel to the at least one of the voltage reference and the current reference to produce the analog signal.

14. A user-interactive steering wheel system, the system comprising:

a plurality of touch sensors implemented within a steering wheel of a vehicle;
a plurality of drive-sense circuits operably coupled to the plurality of touch sensors, wherein, when enabled, a drive-sense circuit of the plurality of drive-sense circuits is configured to:
drive a signal via a single line coupling to a touch sensor of the plurality of touch sensors and simultaneously sense, via the single line, change of the signal that is based on interaction of a user with the touch sensor of the plurality of touch sensors within steering wheel that changes an electrical characteristic of the touch sensor of the plurality of touch sensors, wherein the interaction of the user with the touch sensor of the plurality of touch sensors within steering wheel includes at least one of a touch, a hand position, a pressure, a movement, a sequence, a tapping, or a rhythm made by the user on a portion of the steering wheel that includes the touch sensor of the plurality of touch sensors within steering wheel; and
process the signal to generate a digital signal that is representative of the electrical characteristic of the touch sensor of the plurality of touch sensors;
memory that stores operational instructions;
one or more processing modules operably coupled to the drive-sense circuit of the plurality of drive-sense circuits and to the memory, wherein, when enabled, the one or more processing modules is configured to execute the operational instructions to:
process the digital signal to detect the interaction of the user with the touch sensor of the plurality of touch sensors within steering wheel; and
determine at least one function associated with the vehicle that corresponds to the interaction of the user with the touch sensor of the plurality of touch sensors within steering wheel; and
a heads up display (HUD) operably coupled to the one or more processing modules, wherein, when enabled, the HUD is configured to:
display a menu that is visible to the user; and
indicate selection of an icon or a portion of the menu by the user based on the interaction of the user with the touch sensor of the plurality of touch sensors within steering wheel.

15. The system of claim 14, wherein the one or more processing modules, when enabled, is further configured to execute the operational instructions to:
facilitate execution of the at least one function associated with the vehicle based on the selection of the icon or the portion of the menu by the user based on the interaction of the user with the touch sensor of the plurality of touch sensors within steering wheel, wherein the at least one function associated with the vehicle corresponds to the icon or the portion of the menu and selection of the selection of the icon or the portion of the menu by the user authorizes execution of the at least one function associated with the vehicle.

16. The system of claim 14, wherein the one or more processing modules, when enabled, is further configured to execute the operational instructions to:
facilitate execution of the at least one function associated with the vehicle based on the interaction of the user with the touch sensor of the plurality of touch sensors within steering wheel.

17. The system of claim 14, wherein the drive-sense circuit of the plurality of drive-sense circuits, when enabled, is further configured to:
- drive the signal via the single line coupling to the touch sensor of the plurality of touch sensors and simultaneously sense, via the single line, change of the signal that is also based on a another signal coupled to the touch sensor of the plurality of touch sensors within steering wheel from the user that also changes the electrical characteristic of the touch sensor of the plurality of touch sensors, wherein the another signal is uniquely associated with the user.

18. The system of claim 17, wherein the one or more processing modules, when enabled, is further configured to execute the operational instructions to:
- determine whether the interaction of the user with the touch sensor of the plurality of touch sensors within steering wheel compares favorably with authorization; and
- based on unfavorable comparison of the interaction of the user with the touch sensor of the plurality of touch sensors within steering wheel with the authorization, abort execution of the at least one function associated with the vehicle based on the interaction of the user with the touch sensor of the plurality of touch sensors within steering wheel.

19. The system of claim 14, wherein the drive-sense circuit further comprises:
- a power source circuit operably coupled to the touch sensor of the plurality of touch sensors within the steering wheel via the single line, wherein, when enabled, the power source circuit is configured to provide the signal that includes an analog signal via the single line coupling to the touch sensor, and wherein the analog signal includes at least one of a DC (direct current) component or an oscillating component; and
- a power source change detection circuit operably coupled to the power source circuit, wherein, when enabled, the power source change detection circuit is configured to:
  - detect an effect on the analog signal that is based on the electrical characteristic of the touch sensor of the plurality of touch sensors within the steering wheel; and
  - generate the digital signal that is representative of the electrical characteristic of the touch sensor of the plurality of touch sensors within the steering wheel.

20. The system of claim 19 further comprising:
- the power source circuit including a power source to source at least one of a voltage or a current to the touch sensor of the plurality of touch sensors within the steering wheel via the single line; and
- the power source change detection circuit including:
  - a power source reference circuit configured to provide at least one of a voltage reference or a current reference; and
  - a comparator configured to compare the at least one of the voltage and the current provided to the touch sensor of the plurality of touch sensors within the steering wheel to the at least one of the voltage reference and the current reference to produce the analog signal.

\* \* \* \* \*